US009998647B2

(12) United States Patent
Kashiwa et al.

(10) Patent No.: US 9,998,647 B2
(45) **Date of Patent: *Jun. 12, 2018**

(54) IMAGE CAPTURING SYSTEM, IMAGE CAPTURING DEVICE, AND IMAGE CAPTURING METHOD

(71) Applicant: Sony Corporation, Tokyo (JP)

(72) Inventors: Kotaro Kashiwa, Tokyo (JP); Kazuyuki Marukawa, Tokyo (JP); Yukihiro Ozheki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/208,712

(22) Filed: Jul. 13, 2016

(65) Prior Publication Data

US 2016/0323497 A1 Nov. 3, 2016

Related U.S. Application Data

(63) Continuation of application No. 14/594,205, filed on Jan. 12, 2015, which is a continuation of application (Continued)

(30) Foreign Application Priority Data

May 13, 2004 (JP) ................................ 2004-143509

(51) Int. Cl.
*H04N 5/232* (2006.01)
*H04N 5/765* (2006.01)
(Continued)

(52) U.S. Cl.
CPC ......... *H04N 5/23203* (2013.01); *H04N 5/232* (2013.01); *H04N 5/23245* (2013.01);
(Continued)

(58) Field of Classification Search
USPC .......................................................... 396/325
See application file for complete search history.

(56) References Cited

U.S. PATENT DOCUMENTS

| | | | |
|---|---|---|---|
| 5,913,078 | A | 6/1999 | Kimura et al. |
| 6,006,039 | A | 12/1999 | Steinberg et al. |

(Continued)

FOREIGN PATENT DOCUMENTS

| | | |
|---|---|---|
| CN | 1388452 | 1/2003 |
| JP | 11 164282 | 6/1999 |

(Continued)

OTHER PUBLICATIONS

Japanese Office Action dated Jul. 20, 2010.

(Continued)

*Primary Examiner* — Clayton E Laballe
*Assistant Examiner* — Linda B Smith
(74) *Attorney, Agent, or Firm* — Haug Partners LLP; William S. Frommer

(57) ABSTRACT

To enable satisfactory simultaneous and widely varied pictures to be obtained, for example, by allowing a common user to obtain an overall picture while the common user performing desired image capturing, or the like. A first image capturing device image-captures a subject to record this image, and also transmits a trigger signal to a second image capturing device. The second image capturing device image-captures an image to record this image in accordance with the trigger signal. Thus, the first and second image capturing devices enable both of an overall image and a zoomed image to be obtained with simultaneous timing.

11 Claims, 55 Drawing Sheets

2v 1v 1f 1s 2s

Related U.S. Application Data

No. 14/303,754, filed on Jun. 13, 2014, now Pat. No. 8,965,195, which is a continuation of application No. 13/734,484, filed on Jan. 4, 2013, now Pat. No. 8,787,748, which is a continuation of application No. 13/194,042, filed on Jul. 29, 2011, now Pat. No. 8,369,701, which is a continuation of application No. 11/596,086, filed as application No. PCT/JP2005/008788 on May 13, 2005, now Pat. No. 8,023,817.

(51) Int. Cl.
*H04N 5/247* (2006.01)
*H04N 7/18* (2006.01)
*H04N 5/77* (2006.01)

(52) U.S. Cl.
CPC ............ *H04N 5/247* (2013.01); *H04N 5/765* (2013.01); *H04N 7/188* (2013.01); *H04N 5/772* (2013.01)

(56) References Cited

U.S. PATENT DOCUMENTS

| | | | | |
|---|---|---|---|---|
| 6,023,588 | A | 2/2000 | Ray et al. | |
| 6,188,431 | B1 | 2/2001 | Oie | |
| 6,204,877 | B1 | 3/2001 | Kiyokawa | |
| 6,272,290 | B1 | 8/2001 | Mogamiya | |
| 6,396,537 | B1 | 5/2002 | Squilla et al. | |
| 6,463,215 | B1 | 10/2002 | O'Connolly et al. | |
| 6,523,114 | B1 * | 2/2003 | Barton | G06T 1/0028 348/E7.056 |
| 6,670,933 | B1 | 12/2003 | Yamazaki | |
| 6,864,911 | B1 | 3/2005 | Zhang et al. | |
| 6,909,457 | B1 | 6/2005 | Fukasawa | |
| 7,027,086 | B1 | 4/2006 | Ozawa et al. | |
| 7,046,292 | B2 | 5/2006 | Ziemkowski | |
| 7,136,094 | B2 | 11/2006 | Ziemkowski | |
| 7,231,144 | B2 | 6/2007 | Tanaka et al. | |
| 7,272,788 | B2 | 9/2007 | Anderson et al. | |
| 7,333,725 | B1 | 2/2008 | Frazier | |
| 7,450,162 | B2 | 11/2008 | Shioji et al. | |
| 7,460,781 | B2 * | 12/2008 | Kanai | H04N 5/23203 348/211.3 |
| 7,573,503 | B2 | 8/2009 | Tanaka et al. | |
| 7,602,419 | B2 | 10/2009 | Kiuchi | |
| 7,725,015 | B2 | 5/2010 | Tanoue | |
| 2002/0018138 | A1 | 2/2002 | Yoshiro | |
| 2002/0118969 | A1 | 8/2002 | Kanade et al. | |
| 2002/0127019 | A1 | 9/2002 | Ogasawara | |
| 2002/0145660 | A1 | 10/2002 | Kanade et al. | |
| 2003/0021591 | A1 | 1/2003 | Grosvenor et al. | |
| 2003/0053683 | A1 * | 3/2003 | Newman | H04N 1/6058 382/162 |
| 2003/0133018 | A1 | 7/2003 | Ziemkowski | |
| 2004/0036899 | A1 | 2/2004 | Takano et al. | |
| 2004/0174444 | A1 | 9/2004 | Ishii | |
| 2004/0183915 | A1 * | 9/2004 | Gotohda | H04N 5/23206 348/207.11 |
| 2005/0160067 | A1 | 7/2005 | Sohma et al. | |
| 2005/0212955 | A1 | 9/2005 | Craig et al. | |
| 2006/0125928 | A1 | 6/2006 | Wolcott et al. | |
| 2006/0158526 | A1 | 7/2006 | Kashiwa et al. | |
| 2006/0165405 | A1 | 7/2006 | Kanai et al. | |
| 2006/0187227 | A1 | 8/2006 | Jung et al. | |
| 2006/0284996 | A1 | 12/2006 | Kanai et al. | |
| 2007/0098385 | A1 | 5/2007 | Tanaka et al. | |
| 2008/0068486 | A1 * | 3/2008 | Kusaka | H04N 1/00315 348/333.02 |
| 2008/0267606 | A1 | 10/2008 | Wolcott et al. | |
| 2009/0128631 | A1 | 5/2009 | Ortiz | |
| 2012/0194708 | A1 | 8/2012 | Nildcanen et al. | |

FOREIGN PATENT DOCUMENTS

| | | |
|---|---|---|
| JP | 2001 148822 | 5/2001 |
| JP | 2001-245280 | 9/2001 |
| JP | 2003 274251 | 9/2003 |
| JP | 2003 283976 | 10/2003 |
| JP | 2003-348428 | 12/2003 |
| JP | 2004-070872 | 3/2004 |
| JP | 2004 112770 | 4/2004 |
| JP | 2005-223814 | 8/2005 |
| KR | 10-0244526 | 1/2000 |
| TW | 552 801 B | 9/2003 |

OTHER PUBLICATIONS

Office Action issued in corresponding European Application No. 05738639.3 dated Dec. 23, 2015.

Search Report issued in corresponding European Application No. 16160682.7 dated Jul. 15, 2016.

* cited by examiner 1v
1f
1s
2v
2s

IMAGE CAPTURING UNIT
31
35
IMAGE-CAPTURING SIGNAL PROCESSING UNIT
32
RECEPTION UNIT
34
Vc
33
RECORDING PLAYBACK UNIT
RECORDING MEDIA
36
TG
COMMON CONTROL UNIT
30
2s
TG
12
11
TRANSMISSION UNIT
IMAGE CAPTURING UNIT
13
IMAGE-CAPTURING SIGNAL PROCESSING UNIT
14
VL
19
RECORDING PLAYBACK UNIT
RECORDING MEDIA
TG
1s
15
10
16
LOCAL CONTROL UNIT
DISPLAY PROCESSING
18
17
DISPLAY UNIT

FIG. 4
(a)
LOCAL CAMERA IMAGE-CAPTURED IMAGE $V_L$
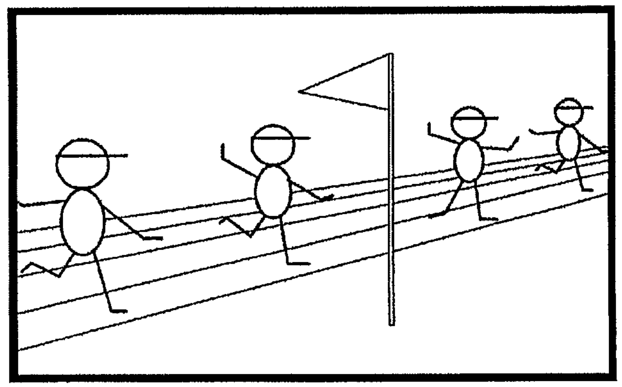
(b)
COMMON CAMERA IMAGE-CAPTURED IMAGE $V_C$
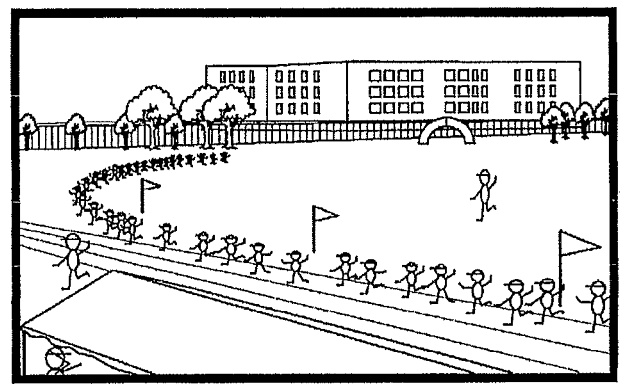
(c)
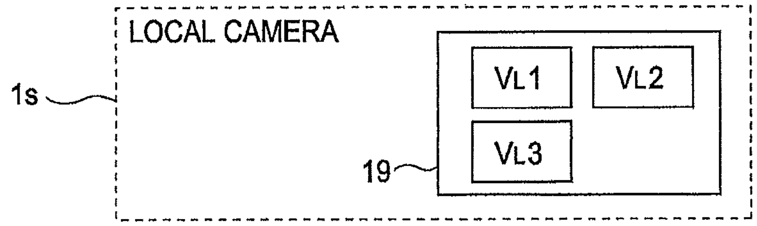
(d)
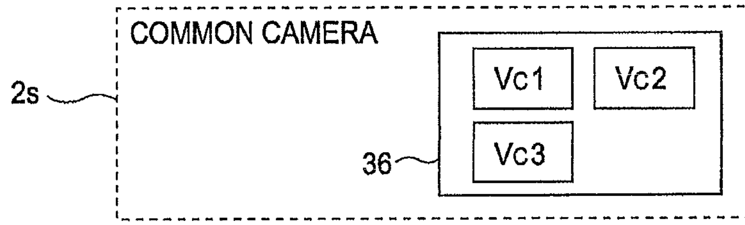

IMAGE CAPTURING UNIT
31
IMAGE-CAPTURING SIGNAL PROCESSING UNIT
32
Vc
RECORDING PLAYBACK UNIT
RECORDING MEDIA
33
36
COMMON CONTROL UNIT
30
ID
RECEPTION UNIT
34
35
TG, ID
2s
TG, ID
12
TRANSMISSION UNIT
11
IMAGE CAPTURING UNIT
13
IMAGE-CAPTURING SIGNAL PROCESSING UNIT
14
VL
RECORDING PLAYBACK UNIT
RECORDING MEDIA
19
15
1s
TG, ID
LOCAL CONTROL UNIT
10
DISPLAY PROCESSING
16
DISPLAY UNIT
17
ID STORING UNIT
20
18

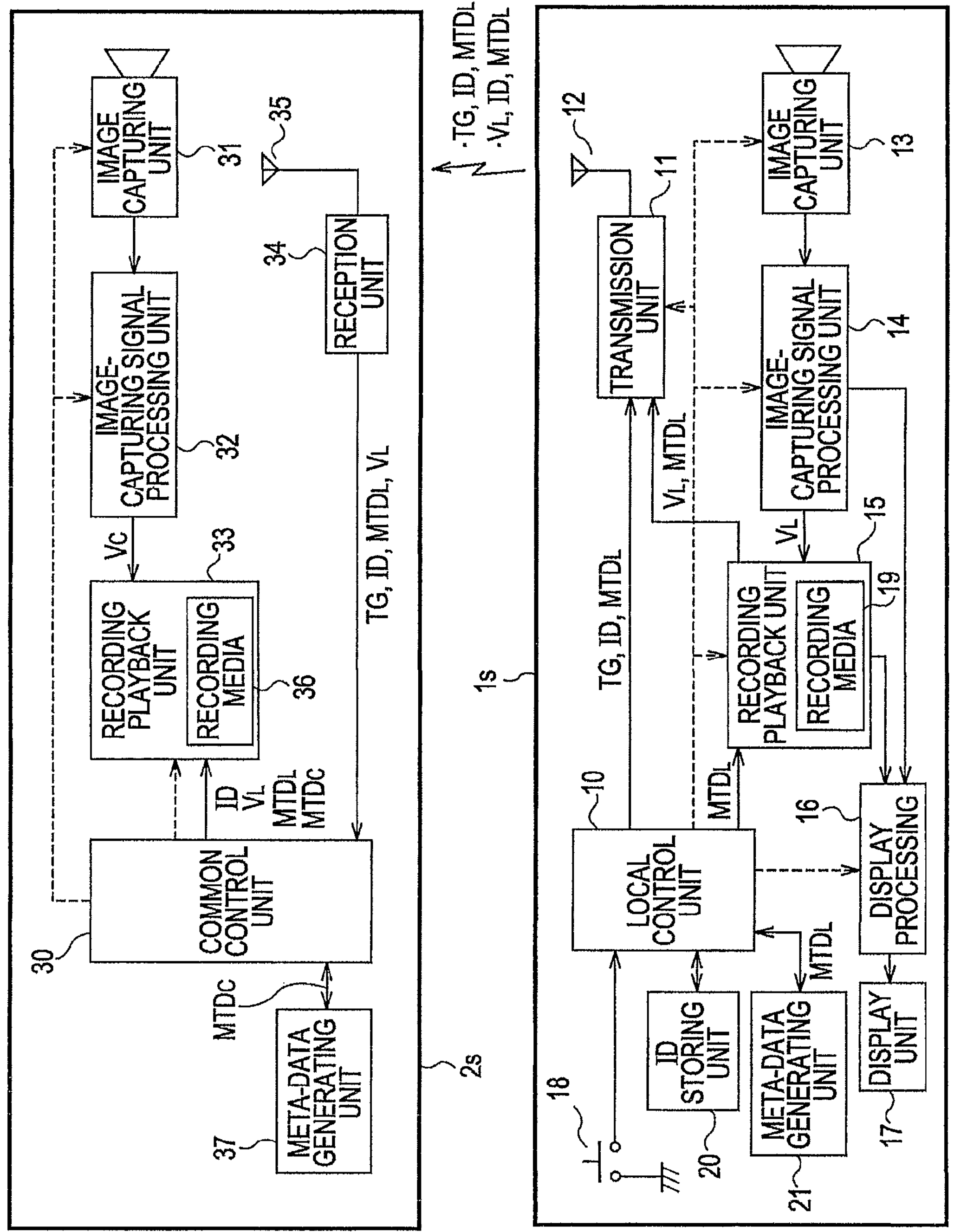

FIG. 11
IMAGE CAPTURING UNIT
31
IMAGE-CAPTURING SIGNAL PROCESSING UNIT
32
Vc
RECORDING PLAYBACK UNIT
33
RECORDING MEDIA
36
COMMON CONTROL UNIT
30
ID
VL
MTDL
MTDc
MTDc
META-DATA GENERATING UNIT
37
2s
35
RECEPTION UNIT
34
TG, ID, MTDL, VL
·TG, ID, MTDL
·VL, ID, MTDL
12
TRANSMISSION UNIT
11
IMAGE CAPTURING UNIT
13
IMAGE-CAPTURING SIGNAL PROCESSING UNIT
14
VL, MTDL
VL
15
RECORDING PLAYBACK UNIT
RECORDING MEDIA
19
TG, ID, MTDL
1s
10
MTDL
LOCAL CONTROL UNIT
16
DISPLAY PROCESSING
18
ID STORING UNIT
20
META-DATA GENERATING UNIT
21
MTDL
DISPLAY UNIT
17

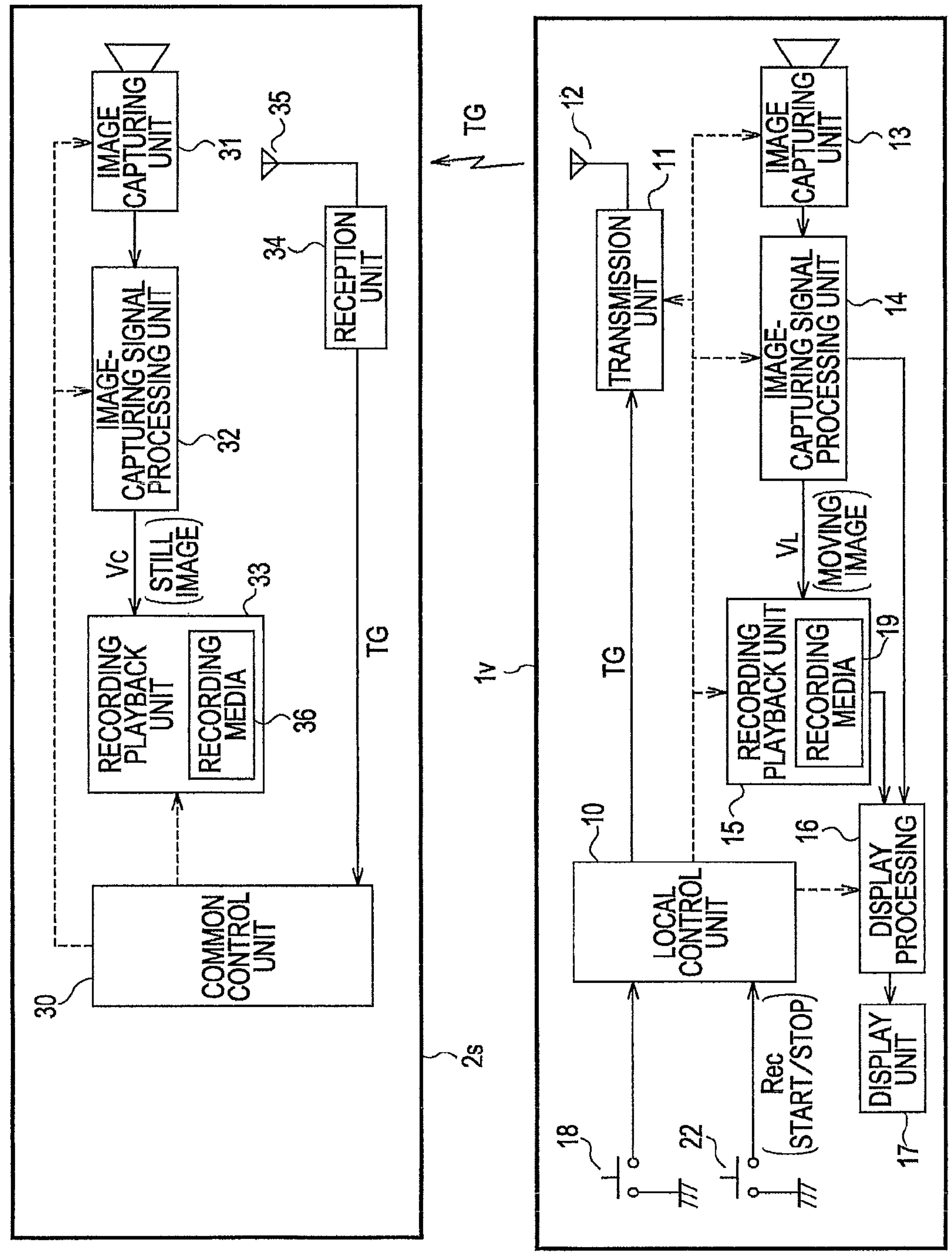
FIG. 14
IMAGE CAPTURING UNIT
31
IMAGE-CAPTURING SIGNAL PROCESSING UNIT
32
Vc
(STILL IMAGE)
RECORDING PLAYBACK UNIT
RECORDING MEDIA
33
36
COMMON CONTROL UNIT
30
35
RECEPTION UNIT
34
TG
2s
TG
12
TRANSMISSION UNIT
11
IMAGE CAPTURING UNIT
13
IMAGE-CAPTURING SIGNAL PROCESSING UNIT
14
VL
(MOVING IMAGE)
RECORDING PLAYBACK UNIT
RECORDING MEDIA
19
15
1v
TG
LOCAL CONTROL UNIT
10
DISPLAY PROCESSING
16
DISPLAY UNIT
17
18
22
Rec (START/STOP)

IMAGE-CAPTURING UNIT
31
35
IMAGE-CAPTURING SIGNAL PROCESSING UNIT
32
Vc
33
RECORDING PLAYBACK UNIT
RECORDING MEDIA
36
RECEPTION UNIT
34
TG
COMMON CONTROL UNIT
30
2s
TG
12
11
TRANSMISSION UNIT
IMAGE-CAPTURING OPTICAL SYSTEM
23
MECHANICAL SYSTEM
24
TG
1f
25
10
LOCAL CONTROL UNIT
18

2 (COMMON CAMERA)
TG
TG
TG
1 (LOCAL CAMERA #n)
1 (LOCAL CAMERA #2)
1 (LOCAL CAMERA #1)

IMAGE CAPTURING UNIT
IMAGE-CAPTURING SIGNAL PROCESSING UNIT
RECORDING PLAYBACK UNIT
RECORDING MEDIA
COMMON CONTROL UNIT
SHUTTER PROGRAM
TRANSMISSION UNIT
TG
VC
RECEPTION UNIT
LOCAL CONTROL UNIT
DISPLAY PROCESSING
DISPLAY UNIT
VL
1s
2s

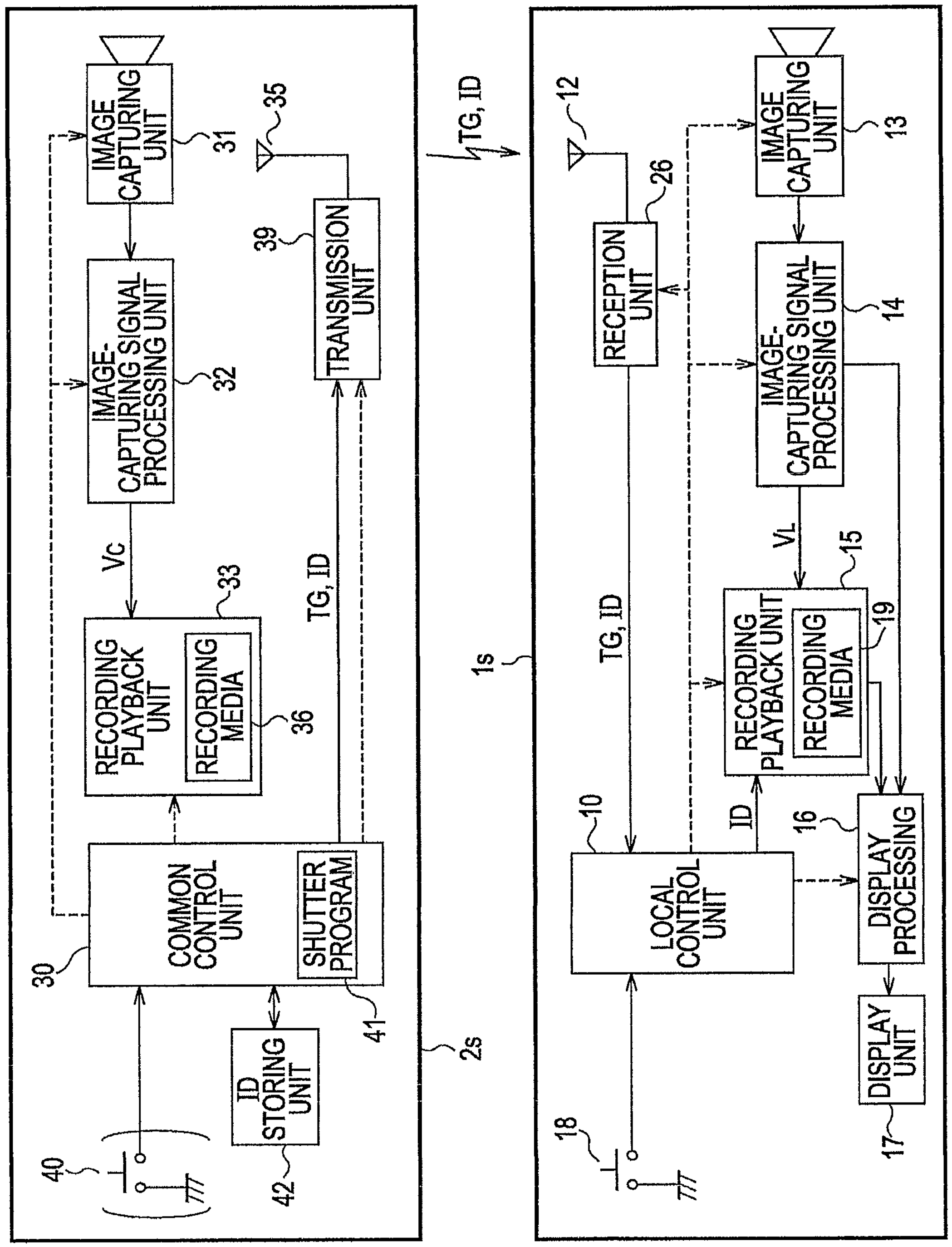
FIG. 33
IMAGE CAPTURING UNIT
31
IMAGE-CAPTURING SIGNAL PROCESSING UNIT
32
Vc
RECORDING PLAYBACK UNIT
RECORDING MEDIA
33
36
COMMON CONTROL UNIT
SHUTTER PROGRAM
30
41
ID STORING UNIT
42
40
2s
TRANSMISSION UNIT
39
35
TG, ID
TG, ID
12
RECEPTION UNIT
26
IMAGE CAPTURING UNIT
13
IMAGE-CAPTURING SIGNAL PROCESSING UNIT
14
VL
RECORDING PLAYBACK UNIT
RECORDING MEDIA
15
19
1s
TG, ID
LOCAL CONTROL UNIT
10
ID
DISPLAY PROCESSING
16
DISPLAY UNIT
17
18

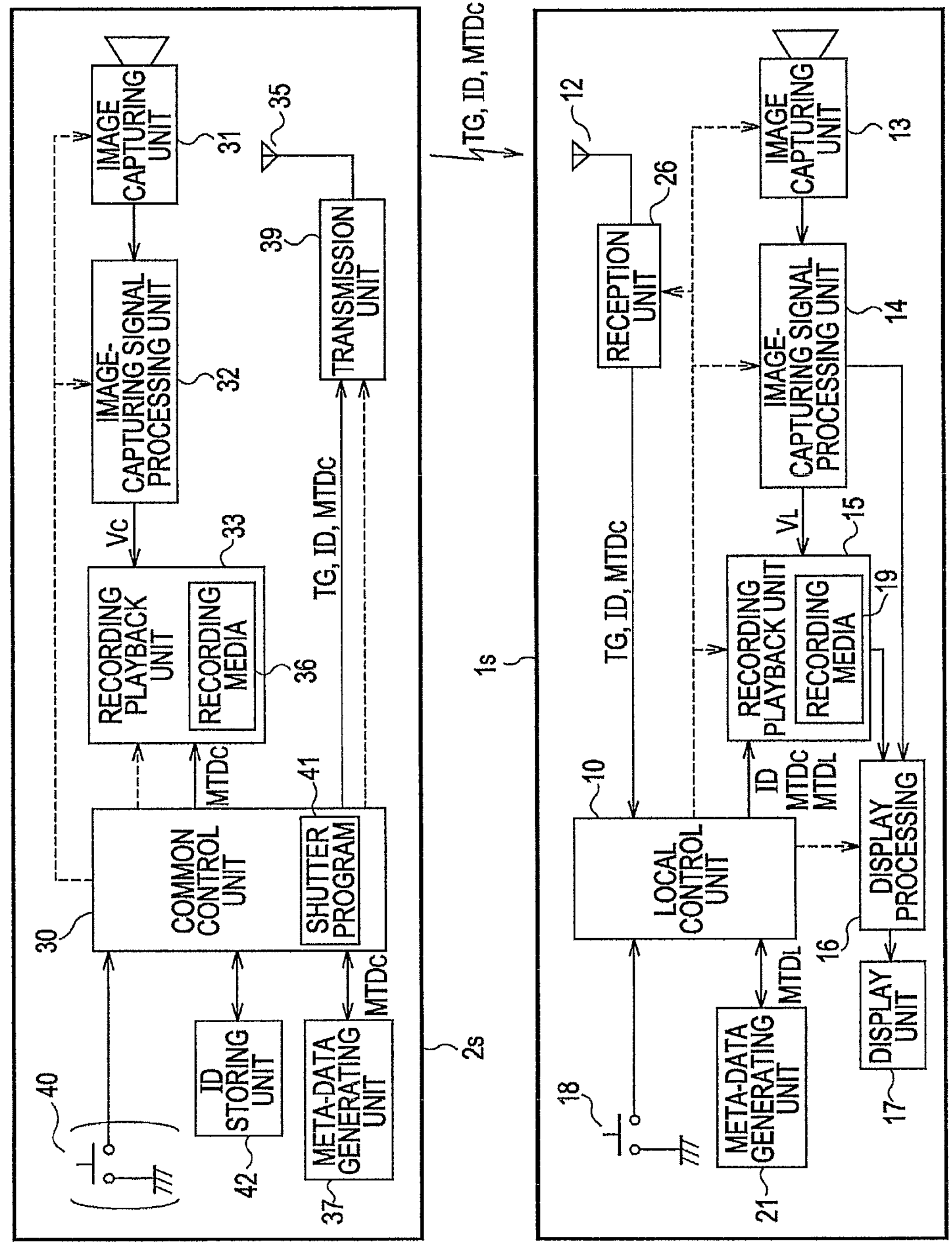
FIG. 36
IMAGE CAPTURING UNIT
31
IMAGE-CAPTURING SIGNAL PROCESSING UNIT
32
Vc
RECORDING PLAYBACK UNIT
RECORDING MEDIA
33
36
COMMON CONTROL UNIT
SHUTTER PROGRAM
30
41
MTDc
ID STORING UNIT
42
META-DATA GENERATING UNIT
37
40
35
TRANSMISSION UNIT
39
TG, ID, MTDc
2s
TG, ID, MTDc
12
RECEPTION UNIT
26
IMAGE CAPTURING UNIT
13
IMAGE-CAPTURING SIGNAL PROCESSING UNIT
14
VL
15
RECORDING PLAYBACK UNIT
RECORDING MEDIA
19
TG, ID, MTDc
1s
LOCAL CONTROL UNIT
10
ID
MTDc
MTDL
DISPLAY PROCESSING
16
DISPLAY UNIT
17
META-DATA GENERATING UNIT
21
MTDL
18

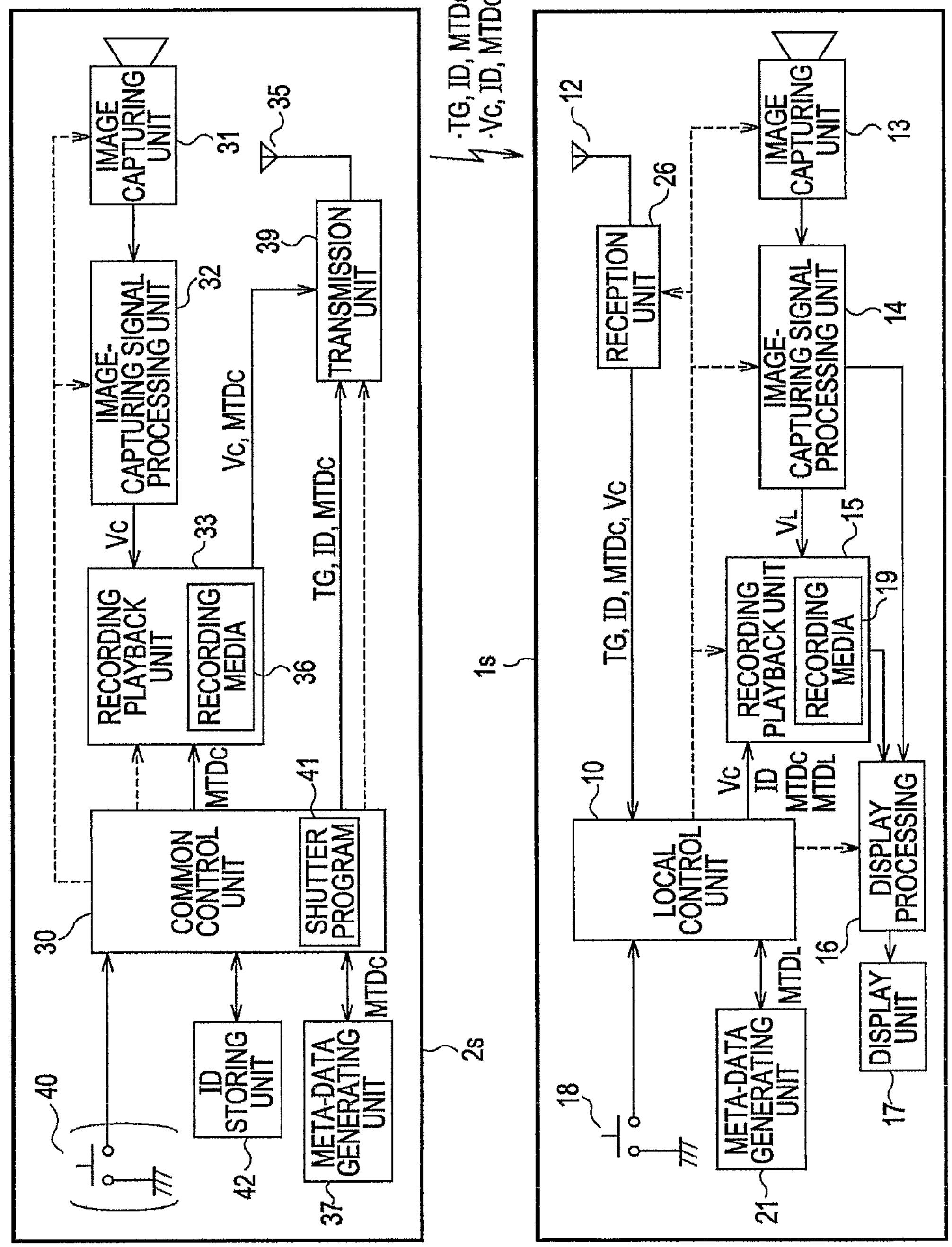
FIG. 39
IMAGE CAPTURING UNIT
31
IMAGE-CAPTURING SIGNAL PROCESSING UNIT
32
Vc
RECORDING PLAYBACK UNIT
33
RECORDING MEDIA
36
Vc, MTDc
TRANSMISSION UNIT
39
35
TG, ID, MTDc
MTDc
COMMON CONTROL UNIT
30
SHUTTER PROGRAM
41
40
ID STORING UNIT
42
META-DATA GENERATING UNIT
37
MTDc
2s
·TG, ID, MTDc
·Vc, ID, MTDc
1s
12
RECEPTION UNIT
26
IMAGE CAPTURING UNIT
13
IMAGE-CAPTURING SIGNAL PROCESSING UNIT
14
TG, ID, MTDc, Vc
VL
RECORDING PLAYBACK UNIT
15
RECORDING MEDIA
19
Vc
ID
MTDc
MTDL
LOCAL CONTROL UNIT
10
DISPLAY PROCESSING
16
DISPLAY UNIT
17
18
META-DATA GENERATING UNIT
21
MTDL FIG. 44
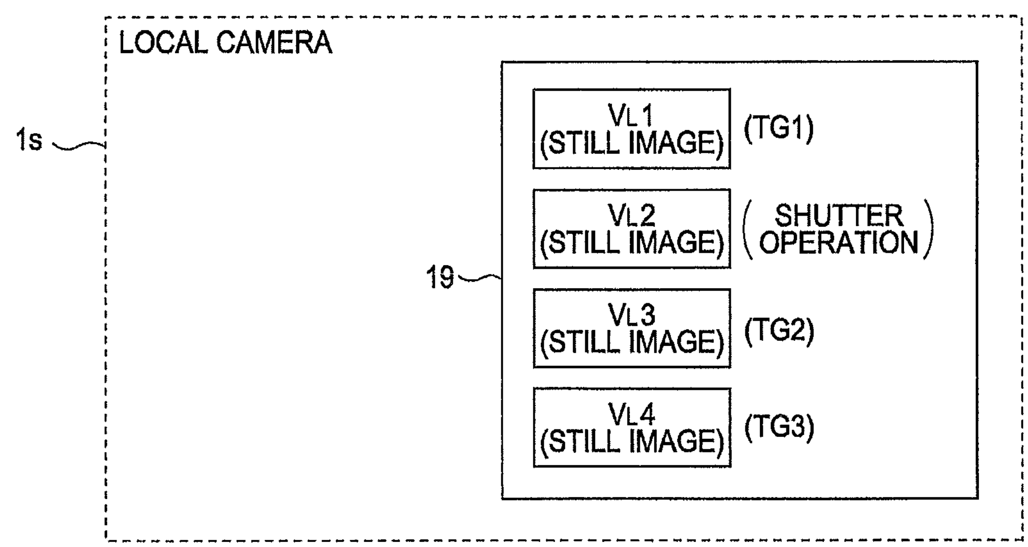
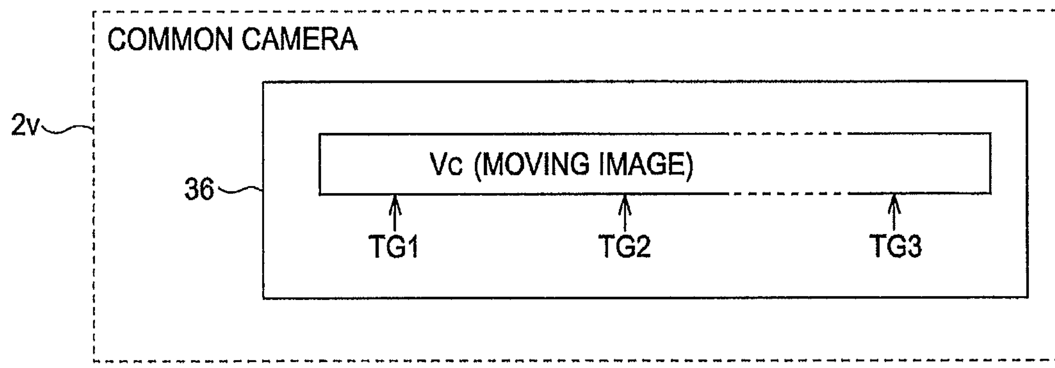

IMAGE-CAPTURING UNIT
31
IMAGE-CAPTURING SIGNAL PROCESSING UNIT
32
Vc
RECORDING PLAYBACK UNIT
RECORDING MEDIA
33
36
COMMON CONTROL UNIT
SHUTTER PROGRAM
30
41
40
2s
TRANSMISSION UNIT
39
35
TG
TG
RECEPTION UNIT
26
12
IMAGE-CAPTURING OPTICAL SYSTEM
23
MECHANICAL SYSTEM
24
25
TG
LOCAL CONTROL UNIT
10
18
1f

IMAGE CAPTURING SYSTEM, IMAGE CAPTURING DEVICE, AND IMAGE CAPTURING METHOD

This is a continuation of application Ser. No. 14/594,205, filed Jan. 12, 2015, which is a continuation of application Ser. No. 14/303,754, filed Jun. 13, 2014, now U.S. Pat. No. 8,965,195, issued on Feb. 24, 2015, which is a continuation of application Ser. No. 13/734,484, filed Jan. 4, 2013, now U.S. Pat. No. 8,787,748, issued on Jul. 22, 2014, which is a continuation of application Ser. No. 13/194,042, filed Jul. 29, 2011, now U.S. Pat. No. 8,369,701, issued on Feb. 5, 2013, which is a continuation of application Ser. No. 11/596,086, filed Nov. 9, 2006, now U.S. Pat. No. 8,023,817, issued on Sep. 20, 2011, which is based on International Application PCT/JP2005/008788, filed May 13, 2005, with a claim of priority under 35 USC 119 to Japanese Application 2004-143509, filed in Japan on May 13, 2004, the entirety of which is incorporated herein by reference.

TECHNICAL FIELD

The present invention relates to an image capturing system, image capturing device, and image capturing method, whereby, for example, image-captured pictures suitable for a common user can be obtained.

BACKGROUND ART

In recent years, for example, small video cameras for recording image-captured pictures in disc media or tape media have been widely used, thereby providing a situation wherein a user can readily perform video shooting for enjoyment.

For example, many people perform image capturing using video cameras at athletic meets, various types of events, amusement parks, holiday resorts, and so forth.

Also, as the environment in which a common user can readily enjoy still images and moving-images picture at home or the like is being developed, various types of services such as distribution services of moving images and still images, shooting services at amusement parks, and so forth, have been proposed or realized. For example, with Japanese Unexamined Patent Application Publication No. 2001-148822, technology for performing a shooting service has been disclosed.

DISCLOSURE OF INVENTION

Incidentally, when actually performing image capturing using a video camera or still camera, there are many cases wherein a user wants to perform image capturing by concentrating on or zooming in on a particular object.

For example, with a field day at an elementary school or the like, it is common for a person to perform image capturing centered on his/her child, and particularly during a competition, such a person is apt to perform image capturing by pursuing only his/her child in a zoomed-in state. Of course, the pictures thus taken are valuable to that person and family thereof and so forth, but it is sometimes difficult to understand the overall competition.

On the other hand, when image-capturing the entire competition with a long shot, the person cannot capture his/her child in a zoomed-in state, and accordingly, this picture is often not valuable to the image-capturing person and others.

Further, in the event of capturing a moving-image picture using a video camera, the image-capturing person frequently performs zooming-in/out operations to obtain both the zoomed-in image of his/her child and the overall picture in some cases, but in this case, the obtained picture may sometimes be an unsettled picture which is uncomfortable to watch, or the image-capturing person loses sight of his/her child's position when capturing the picture of the overall competition, resulting in unsatisfactory image capturing.

Also, there has been demand for a capability wherein, in the event of capturing a zoomed-in image of his/her child at the time of a certain photo opportunity using a still camera, the overall image can be obtained at the same timing.

The above case is one example, but when a common user actually performs image capturing using a still camera or video camera, there are many cases wherein the user wants to capture both of the overall picture and a zoomed-in image (moving or still image), but usually the user cannot readily perform such image capturing.

Accordingly, it is an object of the present invention for a common user to obtain the overall picture while performing desired image capturing, and consequently to obtain a satisfactory picture.

The image capturing system of the present invention is an image capturing system made up of a first image capturing device and a second image capturing device.

The first image capturing device is an image capturing device for performing recording of an image-captured image, and also transmitting a trigger signal for instructing image capturing or recording of an image-captured image as to the second image capturing device at the same timing.

The second image capturing device is an image capturing device for performing image capturing and recording of an image-captured image in response to receiving a trigger signal from the first image capturing device.

That is to say, the image capturing system according to the present invention comprises first image-capturing recording means for performing image capturing to record an image, transmission means for transmitting a trigger signal to the second image capturing device, and first control means for controlling recording of an image-captured image at the first image-capturing recording means, and transmission of a trigger signal from the transmission means.

Also, the second image capturing device comprises second image-capturing recording means for performing image capturing to record an image, reception means for receiving a trigger signal from the first image capturing device, and second control means for controlling the second image-capturing recording means to execute at least image capturing or recording of an image-captured image in response to receiving a trigger signal at the reception means.

Also, the first image capturing device further comprises identifying information storing means for storing apparatus identifying information, and meta-data generating means for generating meta data, and the first control means control the transmission means to transmit the apparatus identifying information and meta data along with the trigger signal.

The second control means control the second image-capturing recording means to execute recording of the apparatus identifying information and meta data received at the reception means along with image-captured image thereof at the time of controlling the second image-capturing recording means to execute recording of an image-captured image based on a trigger signal received at the reception means.

The second image capturing device further comprises meta-data generating means for generating meta data, and the second control means control the second image-capturing recording means to execute recording of the meta data generated at the meta-data generating means along with image-captured image thereof at the time of controlling the second image-capturing recording means to execute recording of an image-captured image based on a trigger signal received at the reception means.

Also, the first control means control the first image-capturing recording means to execute recording of an image-captured image, and control the transmission means to execute transmission of a trigger signal, following which control the transmission means to transmit the image-captured image recorded at the first image-capturing recording means. In this case, the second control means control the second image-capturing recording means to record the image-captured image received at the reception means.

Also, in the event that the first image capturing device thus transmits an image-captured image to the second image capturing device, the respective image capturing devices also record meta data at the time of recording of the image-captured image. Subsequently, the first image capturing device transmits meta data to the second image capturing device along with an image-captured image, and the second image capturing device collates the transmitted meta data with the recorded meta data to determine corresponding relation, and records the transmitted image-captured image so as to associate this with a certain particular image-captured image recorded.

Also, the first image-capturing recording means are configured so as to record image-captured images as still images, and the first control means control the first image-capturing recording means to perform still-image recording of an image-captured image, and control the transmission means to execute transmission of a trigger signal, with the timing specified by an operation or an operation program.

Alternately, the first image-capturing recording means are configured so as to record image-captured images as moving images, and the first control means control the first image-capturing recording means to execute moving-image recording of an image-captured image during the period specified by a first operation, and also control the transmission means to transmit a trigger signal with the timing specified by a second operation or an operation program.

Alternately, the first image-capturing recording means are configured so as to record image-captured images as moving and still images, and the first control means control the first image-capturing recording means to execute moving-image recording of an image-captured image during the period specified by a first operation, and also control the first image-capturing recording means to execute still-image recording of an image-captured image and control the transmission means to transmit a trigger signal with the timing specified by a second operation or an operation program.

Also, the second image-capturing recording means are configured so as to record image-captured images as still images, and the second control means control the second image-capturing recording means to execute still-image recording of an image-captured image in response to receiving a trigger signal at the reception means.

Alternately, the second image-capturing recording means are configured so as to record image-captured images as moving images, and the second control means control the second image-capturing recording means to execute moving-image recording of an image-captured image in response to receiving a trigger signal at the reception means.

Alternately, the second image-capturing recording means are configured so as to record image-captured images as moving and still images, and the second control means control the second image-capturing recording means to execute moving-image recording of an image-captured image during the period specified by an operation, and also control the second image-capturing recording means to execute still-image recording of an image-captured image in response to receiving a trigger signal at the reception means.

Also, the first control means transmit a standby instruction prior to transmitting a trigger signal from the transmission means, and the second control means control the second image-capturing recording means to stand by in a recordable state in response to receiving a standby instruction at the reception means.

The image capturing device of the present invention is an image capturing device serving as a first image capturing device according to the above image capturing system.

The image capturing device of the present invention is an image capturing device serving as a second image capturing device according to the above image capturing system.

The image capturing method of the present invention is an image capturing method to be executed in the first image capturing device according to the above image capturing system.

That is to say, an image capturing method of an image capturing device for recording still images or moving images as the image-captured images of a subject, comprises an image-capturing step for executing recording of an image-captured image with the timing specified by an operation or operation program, and a trigger transmitting step for transmitting a trigger signal for instructing image capturing or recording of an image-captured image to an external device with that timing.

Also, in the trigger transmitting step, the apparatus identifying information of the image-capturing device, and the meta data generated at the image capturing device are transmitted along with the trigger signal.

Further, the image capturing method further comprises an image transmitting step for transmitting the image-captured image recorded in the image-capturing recording step.

In the image-capturing recording step, recording of the meta data generated at the image capturing device is performed so as to associate the meta data with an image-captured image, and the method further comprises an image transmitting step for transmitting the image-captured image and meta data recorded in the image-capturing recording step.

The image capturing method further comprises a standby instruction transmitting step for transmitting a standby instruction for instructing preparation for image capturing or preparation for recording of an image-captured image as to an external device prior to the timing for executing the image-capturing recording step and the trigger transmitting step.

The image capturing method of the present invention is an image capturing method to be executed in the second image capturing device according to the above image capturing system.

That is to say, an image capturing method of an image capturing device for recording still images or moving images as the image-captured images of a subject, comprises a trigger receiving step for receiving a trigger signal transmitted from an external device, and an image-capturing recording step for executing image capturing or recording of an image-captured image in response to receiving a trigger signal in the receiving step.

Also, in the receiving step, the apparatus identifying information and meta data transmitted from the external device is received along with a trigger signal, and also in the image-capturing recording step, the received apparatus identifying information and meta data is recorded along with an image-captured image.

Also, in the image-capturing recording step, recording of the meta data generated at the image capturing device is executed so as to be associated with an image-captured image.

Also, the image capturing method further comprises an image receiving step for receiving an image-captured image to be transmitted from the external device; and a receiving image recording step for recording the image-captured image received in the image receiving step.

Also, in the image-capturing recording step, recording of the meta data generated at the image capturing device so as to be associated with an image-captured image is executed. The image capturing method further comprises an image receiving step for receiving the image-captured image and meta data to be transmitted from the external device, a collating step for collating the meta data received in the image receiving step with the meta data recorded in the image-capturing recording step, and a received-image recording step for recording the image-captured image received in the receiving step so as to be associated with the particular image-captured image recorded in the image-capturing recording step based on the collation result in the collating step.

Also, the image capturing method further comprises a standby-instruction receiving step for receiving a standby instruction to be transmitted from the external device, and a recording preparation step for performing recording preparation for an image-captured image in response to receiving the standby instruction.

According to the present invention as described above, the first image capturing device image-captures and records the zoomed-in image of a subject, or the overall image in a range including the subject. Subsequently, the first image capturing device transmits a trigger signal to the second image capturing device at the time of image capturing/recording thereof. The second image capturing device image-captures and records the overall image or the zoomed-in image in response to receiving the trigger signal. Then, the first and second image capturing devices enable both of the overall image and the zoomed-in image to be obtained at the same timing.

For example, let us say that one of the first and second image capturing devices is a still camera or video camera possessed by a common user, and the other is a still camera or video camera installed by a service dealer. For example, if we say that the camera possessed by a user is the first image capturing device, as long as the user arbitrarily captures desired images, the overall image at the same timing as those images is image-captured/recorded by the second image capturing device at the dealer side, and consequently, the user can obtain both of the images.

According to the present invention, image capturing/recording of a still image or moving image is performed at the first image capturing device, whereby the still image or moving image at the same timing thereof or the same time zone thereof can be image-captured/recorded at the second image capturing device. Accordingly, the zoomed-in image of a certain subject can be obtained at one of the first and second image capturing devices, and the image wherein the overall including the subject is image-captured can be obtained at the other. Of course, regardless of an overall image and zoomed-in image, the images wherein the first and second image capturing devices capture a particular subject with a different angle simultaneously can be obtained.

A user employs such an image capturing system, whereby the user can easily obtain various types of image-captured images.

For example, as long as a user possessing the first image capturing device image-captures the desired images of a subject such as his/her child or the like at an athletic meet or the like concentrating on the desired images, there is no need to take the overall image into consideration. This is because the overall image is image-captured by the second image capturing device prepared by a service dealer. Moreover, the overall image recorded at the second image capturing device side is an image synchronized with the above user's arbitrary shutter timing, whereby the user can obtain the image-captured image at the desired timing. The user ultimately obtains an image recorded at the second image capturing device side, whereby the user can obtain a satisfactory image-captured image along with the image image-captured by himself/herself.

Also, in the event of a common user side possessing the second image capturing device, image capturing/recording is performed by a trigger from the first image capturing device at the service dealer side. This allows the common user side to execute appropriate image capturing in the event of the service dealer side understanding appropriate shutter timing, and also this case can ultimately provide simultaneous various images to the user.

It is needless to say that the image capturing system according to the present invention (first and second image capturing devices) are not restricted to those used by a common user and a service dealer, for example, even if the first and second image capturing devices are used by common users, various and satisfactory images can be obtained.

BRIEF DESCRIPTION OF THE DRAWINGS

FIG. 4 is an explanatory diagram of an image recorded with the first embodiment.

FIG. 11 is a block diagram of a common camera and local camera according to a fourth embodiment.

FIG. 14 is a block diagram of a common camera and local camera according to a fifth embodiment.

FIG. 33 is a block diagram of a common camera and local camera according to a twelfth embodiment.

FIG. 36 is a block diagram of a common camera and local camera according to a thirteenth embodiment.

FIG. 39 is a block diagram of a common camera and local camera according to a fourteenth embodiment.

FIG. 44 is an explanatory diagram of an image recorded with the fifteenth embodiment.

BEST MODE FOR CARRYING OUT THE INVENTION

Hereafter, for example, assuming that still cameras, video cameras, and so forth employed by general users are local cameras, and a camera making up a system in collaboration with the local cameras is a common camera, embodiments of the present invention will be described in the following sequence using a system made up of the local cameras and the common camera as an example.

1. System overview using common cameras and local cameras
2. Embodiments for performing trigger transmission from local cameras
   - 2-1. First embodiment
   - 2-2. Second embodiment
   - 2-3. Third embodiment
   - 2-4. Fourth embodiment
   - 2-5. Fifth embodiment
   - 2-6. Sixth embodiment
   - 2-7. Seventh embodiment
   - 2-8. Eighth embodiment
   - 2-9. Ninth embodiment
   - 2-10. Tenth embodiment
   - 2-11. System pattern examples of local cameras and common cameras
3. Embodiments for performing trigger transmission from common cameras
   - 3-1. Eleventh embodiment
   - 3-2. Twelfth embodiment
   - 3-3. Thirteenth embodiment
   - 3-4. Fourteenth embodiment
   - 3-5. Fifteenth embodiment
   - 3-6. Sixteenth embodiment
   - 3-7. Seventeenth embodiment
   - 3-8. Eighteenth embodiment
   - 3-9. Nineteenth embodiment
   - 3-10. Twentieth embodiment
   - 3-11. Standby instruction to be applied to Eleventh through Twentieth embodiments
   - 3-12. System pattern examples of local cameras and common cameras
4. Modifications

1. Image Capturing System Overview Using Common Cameras and Local Cameras

Figure 1:
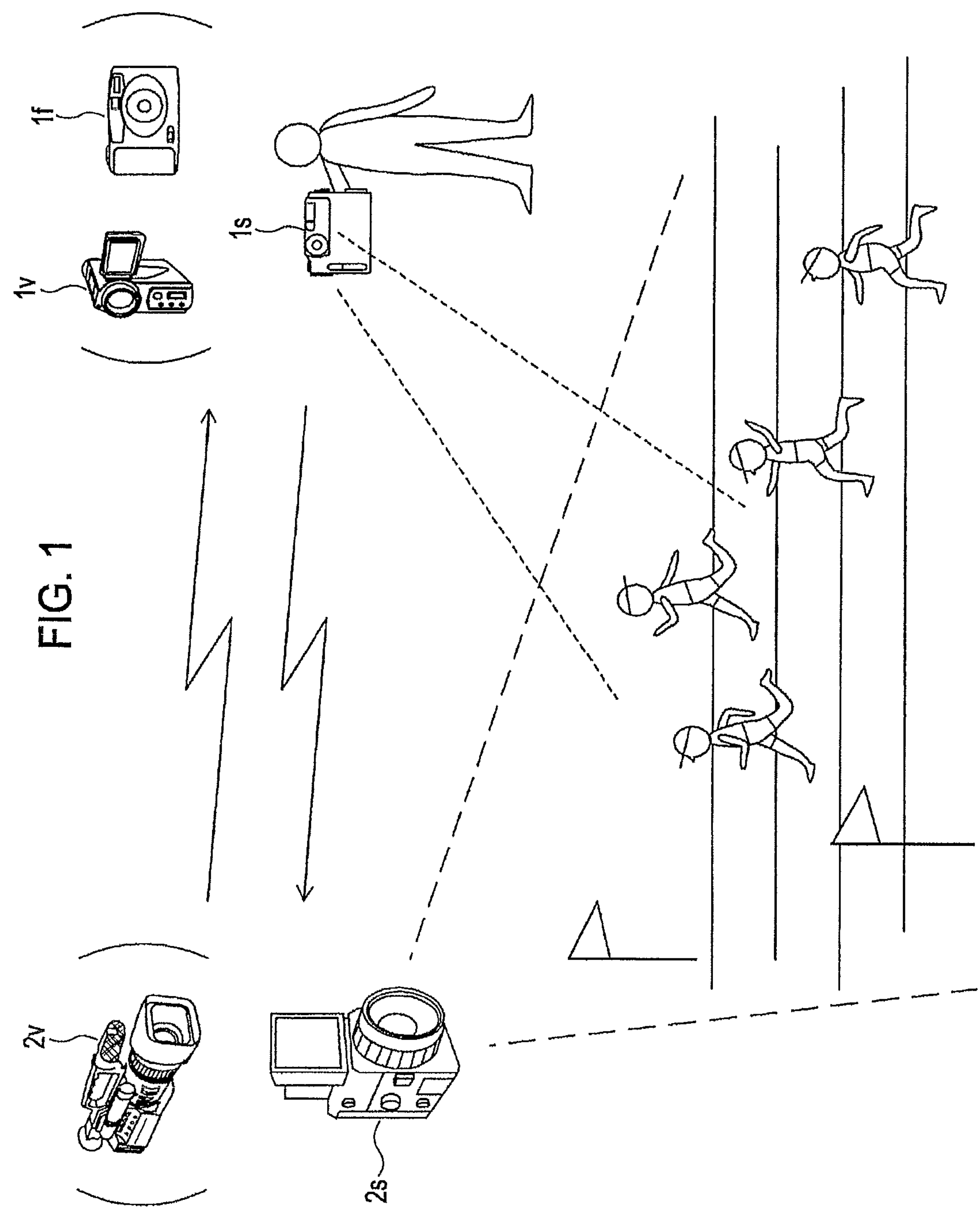
FIG. 1 is an explanatory diagram of an image capturing system according to an embodiment of the present invention.

FIG. 1 illustrates an example employing an image capturing system according to the present example. The image capturing system according to the present example comprises, for example, a common camera 2 serving as an image capturing device to be installed at an athletic meet, an event site, or the like by a service dealer, and a local camera 1 serving as an image capturing device with which a user performs image capturing by himself or herself.

As for a local camera 1, a still camera 1*s* for performing image capturing of still images, a video camera 1*v* for performing image capturing of moving images (sometimes including a still-image image capturing function), and further a silver-salt camera 1*f* for subjecting a silver-salt film to image capturing (photography) can be employed.

As for a common camera 2, a still camera 2*s* for performing image capturing of still images, and a video camera 2*v* for performing image capturing of moving images (sometimes including a still-image image capturing function) can be employed.

Hereinafter, let us say that description as "local camera 1*s*" indicates that the local camera thereof is a still camera, and also "local camera 1*v*" and "local camera 1*f*" indicate that the local camera thereof is a video camera or silver-salt camera.

Similarly, let us say that the descriptions "common camera 2*s*" and "common camera 2*v*" indicate that the respective common cameras are a still camera, and a video camera, respectively.

FIG. 1 illustrates an example wherein a user is performing image capturing using his/her own local camera 1 (1*s*, 1*v*, or 1*f*) arbitrarily. For example, this is, in a state in which his/her own child is zoomed in, image capturing such as pursuing action of the child. That is to say, this is image capturing which a common user usually performs.

Note that let us say that pictures to be subjected to image capturing/recording at the local camera 1 are "local pictures".

On the other hand, the common camera 2 (2*s* or 2*v*) is installed at a predetermined location of a school where this athletic meet is held, e.g., such as within the schoolhouse, the rooftop, or the like, at a place where a bird's eye view of the overall competition performed at an athletic field can be image-captured.

With this common camera 2, for example, the pictures of the overall competition are image-captured. Let us say that the images image-captured/recorded at the common camera side are referred to as "common images".

Let us say that between the local camera 1 and the common camera 2 is communicable. Details thereof will be described later as respective embodiments, but for example, a trigger signal is transmitted from the local camera 1 to the common camera 2.

The local camera 1 performs image capturing of a local image in response to the shutter operation of the user, records this in recording media, and also transmits a trigger signal.

The common camera 2 performs image capturing of a common image in response to receiving the trigger signal, and records this in recording media.

Then, in this case, let us say that the local image of an arbitrary subject selected by the user (e.g., his/her own child) is recorded in the recording media at the local camera 1 side, and the common image of a subject (e.g., overall competition) is recorded in the recording media at the common camera 2 side at the timing when the user performs image capturing of a local image.

That is to say, from the perspective of the user, upon continuing image capturing of his/her own child at the athletic meet for example, image capturing of the images of the overall competition are performed at the common camera 2 side at the timing when the user performs image capturing thereof. Accordingly, the user can obtain a different image (e.g., overall image, different-angle image, etc.) at the shutter timing determined by himself/herself by obtaining the common image recorded at the common camera 2 side later, whereby various images which are beneficial to the user can be readily obtained.

Also, though described later, an arrangement may be made wherein the common camera 2 side transmits a trigger signal to the local camera 1. At attractions such as at an event, theme park, or the like, the service dealer side may know the appropriate shutter timing beforehand in some cases.

In this case, the common camera 2 side performs image capturing/recording of an image at appropriate timing, and also transmits a trigger signal to the local camera 1. Thus, for example, the overall common image, and the local image arbitrarily selected by the user side can be obtained at the most appropriate shutter timing. In this case as well, a common image at the common camera 2 side is provided to the user, whereby the user can obtain various satisfactory images.

2. Embodiments for Performing Trigger Transmission from Local Cameras 2-1. First Embodiment Hereafter, the first through tenth embodiments are examples assuming that the local camera 1 is the first image capturing device described in the Claims of the present invention, and the common camera 2 is the second image capturing device.

The first embodiment is an example assuming that the local camera 1 and the common camera 2 are all still cameras, which will be described with reference to FIG. 2, FIG. 3, and FIG. 4.

Figure 2:
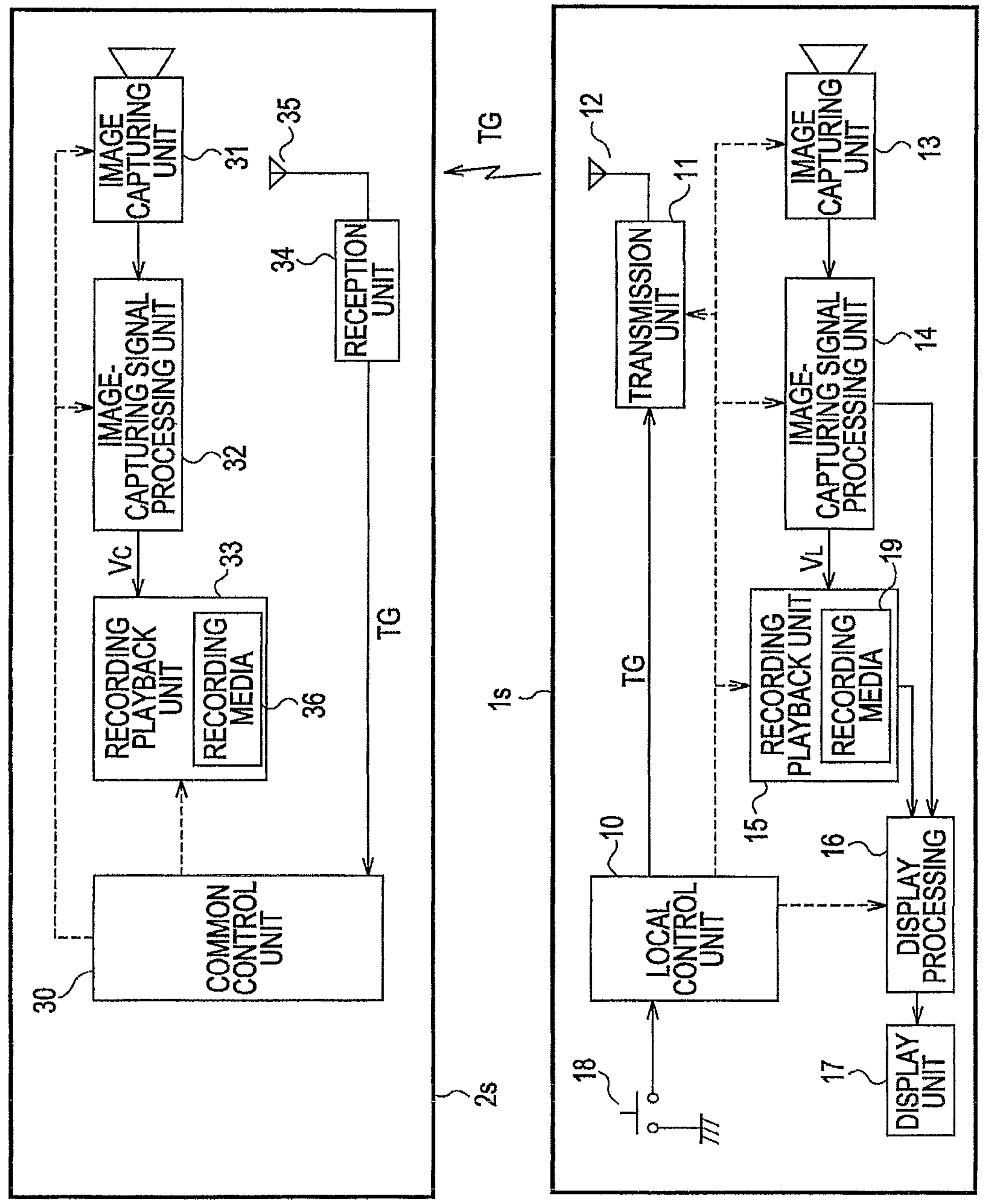
FIG. 2 is a block diagram of a common camera and local camera according to a first embodiment.

FIG. 2 illustrates the configurations of the local camera 1*s* and the common camera 2*s*, according to the first embodiment.

The local camera 1*s* is provided with a local control unit 10, a transmission unit 11, an antenna 12, an image capturing unit 13, an image-capturing signal processing unit 14, a recording playback unit 15, a display processing unit 16, a display unit 17, and a shutter switch 18. Note that though not illustrated in the drawing, configurations usually necessary for a still camera other than those are included.

The local control unit 10 is made up of a micro computer, and performs control of the respective units within the local camera 1*s* based on an operation program held in internal memory. The dotted-line arrow illustrates supply of a control signal to the respective units by the local control unit 10.

For example, the local control unit 10 gives an operation instruction necessary for each of the respective units in response to a power on/off operation, zoom in/out operation, display mode operation, and playback operation by unshown operators, a shutter operation by the shutter switch 18, or the like.

The image capturing unit 13 includes a lens system made up of an image capturing lens, a zoom lens, a diaphragm, and so forth, and a driving system for driving a focusing operation and zooming operation as to the lens system. Also, the image capturing unit 13 includes a CCD (Charge Coupled Device) sensor array or CMOS sensor array serving as an image capturing device for detecting the image capturing light obtained at the lens system, and generating an image capturing signal by performing photoelectric conversion. Also, the image capturing unit 13 includes a vertical/horizontal scan circuit for reading out a pixel signal from the image capturing device unit, a sample-and-hold/AGC (Automatic Gain Control) circuit for subjecting the signal read out from the image capturing device unit to gain adjustment and waveform shaping, an A/D converter, and so forth. The image capturing unit 13 outputs digital image data as an image signal wherein a subject is image-captured by those configurations.

The readout operation of an image capturing signal, the focus/zoom driving system operation, signal processing, and so forth, at the image capturing unit 13 are controlled by the local control unit 10 in response to a user operation and so forth.

The image-capturing signal processing unit 14 subjects the image-captured image signal to be output from the image capturing unit 13 to various types of signal processing. For example, the image-capturing signal processing unit 14 performs white balance adjustment, clamp processing, correction processing, luminance processing, color difference processing, and so forth.

Further, the image-capturing signal processing unit 14 subjects an image-captured image signal to compression encoding processing and format processing, generates an image signal (local image VL) to be recorded in the recording media 19 at the recording playback unit 15, and generates an image signal to be displayed at the display unit 17.

As for compression encoding processing, for example, MPEG (Moving Picture Experts Group) method, JPEG (Joint Photographic Experts Group) method, or other compression method is performed.

Also, in this case, the local camera 1*s* is a still Camera, so the image-capturing signal processing unit 14 supplies, of moving-image signals (continuous frame image signals) obtained at the image capturing unit 13, a frame image signal at the timing based on the control of the local control unit 10, i.e., at the timing wherein the shutter switch 18 is pressed to the recording playback unit 15.

Also, at the point of the user searching or aiming at a subject, the user confirms the situation of the subject using the display unit 17 such as a view finder, liquid crystal panel, or the like, and therefore, the image-capturing signal processing unit 14 supplies an image signal as a moving image to the display processing unit 16.

The recording playback unit 15 performs processing for recording the local image VL from the image-capturing signal processing unit 14 in the recording media 19 based on the control of the local control unit 10. Recording of an image-captured image is performed in response to the shutter operation by the user. In response to the shutter switch 18 being pressed by the user, the local control unit 10 controls the recording playback unit 15 to execute recording of the local image VL in the recording media 19.

As for the recording media 19, for example, a recording medium having portability such as a detachable memory card built in a solid memory, optical disc, magneto-optical disk, magnetic disk, magnetic tape, and so forth, or a recording medium fixedly disposed within the device such as built-in solid memory, hard disk (HDD), and so forth may be employed.

The recording playback unit 15 records the local image VL and information attached thereto in the recording media 19 so as to correspond to the media type employed for the recording media 19, and also includes a mechanism and circuits for playback.

For example, in the event that the recording media 19 is a disk recording medium, the recording playback unit 15 includes a driving system such as an insertion/ejection mechanism, recording playback head, spindle motor, and so forth corresponding to a disk media 90 for example, a servo system, and so forth. Also, in the event that the recording media 19 is a medium such as a memory card or the like, the recording playback unit 15 includes a connection mechanism (card slot, etc.), and an access and interface circuit system, as to a memory card.

Also, the recording playback unit 15 performs playback of the local image VL recorded in the recording media 19 based on the control of the local control unit 10. Subsequently, the recording playback unit 15 supplies the played local image VL to the display processing unit 16.

The display processing unit 16 subjects the recording format of the played local image VL to decoding processing, error correction processing, decompression processing, and so forth, and also subjects the played local image VL to luminance/color signal processing, RGB processing, gain adjustment, and so forth for display, and supplies the local image VL to the display unit 17.

The display unit 17 is a display unit provided in the local camera 1*s* as a view finder type or liquid crystal panel type or the like, and is a display unit for allowing the user to perform monitoring of a subject being image-captured, and monitoring of a playback picture.

In the event that the local camera 1*s* is set to an image capturing mode, the moving data of the subject from the image-capturing signal processing unit 14 is processed at the display processing unit 16, and is displayed on the display unit 17.

In the event that the local camera 1*s* is set to a playback mode, the still-image image data played back at the recording playback unit 15 is processed at the display processing unit 16, and is displayed on the display unit 17.

The transmission unit 11 and antenna 12 wirelessly transmits data to an external device, particularly to the common camera 2*s* based on the control of the local control unit 10. In the case of the present example, the local control unit 10 controls the transmission unit 11 to transmit a trigger signal TG.

Note that though not shown in the drawing, it is reasonably anticipated to provide various types of interface as to an external personal computer, audio/video apparatus, and other devices in the local camera 1*s* to enable image data and other various types of data to be input/output.

The common camera 2*s* includes a common control unit 30, an image capturing unit 31, an image-capturing signal processing unit 32, a recording playback unit 33, and a reception unit 34.

Note that those are illustrated as units which will be necessary so as to correspond to the later-described characteristic operation of the present example, but other than those, though not illustrated in the drawing, the common camera 2*s* also includes a monitor display unit or an operating unit to be provided as a normal still camera, and other necessary configurations.

The common control unit 30 is made up of a micro computer, and performs control of the respective units within the common camera 2*s* based on operations by the unshown operating unit, and an operation program held in the internal memory. The dotted-line arrow illustrates supply of a control signal to the respective units by the common control unit 30.

For example, the common control unit 30 gives a necessary operation instruction to the respective units in response to an operation such as a power on/off operation, zoom in/out operation, display mode operation, playback operation, shutter operation, and so forth.

The image capturing unit 31 includes a lens system made up of an image capturing lens, a zoom lens, a diaphragm, and so forth, and a driving system for driving a focusing operation and zooming operation as to the lens system. Also, the image capturing unit 31 includes a CCD (Charge Coupled Device) sensor array or CMOS sensor array serving as an image capturing device for detecting the image capturing light obtained at the lens system, and generating an image capturing signal by performing photoelectric conversion. Also, the image capturing unit 31 includes a vertical/horizontal scan circuit for reading out a pixel signal from the image capturing device unit, a sample-and-hold/AGC (Automatic Gain Control) circuit for subjecting the signal read out from the image capturing device unit to gain adjustment and waveform shaping, an A/D converter, and so forth. The image capturing unit 31 outputs digital image data as an image signal wherein a subject is image-captured by those configurations.

The readout operation of an image capturing signal, the focus/zoom driving system operation, signal processing, and so forth, at the image capturing unit 31 are controlled by the common control unit 30 in response to a user operation and so forth.

The image-capturing signal processing unit 32 subjects the image-captured image signal to be output from the image capturing unit 31 to various types of signal processing. For example, the image-capturing signal processing unit 32 performs white balance adjustment, clamp processing, correction processing, luminance processing, color difference processing, and so forth.

Further, the image-capturing signal processing unit 32 subjects an image-captured image signal to compression encoding processing and format processing, generates an image signal (common image Vc) to be recorded in the recording media 36 at the recording playback unit 33, and generates an image signal to be displayed at an unshown display unit.

As for compression encoding processing, for example, MPEG (Moving Picture Experts Group) method, JPEG (Joint Photographic Experts Group) method, or other compression method is performed.

Also, in this case, the common camera 2*s* is a still camera, so the image-capturing signal processing unit 32 supplies, of moving-image signals (continuous frame image signals) obtained at the image capturing unit 31, a frame image signal at the timing based on the control of the local control unit 30 to the recording playback unit 33. Though description will be made later, at the common camera 2*s* side the common control unit 30 handles the timing when the trigger signal TG is transmitted from the local camera 1*s* as shutter timing, and controls the image-capturing signal processing unit 32.

Note that as for a view finder, liquid crystal panel, and so forth, for example, serving as an unshown display unit, the image-capturing signal processing unit 32 supplies an image signal as a moving image to the display processing system of the display unit to monitor the situation of a subject.

The recording playback unit 33 performs processing for recording the common image Vc from the image-capturing signal processing unit 32 in the recording media 36 based on the control of the common control unit 30. Recording of an image-captured image is performed in response to receiving of the trigger signal TG. That is to say, in response to receiving of the trigger signal TG, the common control unit 30 controls the recording playback unit 33 to execute recording of the common image Vc in the recording media 36. Note that it is needless to say that recording can be performed in response to a shutter operation of an unshown operating unit.

As for the recording media 36, as with the case of the local camera 1*s*, for example, a recording medium having portability such as a detachable memory card built in a solid memory, optical disc, magneto-optical disk, magnetic disk, magnetic tape, and so forth, or a recording medium fixedly disposed within the device such as built-in solid memory, hard disk (MD), and so forth may be employed.

The recording playback unit 33 records the common image Vc and information attached thereto in the recording media 36 so as to correspond to the media type employed for the recording media 36, and also includes a mechanism and circuits for playback.

Also, the recording playback unit 33 supplies the image played back from the recording media 36 to the display processing system so as to display that image on the unshown display unit.

The reception unit 34 and antenna 35 are provided as a reception system corresponding to wireless transmission from the local camera 1*s*. In the case of the present example, the trigger signal TG is transmitted from the local camera 1*s*, and the reception unit 34 and antenna 35 receive this to supply this to the common control unit 30.

Note that it is reasonably anticipated to provide various types of interface as to an external personal computer, audio/video apparatus, and other devices in the common camera 2*s* to enable image data and other various types of data to be input/output.

With such a local camera 1*s* and common camera 2*s*, the characteristic operations of the present example will be described with reference to FIG. 3.

Figure 3:
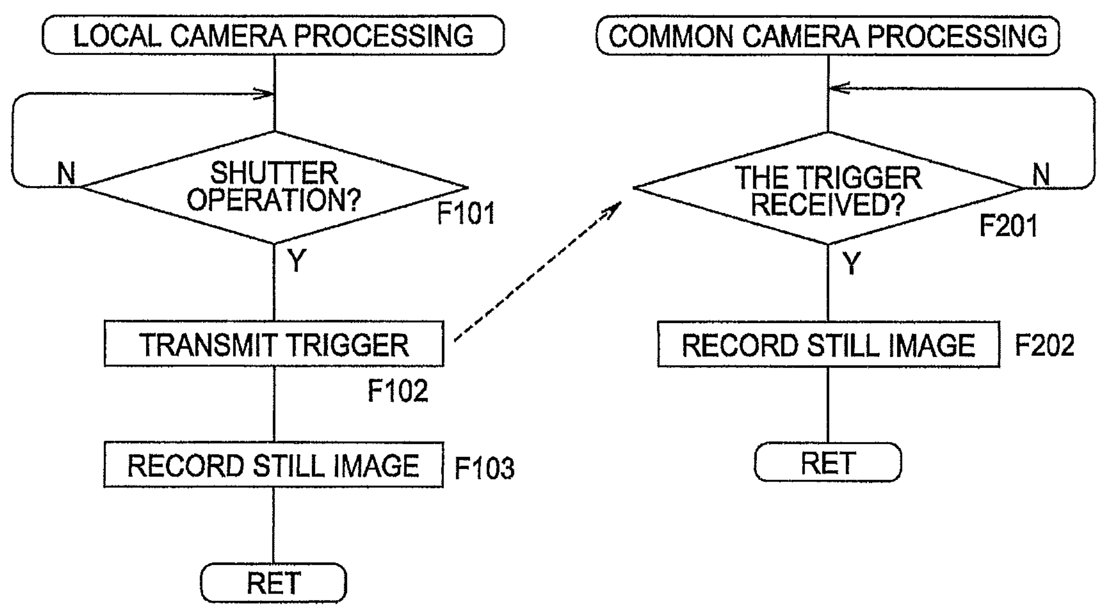
FIG. 3 is a flowchart of processing according to the first embodiment.

FIG. 3 illustrates the processing in the case of recording an image-captured image as the processing of the local control unit 10 and the processing of the common control unit 30. Note that the processing in FIG. 3 is performed in the case in which power is applied to both of the local camera 1*s* and the common camera 2*s*, and also is in a state in which image capturing (monitor display) of a subject is performed as the image capturing mode (i.e. a state awaiting shutter timing).

Upon detecting operation of the shutter switch 18 by the user in step F101, the local control unit 10 controls the transmission unit 11 to transmit a trigger signal TG in step F102.

Simultaneously, the local control unit 10 performs still-image recording control in step F103. That is to say, the local control unit 10 controls the image-capturing signal processing unit 14 and the recording playback unit 15 to execute recording of an image-captured image (local image VL) at the shutter timing.

On the other hand, the common control unit 30 monitors that the trigger signal TG is received by the reception unit 34 as step F201, and upon the trigger signal TG being received, the common control unit 30 performs still-image recording control in step F202. That is to say, the common control unit 30 controls the image-capturing signal processing unit 32 and the recording playback unit 33 to execute recording of an image-captured image (common image Vc) at the trigger-received timing.

According to this processing, the user performs a shutter operation at the local camera 1*s*, whereby image capturing/recording of an image-captured image is performed at the common camera 2*s* at the same timing. That is to say, with the local camera 1*s* and the common camera 2*s*, capturing/recording of an image-captured image is performed at the same timing.

Now, let us say that with the local camera 1*s*, the user aims at his/her own child as a subject at an athletic meet or the like, and a shutter operation is performed at certain timing. On the other hand, the common camera 2*s* side is always aiming at the overall athletic meet as a subject.

In this case, for example, when assuming that the user performed image capturing/recording of the local image VL such as FIG. 4(*a*) with the local camera 1*s*, the common camera 2*a* side records the overall sight of a competition such as FIG. 4(*b*) as the common image Vc, in response to the trigger signal TG at the image capturing timing thereof.

That is to say, with the local camera 1*s*, the sight personally selected by the user is subjected to image capturing/recording as the local image VL, and with the common camera 2*s*, the overall sight at the same timing as the local image VL is subjected to image capturing/recording as the common image Vc.

FIGS. 4(*c*) and (*d*) illustrate the recording states of the recording media 19 within the recording playback unit 15 at the local camera 1*s* side, and the recording media 36 within the recording playback unit 33 at the common camera 2*s* side. For example, let us say that as illustrated in FIG. 4(*c*), the user of the local camera 1*s* performed a shutter operation at an arbitrary timing, thereby the local images VL1, VL2, and VL3 were recorded in the recording media 19.

In this case, a state at the common camera 2*s* side becomes a state in which the common images Vc1, Vc2, and Vc3 are recorded in the recording media 36. The common images Vc1, Vc2, and Vc3 become the images recorded at the same timing as the local images VL1, VL2, and VL3, respectively.

As described above, with the present example, for example, as long as the user simply performs a shutter operation at an arbitrary timing using the local camera 1*s* to record an image-captured image, at the common camera 2*s* side another image, for example, such as the image of the overall sight, a different-angle image, and so forth, i.e., the image selected as a subject at the common camera 2*s* side is recorded.

The user can obtain a various and satisfactory image by obtaining the common image Vc recorded at the common camera 2*s* side using some sort of method.

For example, upon assuming that the common camera 2*s* is installed by a service dealer, it is only necessary for the user to purchase the common image Vc from the service dealer. Of course, if a common user also possesses the common camera 2*s*, it is only necessary for the user to install the common camera 2*s* by himself/herself, and execute image capturing/recording synchronously with the local camera 1*s*.

2-2. Second Embodiment

Similarly, with an example wherein the local camera 1 and the common camera 2 are both still cameras, the second embodiment will be described with reference to FIG. 5, FIG. 6, and FIG. 7.

Note that with the respective embodiments described below, the same reference numerals are appended to the same function portions as the above described embodiment, and redundant description thereof will be avoided.

With the first embodiment, let us say that image capturing/recording of the common image Vc is executed at the common camera 2*a* side synchronously with the local camera 1*s*, and for example, it is only necessary for the user of the local camera 1*s* to obtain the common image Vc with some kind of method later.

Here, in the event that the user of the local camera 1*s* also possesses the common camera 2*s* as described above, the user can obtain the common image Vc without any problem.

Also, even in the event that a service dealer provides the common camera 2*s*, as long as a system is established with the one-on-one relation of the common camera 2*s* and the local camera 1*s*, the common images Vc recorded at the common camera 2*s* are all the images image-captured/recorded synchronously with image capturing/recording at the local camera 1*s*, so in this case, the user of the local camera 1*s* needs to handle all of the common images Vc as objects to be obtained.

However, in the event that the service dealer has installed the common camera 2*s*, and many users possess the local camera 1*s* as thereto, it becomes necessary to distinguish which user each of the respective common images Vc recorded at the common camera 2*s* side corresponds to. That is to say, recording of the common image Vc is performed at the common camera 2*s* side in response to the trigger signal TG to be transmitted from the multiple local cameras is.

Accordingly, with the present example, the identifying information (ID) of the local camera 1*s* is recorded so as to correspond to the common image Vc.

Figure 5:
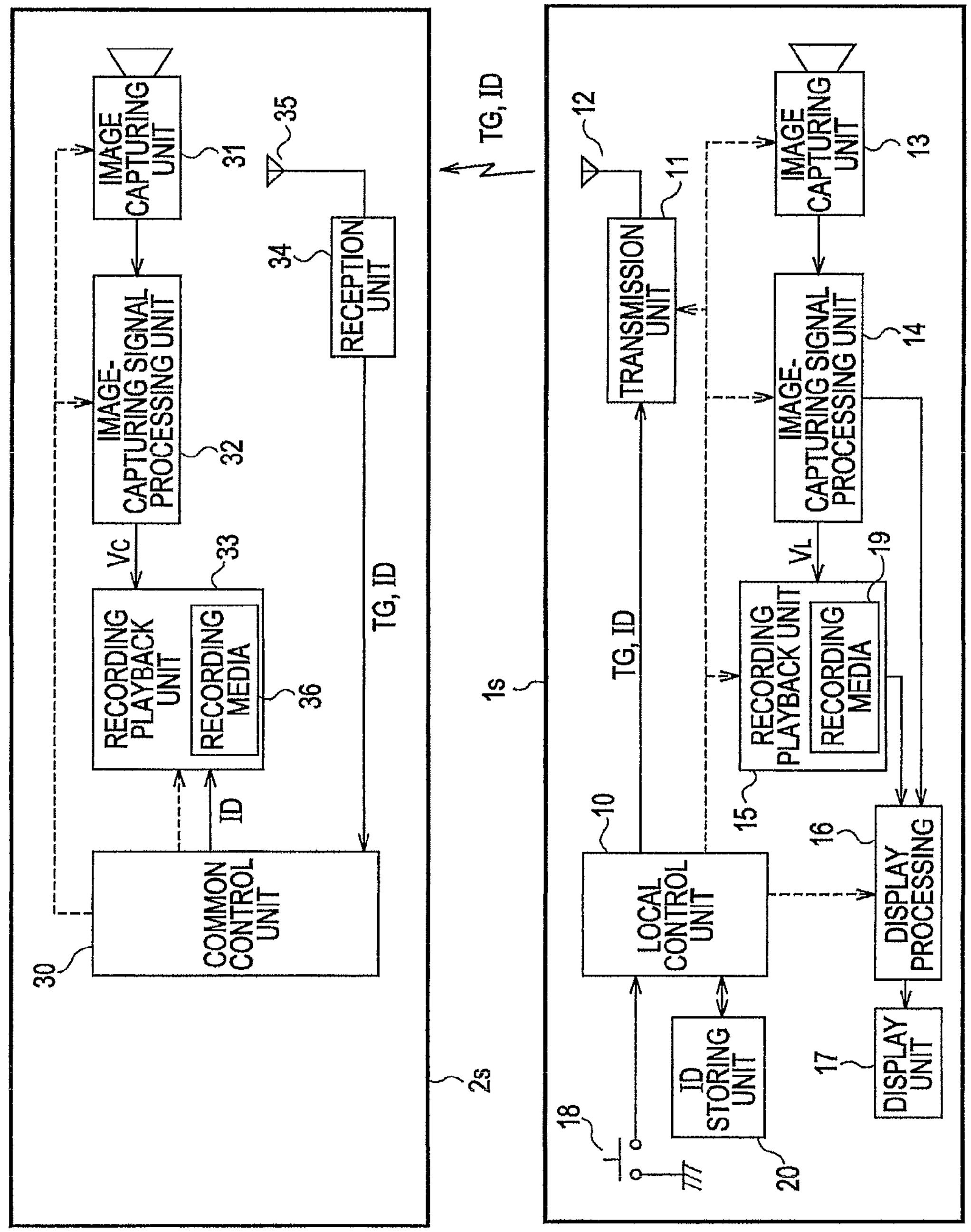
FIG. 5 is a block diagram of a common camera and local camera according to a second embodiment.

Though the configuration is illustrated in FIG. 5, the local camera 1*s* is provided with an ID storing unit 20, and the ID (identifying code information) inherent in the local camera 1*s* thereof is stored therein. This ID may be a serial number or the like to be fixedly provided to an apparatus serving as the local camera 1*s* at the time of manufacturing the apparatus, or may be something which is distributed to a contract user, and is written in the ID storing unit 20. The type of the ID storing unit 20 such as ROM, RAM, flash memory, or the like may correspond to each of the respective ID forms, or may be the internal memory of the micro computer serving as the local control unit 10, of course. Further, the type of the ID storing unit 20 may be removable memory such as a memory card to be mounted on the local camera 1*s*, or a recording medium for recording image-captured images at the local camera 1*s*, which includes memory (so-called memory in cassette (MIC)), or the like.

When transmitting the trigger signal TG from the transmission unit 11, the local control unit 10 also transmits the ID stored in the ID storing unit 20.

At the common camera 2*s* side the reception unit 34 receives the ID along with the trigger signal TG, and hands these to the common control unit 30. The common control unit 30 supplies the ID to the recording playback unit 33 as recorded data, and controls the recording playback unit 33 to record this in the recording media 36 so as to correspond to the common image Vc.

Figure 6:
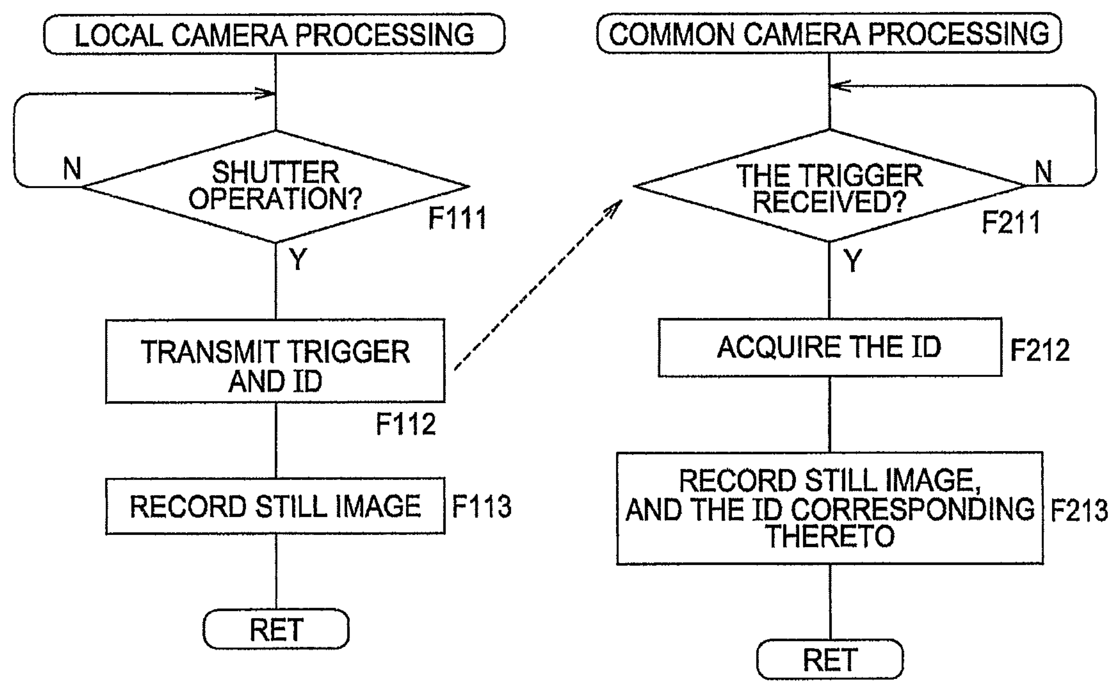
FIG. 6 is a flowchart of processing according to the second embodiment.

FIG. 6 illustrates the processing of the local control unit 10 and the processing of the common control unit 30. This processing, as with the above FIG. 3, is performed in the case wherein the local camera 1*s* and the common camera 2*s* are both supplied with power, and are in a state in which image capturing (monitor display) of a subject is performed as the image capturing mode (i.e., a state of waiting for shutter timing).

Upon detecting the operation of the shutter switch 18 by the user in step F111, the local control unit 10 supplies the ID stored in the ID storing unit 20 to the transmission unit 11 along with the trigger signal TG in step F112, and controls the transmission unit 11 to transmit these.

Subsequently, the local control unit 10 performs still-image recording control of the local image VL in step F113.

On the other hand, the common control unit 30 monitors that the trigger signal TG is received at the reception unit 34 as step F211, and upon the trigger signal TG being received, the common control unit 30 acquires the ID received along with the trigger signal TG as recording data in step F212. Subsequently, in step F213, the common control unit 30 performs recording control of the still image as the common image VC, and the ID corresponding thereto. That is to say, the common control unit 30 controls the image-capturing signal processing unit 32 and the recording playback unit 33 to execute recording of an image-captured image (common image Vc) at the trigger-received timing, and also records the ID in the recording media 36 as appended data as to the common image Vc thereof.

Here, recording of the ID may be performed as to another medium other than the recording media 36. For example, in the event of employing a cassette tape (above-described MIC) including memory as the recording media 36, an arrangement may be made wherein the common image Vc is recorded in the magnetic tape within the cassette, and the ID is similarly recorded in the above memory within the cassette.

According to this processing, the common image Vc is recorded along with the ID of each of the respective local cameras is at the common camera 2*s* side.

Figure 7:
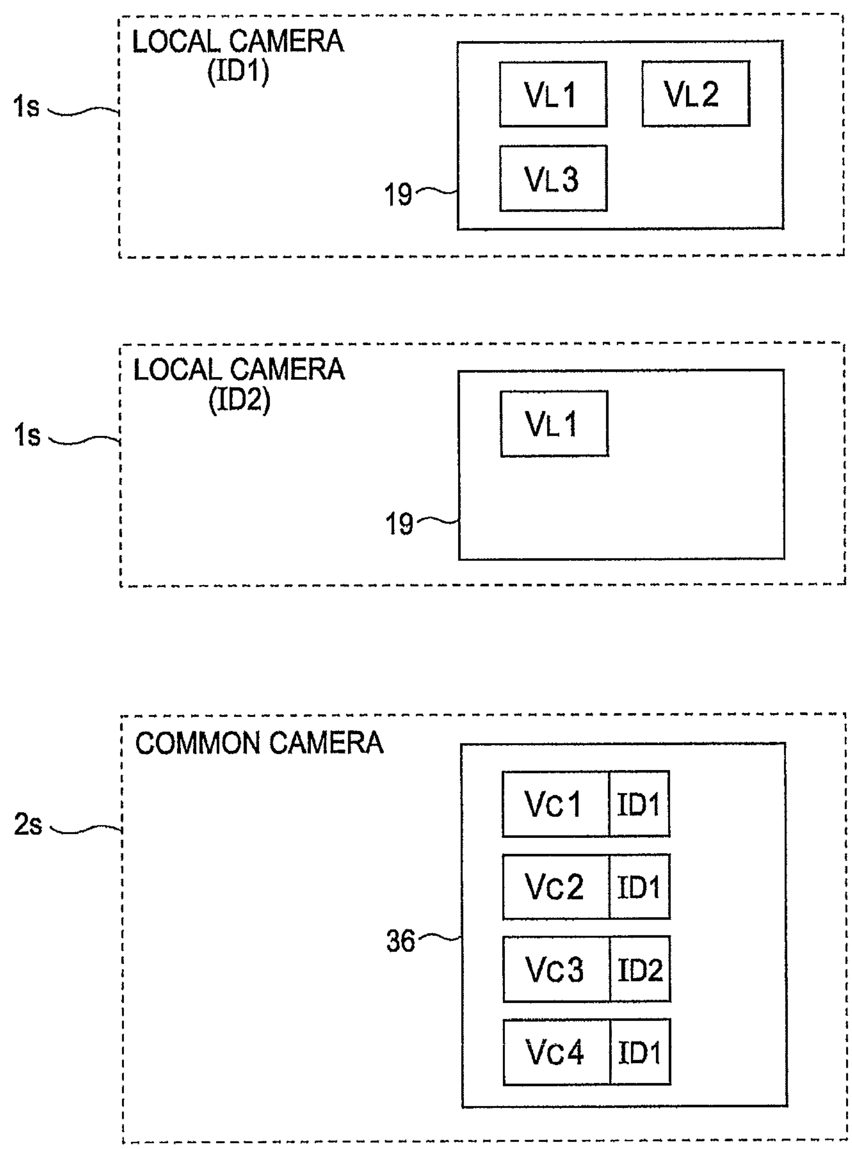
FIG. 7 is an explanatory diagram of an image recorded with the second embodiment.

FIG. 7 illustrates the recording states of images at the two local cameras 1*s* and the common camera 2*s*.

Let us say that with the two local cameras is, an ID1 and ID2 are set to the respective IDs, respectively.

Let us say that with the local camera 1*s* of the ID1, a certain user performed a shutter operation three times, and as illustrated in the drawing, the local images VL1, VL2, and VL3 were recorded in the recording media 19.

Also, let us say that another user possessing the local camera 1*s* of the ID2 performed a shutter operation once, and as illustrated in the drawing, the local image VL1 was recorded in the recording media 19.

At the common camera 2*s*, recording of the common image Vc is performed in response to receiving of the trigger signal TG from each of the local cameras 18, so the four common images Vc1, Vc2, Vc3, and Vc4 are to be recorded in the recording media 36 in response to the trigger signal PG transmitted from the two local cameras 1*s* four times in total.

Here, the ID1 is associated with the common image Vc1 and recorded, the ID2 is associated with the common image Vc2 and recorded, the ID2 is associated with the common image Vc3 and recorded, and the ID1 is associated with the common image Vc4 and recorded, respectively.

That is to say, the common image Vc1 was recorded based on the trigger signal TG at the time of recording of the local image VIA being performed by the local camera 1*s* of the ID1, and the ID1 transmitted simultaneously is appended thereto.

The common image Vc2 was recorded based on the trigger signal TG at the time of recording of the local image VL2 being performed by the local camera 1*s* of the ID1, and the ID1 transmitted simultaneously is appended thereto.

The common image Vc3 was recorded based on the trigger signal TG at the time of recording of the local image VL1 being performed by the local camera 1*s* of the ID2, and the ID2 transmitted simultaneously is appended thereto.

The common image Vc4 was recorded based on the trigger signal TG at the time of recording of the local image VL3 being performed by the local camera 1*s* of the ID1, and the ID1 transmitted simultaneously is appended thereto.

Thus, the ID of the local camera 1*s* is associated with the common image Vc and recorded, whereby it can be understood which local camera 1*s* (user) each of the common images Vc in the recording media 36 should be provided to.

In the case of FIG. 7, the common images Vc1, Vc2, and Vc4 need to be provided to the user of the local camera 1*s* of the ID1, and the common image Vc3 needs to be provided to the user of the local camera 1*s* of the ID2.

Thus, it can be determined which of the multiple local cameras 1*s* each of the common images Vc corresponds to by the IDs, whereby an image service system of which targets are the multiple local cameras 1*s* can be established.

Incidentally, description has been made wherein the ID to be stored in the ID storing unit 20 in the local cameras 1*s* may be an identifying code to be issued by a service dealer other than the serial number of an apparatus and the like.

The service dealer issues the ID corresponding to each of the local cameras 1*s*, whereby it can be employed for business on implementation of the image providing service according to the present image capturing system.

For example, a user who wants to enjoy the service requests issue of an ID of the service dealer who provides the common camera 2*s* beforehand. Subsequently, the ID thereof is stored in his/her own local camera 1*s*. For example, an arrangement may be made wherein a service dealer provides the recoding media 19 in which an ID is recorded, and the local control unit 10 controls the recording playback unit 15 to read in the ID to store this in the ID storing unit 20. Alternately, an arrangement may be made wherein a user downloads an ID from a service dealer via a network such as the Internet or the like, whereby the ID can be stored in the local camera 1*s*. Of course, a user may input the issued ID to the local camera 1*s* by an operation key or the like.

Thus, employing some sort of method allows a user to store the ID issued by a service dealer in the ID storing unit 20.

In the event of a correct ID being transmitted along with the trigger signal TG, the common camera 2*s* side determines it as a trigger signal from an authorized user, and performs recording of the common image Vc.

Employing such a system enables billing accompanying issuing of an ID, and elimination of unauthorized use, to be realized. Further, personal information such as the name, address, mail address, and so forth of a user is associated with the ID at the time of issue of an ID, thereby enabling a later image providing service smoothly, whereby the ID can be effectively employed for managing actual business.

Also, even if an ID is taken as something fixed inherent in an apparatus, the same correspondence can be realized. For example, in the event that a user wants to enjoy an image providing service, the user informs a service dealer of the ID of an apparatus for registration of the ID. At this time, the user may provide personal information, or pay a registration fee.

In the event that the ID correctly registered is transmitted along with the trigger signal TG, the common camera 2*s* side determines that it is a trigger signal from an authorized user, and performs recording of the common image Vc. Thus, the registered user can enjoy the service by the common camera 2*s*, and appropriate business management can be performed.

2-3. Third Embodiment

Similarly, with an example wherein the local camera 1 and the common camera 2 are both still cameras, the third embodiment will be described with reference to FIG. 8, FIG. 9, and FIG. 10.

With the third embodiment, the common camera 2*s* side records various types of meta data so as to be associated with the common image Vc. As for meta data, meta data MTDL to be generated at the local camera 1*s* side, and meta data MTDc to be generated at the common camera 2*s* side can be conceived, but with the present example, let us say that both of the meta data MTDL and MTDc are recorded in the recording media 36 at the common camera 2*s* side so as to be associated with the common image Vc.

Figure 8:
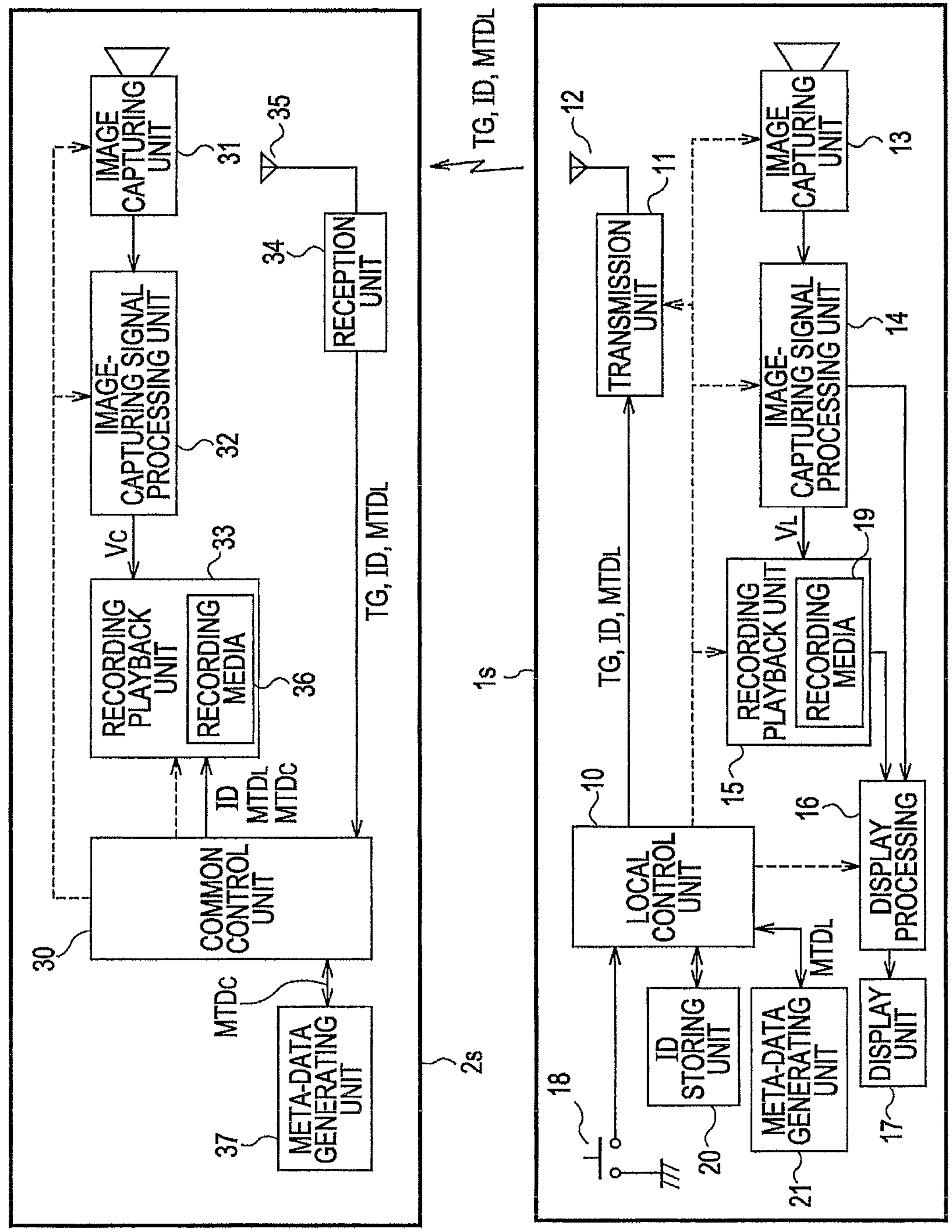
FIG. 8 is a block diagram of a common camera and local camera according to a third embodiment.

FIG. 8 illustrates the configuration thereof.

In addition to the configurations illustrated in FIG. 5, in the case of FIG. 8, a meta-data generating unit 21 is provided in the local camera 1*s*.

When transmitting a trigger signal TG from the transmission unit 11, the local control unit 10 also transmits the ID stored in the ID storing unit 20, and the meta data MTDL to be generated at the meta-data generating unit 21.

At the common camera 2*s* side the reception unit 34 receives the ID and meta data MTDL along with the trigger signal TG, and hands these to the common control unit 30.

Also, a meta-data generating unit 37 is provided in the common camera 2*s*.

The common control unit 30 supplies the received ID, meta data MTDL, and the meta data MTDc generated at the meta-data generating unit 37 to the recording playback unit 15 as recording data, and controls this recording playback unit to store the recording data in the recording media 36 so as to be associated with the common image Vc.

Note that the content examples of the meta data MTDL and MTDc to be generated will be described later.

Figure 9:
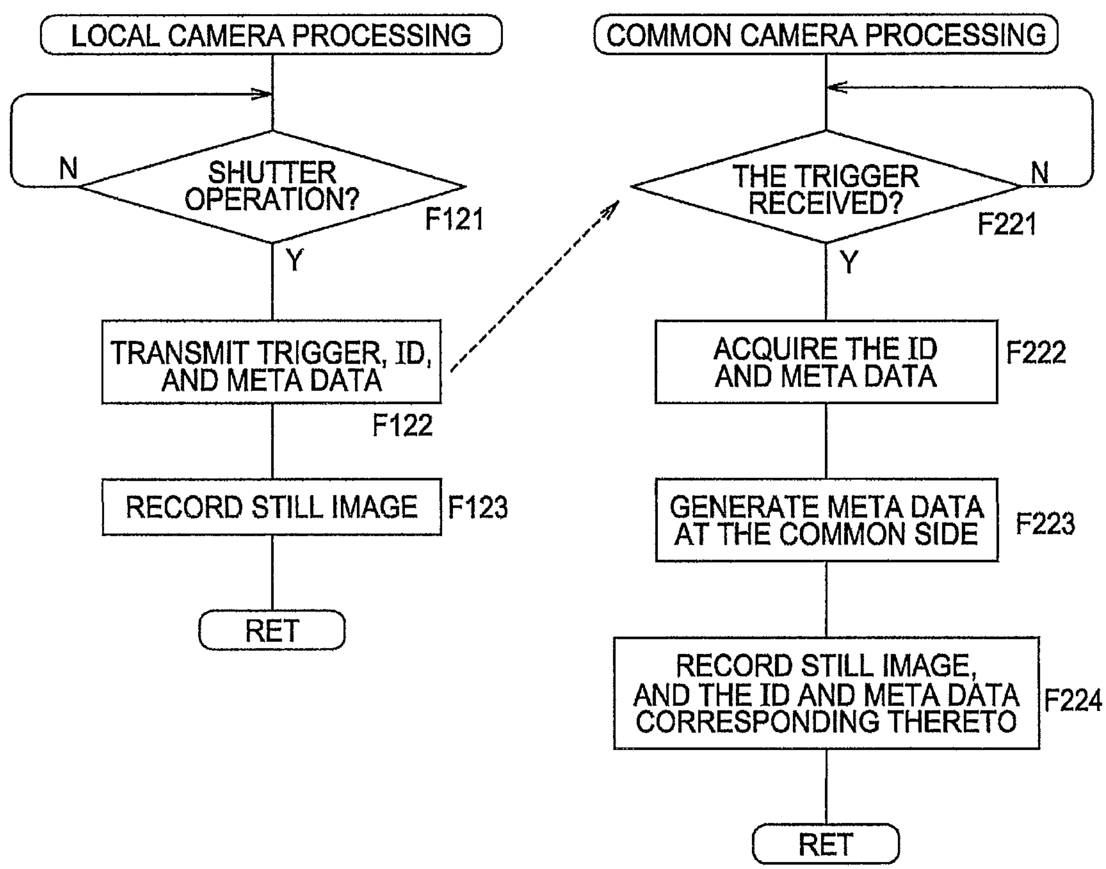
FIG. 9 is a flowchart of processing according to the third embodiment.

FIG. 9 illustrates the processing of the local control unit 10 and the processing of the common control unit 30. This processing, as with the above FIG. 3, is performed in the case wherein the local camera 1*s* and the common camera 2*s* are both supplied with power, and also are in a state in which image capturing (monitor display) of a subject is performed as the image capturing mode (i.e., a state of waiting for shutter timing).

Upon detecting the operation of the shutter switch 18 by the user in step F121, the local control unit 10 supplies the ID stored in the ID storing unit 20, and the meta data MTDL generated at the meta-data generating unit 21 to the transmission unit 11 along with the trigger signal TG in step F122, and controls the transmission unit 11 to transmit these.

Subsequently, the local control unit 10 performs still-image recording control of the local image VL in step F123.

On the other hand, the common control unit 30 monitors that the trigger signal TG is received at the reception unit 34 as step F221, and upon the trigger signal TG being received, the common control unit 30 acquires the ID and meta data MTDL received along with the trigger signal TG as recording data in step F222. Also, in step F223, the common control unit 30 controls the meta-data generating unit 37 to generate meta data MTDL, and acquires the meta data MTDc as recording data.

Subsequently, in step F224, the common control unit 30 performs recording control of the still image as the common image VC, and the ID, meta data MTDL and MTDc corresponding thereto. That is to say, the common control unit 30 controls the image-capturing signal processing unit 32 and the recording playback unit 33 to execute recording of an image-captured image (common image Vc) at the trigger-received timing, and also record the ID, meta data MTDL and MTDc in the recording media 36 as appended data as to the common image Vc thereof.

Here, recording of the ID, meta data MTDL and MTDL may be performed as to another medium other than the recording media 36. For example, in the event of employing the above-described MIC as the recording media 36, an arrangement may be made wherein the common image Vc is recorded in the magnetic tape within the cassette, and the ID, and meta data MTDL and MTDc are similarly recorded in the above memory within the cassette.

According to this processing, the common image Vc is recorded along with the ID and meta data MTDL and MTDc of each of the respective local cameras 1*s* at the common camera 2*s* side.

Figure 10:
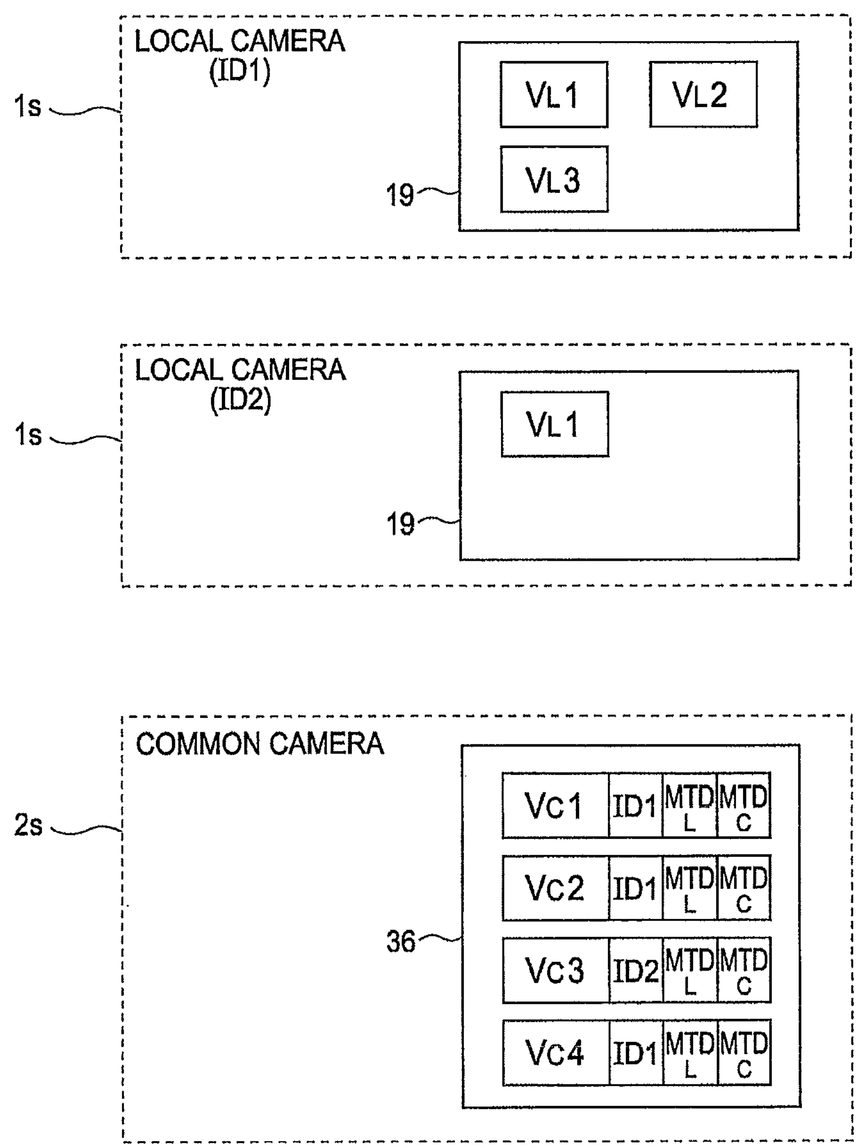
FIG. 10 is an explanatory diagram of an image recorded with the third embodiment.

FIG. 10 illustrates the recording states of images at the two local cameras 1*s* and the common camera 2*s*. As with the above FIG. 7, let us say that with the two local cameras 1*s*, an ID1 and ID2 are set to the respective IDs, and with the local camera 1*s* of the ID1, the local images VL1, VL2, and VL3 were recorded in the recording media 19. Also, let us say that with the local camera 1*s* of the ID2, the local image VL1 was recorded in the recording media 19.

At the common camera 2*s*, recording of the common image Vc is performed in response to receiving of the trigger signal TG from each of the local cameras 1*s*, so the four common images Vc1, Vc2, Vc3, and Vc4 are to be recorded in the recording media 36 in response to the trigger signal TG transmitted from the two local cameras 1*s* four times in total.

Here, the common image Vc1 was recorded based on the trigger signal TG at the time of recording of the local image VL1 being performed by the local camera 1*s* of the ID1, and the ID1 and meta data MTDL transmitted simultaneously, and further the meta data MTDc generated at that time are appended thereto.

The common image Vc2 was recorded based on the trigger signal TG at the time of recording of the local image VL2 being performed by the local camera 1*s* of the ID1, and the ID1 and meta data MTDL transmitted simultaneously, and further the meta data MTDc generated at that time are appended thereto.

The common image Vc3 was recorded based on the trigger signal TG at the time of recording of the local image VL1 being performed by the local camera 1*s* of the ID2, and the ID2 and meta data MTDL transmitted simultaneously, and further the meta data MTDc generated at that time are appended thereto.

The common image Vc4 was recorded based on the trigger signal TG at the time of recording of the local image VL3 being performed by the local camera 1*s* of the ID1, and the ID1 and meta data MTDL transmitted simultaneously, and further the meta data MTDc generated at that time are appended thereto.

The ID of the local camera 1*s* is associated with the common image Vc and recorded, whereby the effects described with the above second embodiment can be obtained.

Further, the meta data MTDL and MTDc is associated with the common image VC and recorded, whereby further various information can be associated with the common image Vc and provided. The content examples of the meta data MTDL and MTDc will be described together.

As for the meta data MTDL to be generated at the meta-data generating unit 21 of the local camera 1*s*, for example, point-in-time information, positional information, the address information of the recording position of the local image VL in the recording media 19, the numbering information (e.g., value indicating which number of photograph) of the local image image-captured this time, the personal information of the user, and so forth can be conceived.

In the event that the meta data MTDL includes point-in-time information, it is only necessary to provide a date-and-time counting circuit in the meta-data generating unit 21.

In the event that the meta data MTDL includes positional information, it is only necessary to provide, for example, a GPS receiver, and a positional information generating circuit in the meta-data generating unit 21 so as to generate the positional information of longitude and latitude.

In the event that the meta data MTDL includes numbering information, it is only necessary to provide, for example, a counter circuit which is counted up in response to recording (shutter operation) in the meta-data generating unit 21.

In the event that the meta data MTDL includes personal information, it is only necessary to provide a storing unit or the like for storing personal information which has been input beforehand in the meta-data generating unit 21.

In the event that the meta data MTDL includes the address information of the recording position of the local image VL in the recording media 19, it is only necessary to employ the internal register of the local control unit 10 as the meta-data generating unit 21. That is to say, this is a register for setting a recording address to instruct the recording playback unit 15.

Of course, various types of information other than those can be conceived as the meta data MTDL.

As for the meta data MTDL, to be generated at the meta-data generating unit 37 of the common camera 2_s_, for example, point-in-time information, positional information, the address information of the recording position of the common image Vc in the recording media 36, the numbering information (e.g., value indicating which number of photograph) of the common image image-captured this time, information such as a title, remarks, and so forth to be provided to the common image Vc, and so forth can be conceived.

In the event that the meta data MTDc includes point-in-time information, it is only necessary to provide a date-and-time counting circuit in the meta-data generating unit 37.

In the event that the meta data MTDc includes positional information, it is only necessary to provide, for example, a GPS receiver, and a positional information generating circuit in the meta-data generating unit 37 so as to generate the positional information of longitude and latitude.

In the event that the meta data MTDc includes numbering information, it is only necessary to provide, for example, a counter circuit which is counted up in response to recording (reception of a trigger) in the meta-data generating unit 37.

In the event that the meta data MTDc includes the address information of the recording position of the local image Vc in the recording media 36, it is only necessary to employ the internal register of the local control unit 30 as the meta-data generating unit 37. That is to say, this is a register for setting a recording address to instruct the recording playback unit 33.

In order that the meta data MTDc includes information such as a title, remarks, and so forth, it is only necessary to provide an information processing unit for processing text information which has been input beforehand, or event program information, and so forth in the meta-data generating unit 21. For example, as long as event progress information serving as an event program or the like has been provided beforehand, determination can be made regarding what kind of content a subject has based on the current point-in-time at the time of receiving a trigger. For example, as long as a program such as an athletic meet, concert, event, or the like, and point-in-time are correctly managed, at the point of recording the common image Vc in response to receiving a trigger, determination can be made regarding what kind of photograph the common image Vc thereof is, such as competition or show or the like. Accordingly, information such as a competition name, the performers of an event, and so forth can be generated as the meta data MTDc.

Of course, various types of information other than those can be conceived as the meta data MTDc.

Various services are available depending on the contents of the meta data MTDL and MTDc.

In the event of including point-in-time information and positional information, an individual photo image can be determined between the user and the service dealer, whereby the common image Vc which the user desires can be selectively provided, for example.

Also, an ID and point-in-time information enables the corresponding relation between the respective local images VL recorded at the user side and the common image Vc to be provided. The local image VL corresponding to each of the common images Vc can be determined at the recording media 36, thereby readily handling even a case wherein there is a request for obtaining the common image Vc corresponding to a part of the local images VL image-captured by the user himself/herself.

In the event that the personal information or the like of the user is recorded as the meta data MTDL, the service dealer side can determine individually the user to be provided with each of the common images Vc.

In the event that a title, contents, and so forth are included in the meta data MTDc, as for the user who received the common image Vc, the meta data MTDc thereof is suitable for the content arrangement of image data.

Thus, advantages relating to service management, convenience at the dealer side, convenience at the user side, and so forth can be obtained depending on the contents of various types of meta data MTDc and MTDL.

Note that an arrangement may be made wherein the meta-data generating unit 21 is not provided at the local camera is side, only the meta data MTDc generated by the meta-data generating unit 37 at the common camera 2_s_ side is associated with the common image Vc and recorded.

Inversely, an arrangement may be made wherein the meta-data generating unit 37 is not provided at the common camera 2_s_ side, only the meta data MTDL generated by the meta-data generating unit 21 at the local camera 1_s_ side is associated with the common image Vc and recorded.

Further, the meta data MTDL generated at the meta-data generating unit 21 may be associated with the local image VL at the recording playback unit 15 at the local camera 1_s_ side and recorded.

2-4. Fourth Embodiment

Similarly, with an example wherein the local camera 1 and the common camera 2 are both still cameras, the fourth embodiment will be described with reference to FIG. 11, FIG. 12, and FIG. 13.

With this fourth embodiment, as with the third embodiment, the common camera 2_s_ side records an ID and various types of meta data so as to correspond to the common image Vc, but in addition to this, the local image VL is also recorded so as to correspond to the common image Vc.

FIG. 11 illustrates the configurations thereof.

In this case, the configurations are almost the same as those illustrated in FIG. 8, but the local camera 1_s_ is configured so as to supply the local image VL and meta data MTDL which played back at the recording playback unit 15 to the transmission unit 11.

When transmitting a trigger signal TG from the transmission unit 11 at the timing of the shutter switch 18 being operated, the local control unit 10 controls the transmission unit 11 to transmit the ID stored in the ID storing unit 20, and the meta data MTDL to be generated at the meta-data generating unit 21 along with the trigger signal TG.

Also, at this time, the local control unit 10 controls the recording playback unit 15 to record the meta data MTDL along with the local image VL.

Further subsequently, the local control unit 10 supplies the ID stored in the ID storing unit 20, the local image VL and meta data MTDL which played back at the recording playback unit 15 to the transmission unit 11 to transmit these.

At the common camera 2*s* side the reception unit 34 receives the ID and meta data along with the trigger signal TG, and hands these to the common control unit 30.

Also, in the event of receiving the ID and meta data MTDL along with the local image VL, the reception unit 34 hands these data to the common control unit 30.

Figure 12:
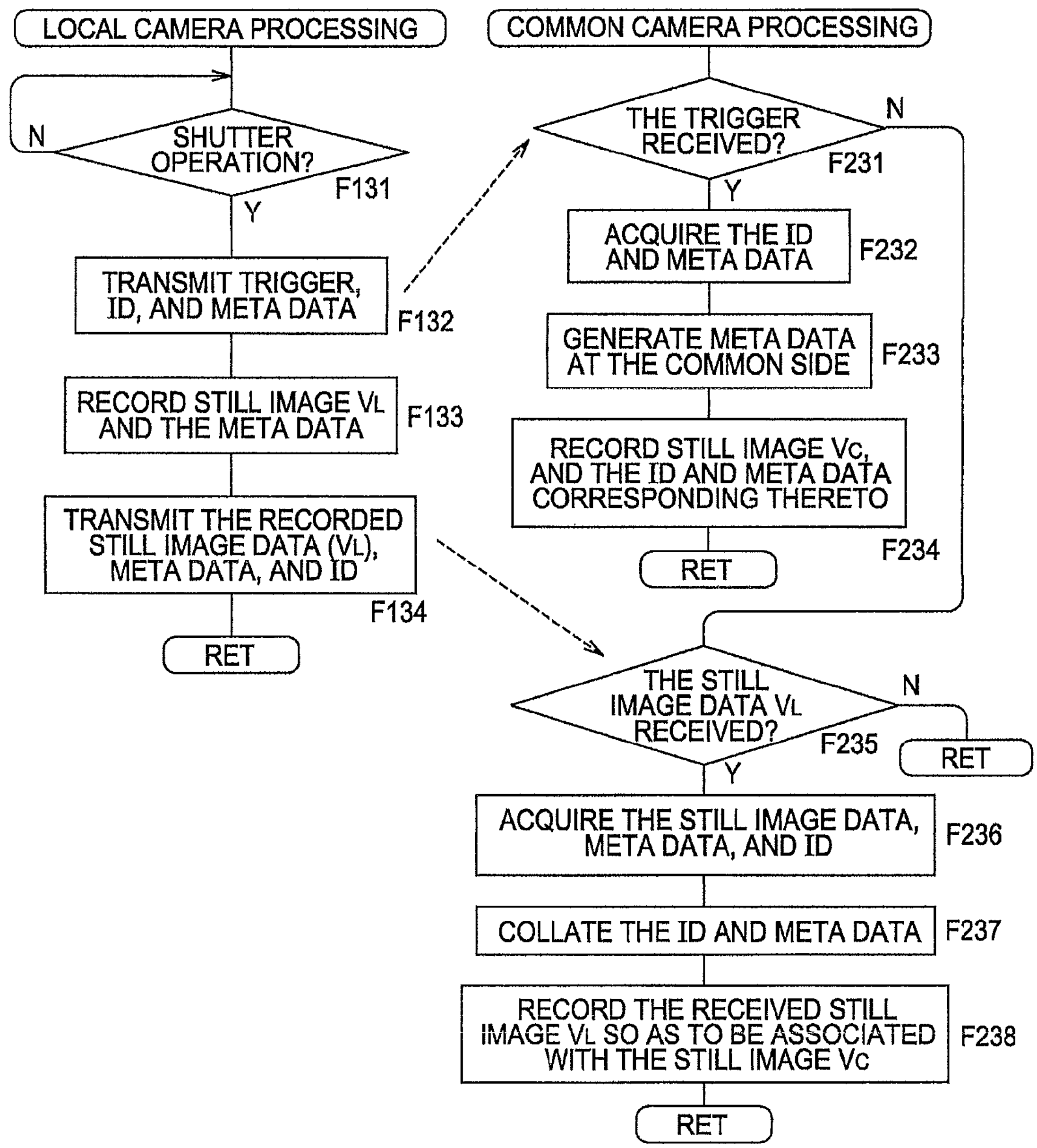
FIG. 12 is a flowchart of processing according to the fourth embodiment.

FIG. 12 illustrates the processing of the local control unit 10 and the processing of the common control unit 30. This processing, as with the above FIG. 3, is performed in the case wherein the local camera 1*s* and the common camera 2*s* are both supplied with power, and also are in a state in which image capturing (monitor display) of a subject is performed as the image capturing mode (i.e., a state of waiting for shutter timing).

Upon detecting the operation of the shutter switch 18 by the user in step F131, the local control unit 10 supplies the ID stored in the ID storing unit 20, and the meta data MTDL generated at the meta-data generating unit 21 to the transmission unit 11 along with the trigger signal TG in step F132, and controls the transmission unit 11 to transmit these.

Subsequently, the local control unit 10 performs still-image recording control of the local image VL in step F133. At this time, the local control unit 10 supplies the meta data MTDL generated and transmitted in the above step F132 to the recording playback unit 15, and controls the recording playback unit 15 to associate this with the local image VL and record this.

Subsequently, in step F134, the local control unit 10 controls the recording playback unit 15 to play back the local image VL and meta data MTDL recorded in the recording media 19, and supply these to the transmission unit 11. Also, at this time, the ID of the ID storing unit 20 is also supplied to the transmission unit 11. Subsequently, the local control unit 10 controls the transmission unit 11 to transmit the local image VL, meta data MTDL, and ID.

On the other hand, the common control unit 30 monitors that the trigger signal TG is received at the reception unit 34 in step F231, and that the data of the local image VD is received at the reception unit 34 in step F235.

At a certain time point, upon confirming reception of the trigger signal TG in step F231, the processing of the common control unit 30 proceeds to step F232, where the common control unit 30 acquires the ID and meta data MTDL received along with the trigger signal TG as recording data.

Subsequently, in step F233, the common control unit 30 controls the meta-data generating unit 37 to generate meta data MTDc, and acquires the meta data MTDc as recording data.

Subsequently, in step F234, the common control unit 30 performs recording control of the still image as the common image Vc, and the ID and meta data MTDL and MTDc corresponding thereto. That is to say, the common control unit 30 controls the image-capturing signal processing unit 32 and the recording playback unit 33 to execute recording of an image-captured image (common image Vc) at the trigger-received timing, and also record the ID and meta data MTDL and MTDc in the recording media 36 as appended data as to the common image Vc.

Subsequently, the processing returns to the reception monitoring loop in steps F231 and F235.

At a certain time point, upon confirming reception of the local image VL in step F235, the processing of the common control unit 30 proceeds to step F236, where the common control unit 30 acquires the still-image data as the local image VL, and the ID and meta data MTDL received along with the local image VL.

Next, the common control unit 30 collates the ID and meta data MTDL in step F237, and determines which common image Vc the received local image VL corresponds to.

In the above step F234, the ID and meta data MTDL are appended to and recorded in the common image Vc. Subsequently, the ID and meta data MTDL acquired in step F236 is information which is recorded in the recording media 19 at the local camera 1*s* side at the same timing as the common image Vc, played back, and transmitted. Accordingly, the common image Vc to which the ID and meta data MTDL of which content is the same as the ID and meta data MTDL acquired in step F236 is appended should be recorded in the recording media 36. That is to say, determination can be made which common image Vc the local image VL transmitted this time corresponds to by continuously collating the received ID and meta data MTDL with the ID and meta data MTDL associated with each of the common images Vc in the recording media 36 to search the matched ID and meta data MTDL.

Note that in order to perform such consistent collating, point-in-time information is preferably included in the meta data MTDL. Also, positional information may be collated together. Also, in the event that information which can identify the local camera 1*s*, such as personal information or the like, is included in the meta data MTDL, transmission of the ID in step F134 and collating of the IDs in step F237 may not be performed necessarily.

Upon the corresponding relation between the received local image VL and the recorded common image Vc being determined according to the above collating processing, in step F238 the common control unit 30 supplies the local image VL to the recording playback unit 33, and controls the recording playback unit 33 to record the local image VL in the recording media 36 so as to associate the local image VL with the corresponding common image Vc.

According to this processing, at the common camera 2*s* side the common image Vc is recorded along with the ID and meta data MTDL and MTDc of each of the local cameras 1*s*, also at the point of the local image VL being transmitted, the local image VL is recorded so as to be associated with the common image Vc.

Figure 13:
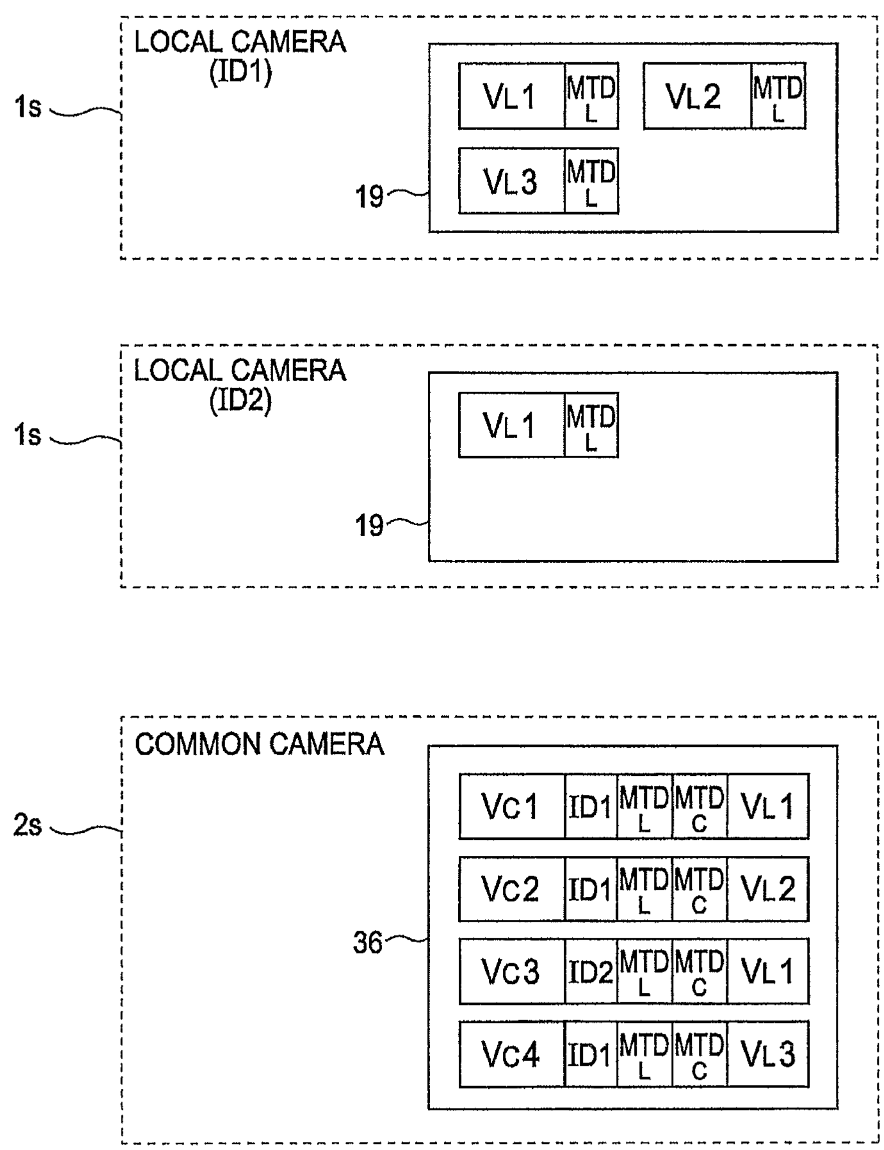
FIG. 13 is an explanatory diagram of an image recorded with the fourth embodiment.

FIG. 13 illustrates the recording states of images at the two local cameras 1*s* and the common camera 2*s*. As with the above FIG. 7, let us say that with the two local cameras 1*s*, an ID1 and ID2 are set to the respective IDs, and with the local camera 1*s* of the ID1, the local images VL1, VL2, and VL3 were recorded in the recording media 19. Also, let us say that with the local camera 1*s* of the ID2, the local image VL1 was recorded in the recording media 19.

With the local camera 1*s* of the ID1, the meta data MTDL is recorded corresponding to each of the local images VL1, VL2, and VL3, which includes point-in-time information at the recording time point of each of the local images VL1, VL2, and VL3, for example.

Also, with the local camera 1*s* of the ID2, the meta data MTDL is recorded corresponding to the local image VL1, which includes point-in-time information at the recording time point of the local image VL1, for example.

The common camera 2*s* side performs recording of the common image Vc in response to reception of the trigger signal TG from each of the local cameras 1*s*, so the four common images Vc1, Vc2, Vc3, and Vc4 are recorded in the recording media 36 in response to the trigger signal TG transmitted four times in total from the two local cameras 1*s*.

As with the example described at the above FIG. 10, each of the common images Vc1 through Vc4 is appended with the ID1 and meta data MTDL transmitted simultaneously with the trigger signal TG, and further the meta data MTDc generated at that time.

Subsequently, the local image VL is transmitted from the local camera 1*s*, in response to the processing in the above steps F235 through F238 being performed, the local image VL is recorded in the recording media 36 so as to be associated with the particular common image Vc.

The local image VL1 from the local camera 1*s* of the ID1 is recorded corresponding to the common image Vc1.

The local image VL2 from the local camera 1*s* of the ID1 is recorded corresponding to the common image Vc2.

The local image VL1 from the local camera 1*s* of the ID2 is recorded corresponding to the common image Vc3.

The local image VL3 from the local camera 1*s* of the ID1 is recorded corresponding to the common image Vc4.

According to the present example, thus, the local image VL and the common image Vc recorded simultaneously at the local camera 1*s* and the common camera 2*s* are in a state of being stored in the recording media 36 at the common camera 2*s* side in a corresponding manner between the local image VL and the common image Vc.

Accordingly, for example, a service dealer employing the common camera 2*s* can provide a user with a better service by using both of the local image VL and the common image Vc. For example, the present example enables an album specialized in an individual user to be created, which includes the local image VL recorded at the user side such as editing or synthesizing or the like by associating the local image VL with the common image Vc.

Note that in the event that there is no need to associate the local image VL with the common image Vc individually, the collating processing in step F237 is unnecessary, but in this case, the ID and meta data MTDL are preferably recorded in the recording media 36 along with the local image VL.

2-5. Fifth Embodiment

The fifth embodiment will be described with reference to FIG. 14, FIG. 15, and FIG. 16.

Let us say that this fifth embodiment is an example in the case wherein the local camera 1 is a video camera for performing image capturing/recording of moving images, and the common camera 2 side is a still camera.

The local camera 1*v* is almost the same as the local camera 1*s* in FIG. 2 from the perspective of the configuration on the drawing, but the recording playback unit 15 is configured so as to record the moving pictures from the image-capturing signal processing unit 14 in the recording media 19.

Also, a video switch 22 is provided for a user performing a start/end operation of recording of a moving image. For example, the local control unit 10 controls the recording playback unit 15 to start recording of a moving image by the video switch 22 being pressed, and stop recording of the moving image by the video switch 22 being pressed again.

The shutter switch 18 illustrated in the drawing is an operator for executing recording of a still image at the common camera 2*s* side. That is to say, this is an operator for the user instructing transmission of a trigger signal TG.

Note that it is needless to say that in addition to the portions illustrated in the drawing, configurations such as circuits, mechanisms, operating unit, and so forth which are necessary for a normal video camera are provided. Also, an unshown microphone and an audio processing system are provided, and with the recording playback unit 15, recording of an audio signal is performed along with recording of a moving-image picture.

Let us say that the configuration at the common camera 2*s* side is the same as that in FIG. 2.

Figure 15:
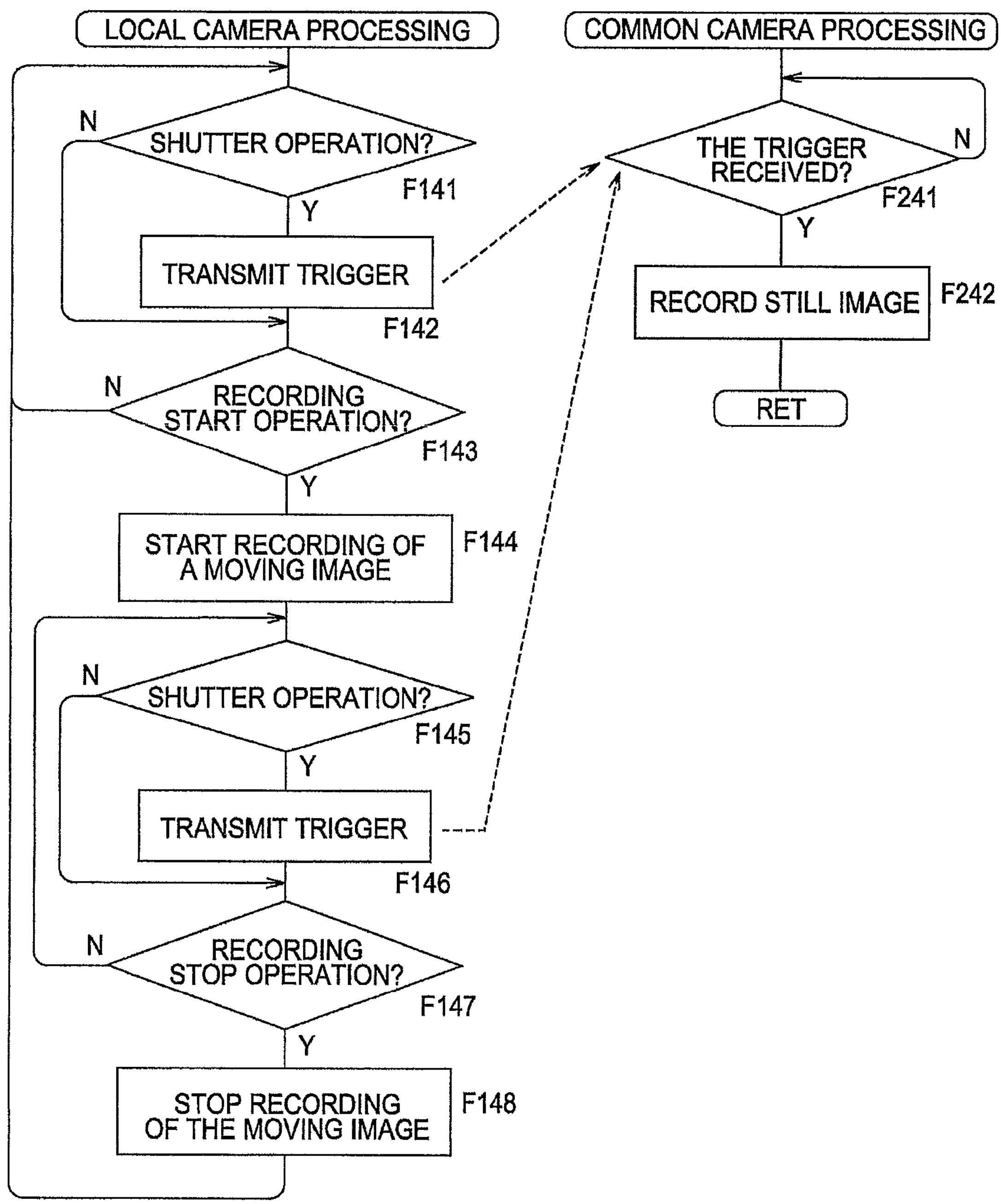
FIG. 15 is a flowchart of processing according to the fifth embodiment.

FIG. 15 illustrates the processing of the local camera 1*v* and the common camera 2*s*. The processing of the local camera 1*v* is processing at a time point when the user turns on the power supply of the local camera 1*v*, which is in a standby state of recording a moving image (recording), and the processing of the common camera 2*s* is processing when recording of a still image can be performed.

With the local camera 1*v*, the picture of a subject image-captured by the image capturing unit 13 is monitor-displayed at the display unit 17 in a standby state prior to start of recording.

The local control unit 10 monitors the operation of the shutter switch 18 in a standby state in step F141, and also monitors the recording start operation of the video switch 22 in step F143.

In the event that the user presses the shutter switch 18 without performing a recording start operation in a standby state, the local control unit 10 performs the processing in step F142, and supplies the trigger signal TG to the transmission unit 11 to execute transmission of the trigger signal TG.

Also, in the event that the user performs the operation of the video switch 22 in a standby state, the local control unit 10 starts recording of a moving image as step F144. That is to say, the control unit 10 gives an instruction of recording of a moving image to the recording playback unit 15 and the image-capturing signal processing unit 14 to start a recording operation of a moving-image picture of a subject in the recording media 19.

Following starting recording of a moving image in step F144, the local control unit 10 monitors the operation of the shutter switch 18 in step F145, and also monitors a recording stop operation by the video switch 22 in step F147.

Subsequently, in the event that the user presses the shutter switch 18, the local control unit 10 supplies the trigger signal TG to the transmission unit 11 in step F146 to execute transmission of the trigger signal TG.

Also, in the event that the user performs the operation of the video switch 22, the local control unit 10 stops recording of the moving image as step F148. That is to say, the control unit 10 gives a moving-image recording stop instruction to the recording playback unit 15 and the image-capturing signal processing unit 14 to end an operation of recording a moving-image picture of a subject in the recording media 19. Subsequently, the processing returns to the monitoring loop in steps F141 and F143.

On the other hand, the common control unit 30 monitors that the trigger signal TG is received by the reception unit 34 as step F241, and upon the trigger signal TG being received, performs recording of a still image in step F242. That is to say, the common control unit 30 controls the image-capturing signal processing unit 32 and the recording playback unit 33 to execute recording of an image-captured image (common image Vc) at the trigger-received timing.

According to this processing, the user performs a shutter operation at the local camera 1*v*, whereby image capturing/recording of an image is performed at the common camera 2*s*. That is to say, with the local camera 1*v*, the user can execute recording of a moving-image picture during an arbitrary period of time, and also can execute recording of a still image at an arbitrary time point as to the common camera 2*s*.

Figure 16:
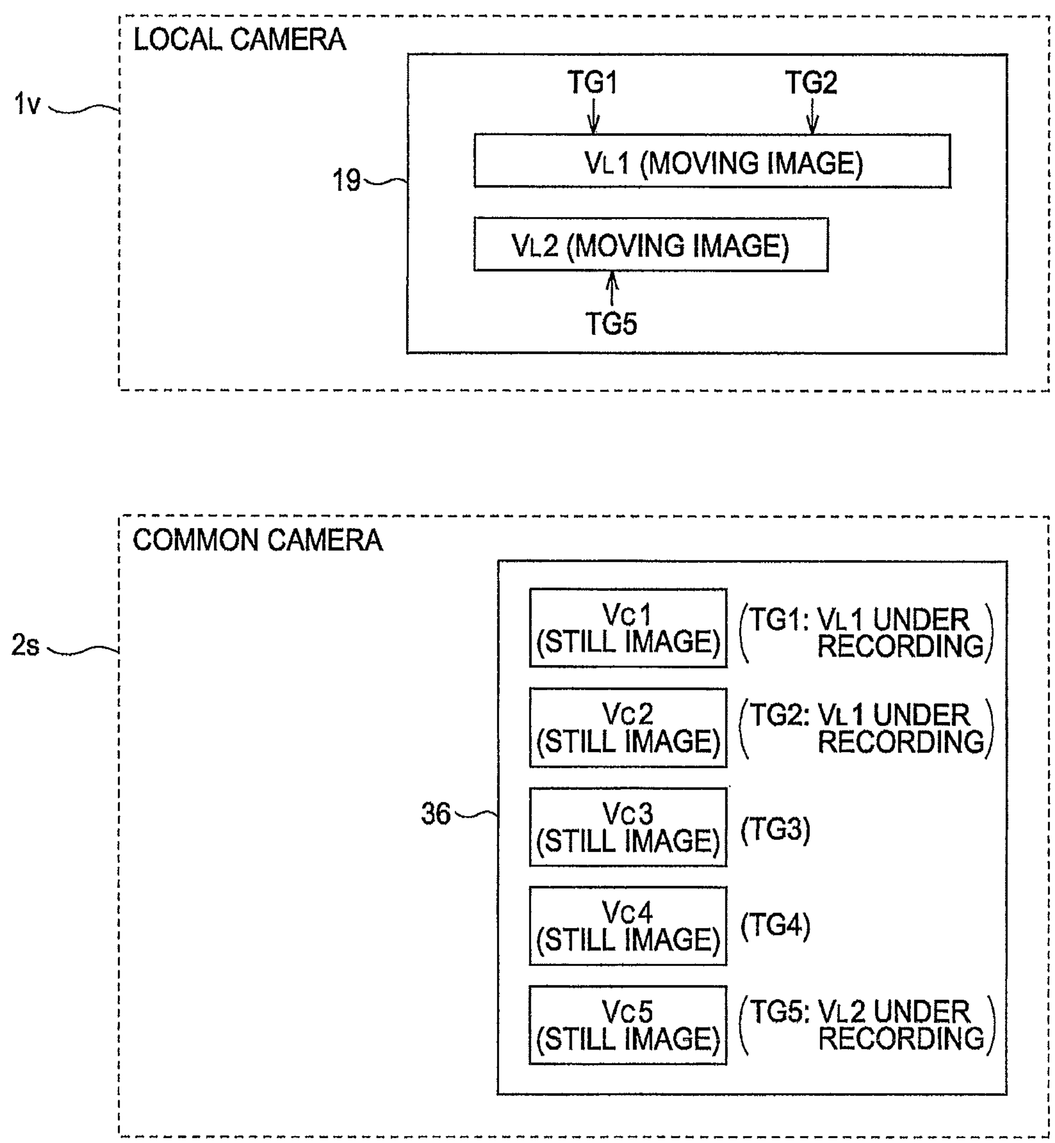
FIG. 16 is an explanatory diagram of an image recorded with the fifth embodiment.

FIG. 16 illustrates the recording states of images at the local camera 1*v* and the common camera 2*s*.

The user of the local camera 1*v* performs a recording start operation at a certain time point, and also performs a recording stop operation at a certain time point, and thus, the local image VL1 as a moving-image picture is recorded in the recording media 19 in the recording playback unit 15 of the local camera 1*v*.

Also, subsequently, in the same way, the user performs a recording start operation at a certain time point, and also performs a recording stop operation at a certain time point, and thus, the local image VL2 as a moving-image picture is recorded in the recording media 19.

At this time, let us say that the user presses the shutter switch 18 at time points illustrated as TG1 and TG2 during recording of the local image VL1. At these time points, transmission of the trigger signal TG is performed at the processing in step F146, and accordingly, recording of a still image is performed at the common camera 2*s* side. These are each recorded as the common images Vc1 and Vc2 as still images in the recording media 36 in the recording playback unit 33 at the common camera 2*s* side.

Also, let us say that following completion of recording of the local image VL1, the user presses the shutter switch 18 twice at time points before start of recording of the local image VL2. In this case, at each of the time points, transmission of the trigger signal TG (TG3 and TG4) is performed at the processing in step F142, and accordingly, recording of a still image is performed at the common camera 2*s* side. These are recorded as the common images Vc3 and Vc4 as still images in the recording media 36 in the recording playback unit 33 at the common camera 2*s* side.

Further, if we say that the user presses the shutter switch 18 at a certain time point illustrated as TG5 during recording of the local image VL2, recording of a still image is performed at the common camera 2*s* side in response to the trigger signal TG5 at this time, and this is recorded as the common image Vc5 as a still image in the recording media 36 in the recording playback unit 33 at the common camera 2*s* side.

Thus, in the case of the present example, the user can execute recording of a moving-image picture during an arbitrary period of time in the local camera 1*v*, and also can execute recording of a still image at the common camera 2*s* side at an arbitrary time point during recording or during recording standby.

That is to say, the user can execute image capturing/recording of a still image at the common camera 2*s* side at a desired timing while performing recording by himself/herself, and can obtain a moving picture and a still image with a simple operation by the common image Vc being provided later.

Note here that description has been made regarding an example wherein only the trigger signal TG is transmitted, but with a system of the local camera 1*v* serving as a video camera and the common camera 2*s* serving as a still camera, such as the present example, the various types of operation described with the above second through fourth embodiments can be performed.

That is to say, an arrangement may be made wherein the ID and meta data MTDL are transmitted along with the trigger signal TG, these are recorded at the common camera 2*s* side so as to correspond to the common image Vc, and the meta data MTDc generated at the common camera 2*s* side is recorded so as to correspond to the common image Vc.

Further, an arrangement can be conceived wherein with the local camera 1*v*, the meta data MTDL is recorded so as to correspond to the local image VL as a moving image, also the recorded local image VL and meta data MTDL are transmitted to the common camera 2*s* side, and the local image VL as a moving image is recorded at the common camera 2*s* side so as to correspond to the common image Vc.

Also, description has been made wherein the trigger signal TG is transmitted by the shutter switch 18 being pressed, but the trigger signal TG may be transmitted in response to the operation of the video switch 22 or an operation relating to recording of a moving image. For example, an arrangement may be made wherein the trigger signal TG is transmitted in response to a recording start operation or stop operation, and a still image is recorded at the common camera 2*s* side.

Also, in this case, an arrangement can be conceived wherein the shutter switch 18 is not provided.

Further, an arrangement may be made wherein when operating the shutter switch 18, not only transmission of the trigger signal TG is performed, but also recording as a still image is performed at the recording playback unit 15. For example, in response to a shutter operation in step F141 during recording standby, the still image of a subject at that time is recorded in the recording media 19. Of course, an arrangement may be made wherein in response to a shutter operation during recording, one frame of an image at particularly that shutter timing is extracted to perform recording of a still image.

2-6. Sixth Embodiment

The sixth embodiment will be described with reference to FIG. 17, FIG. 18, and FIG. 19.

Let us say that this sixth embodiment is an example in the case wherein the common camera 2 is a video camera for performing image capturing/recording of moving images, and the local camera 1 is a still camera.

The local camera 1*s* has the same configuration as that illustrated in FIG. 2.

The common camera 2*v* is almost the same as the common camera 2*s* in FIG. 2 from the perspective of the configuration on the drawing, but the recording playback unit 33 is configured so as to record the moving pictures from the image-capturing signal processing unit 32 in the recording media 36.

Also, a video switch 38 is provided for a start/end operation of recording of a moving image. For example, the common control unit 30 controls the recording playback unit 33 to start recording of a moving image by the video switch 38 being pressed, and end recording of the moving image by the video switch 38 being pressed again.

Note that it is needless to say that in addition to the portions illustrated in the drawing, configurations such as circuits, mechanisms, operating unit, and so forth which are necessary for a normal video camera are provided. Also, an unshown microphone and an audio processing system are provided, and with the recording playback unit 33, recording of an audio signal is performed along with recording of a moving-image picture.

Figure 18:
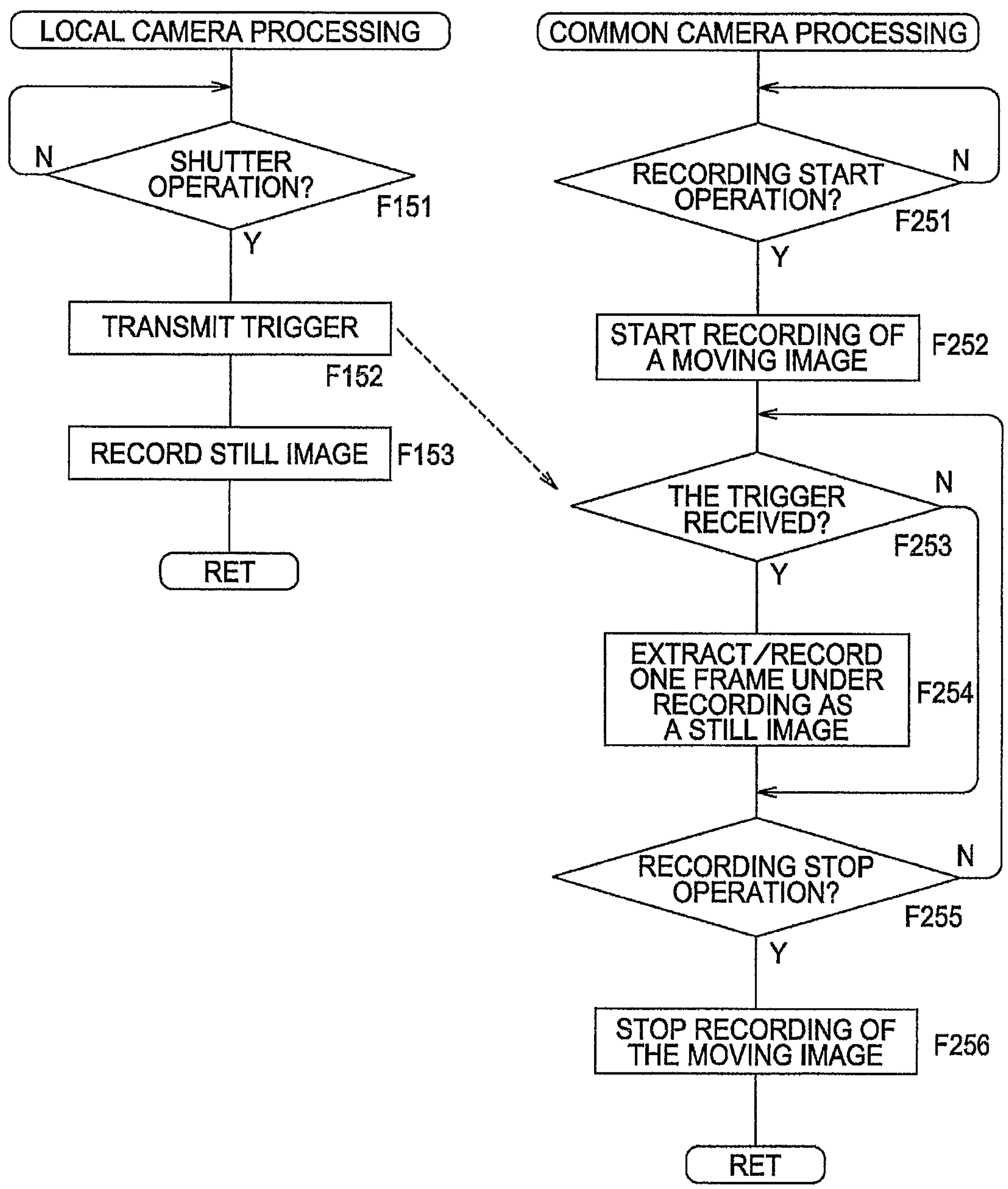
FIG. 18 is a flowchart of processing according to the sixth embodiment.

FIG. 18 illustrates the processing of the local camera 1*s* and the common camera 2*v*. The processing of the local camera 1*s* is processing at the time of being in a still-image recordable state. Also, with the present example, let us say that the common camera 2*v* always performs recording of a moving image, the processing of the common camera 2*v* is processing from start of recording thereof to end of recording thereof.

Upon detecting the operation of the shutter switch by the user in step F151, the local control unit 10 controls the transmission unit 11 to transmit the trigger signal TG in step F152.

At the same time, the local control unit 10 performs still-image recording control in step F153. That is to say, the local control unit 10 controls the image-capturing signal processing unit 14 and the recording playback unit 15 to execute recording of an image-captured image (local image VL as a still image) at the shutter timing.

The common control unit 30 makes recording of a moving image start in step F252 by the video switch 38 being pressed in step F251. That is to say, the common control unit 30 gives an instruction of recoding of a moving image to the recording playback unit 33 and the image-capturing signal processing unit 32 to start an operation of recording a moving-image picture of a subject in the recording media 36.

For example, if we say that the common camera 2*v* always performs recording of a moving image, at a time point of an event, athletic meet, or the like beginning, the video switch 38 is operated by the staff or the like of the service dealer, resulting in start of recording of a moving image.

While continuously executing of recording of a moving image, the common control unit 30 monitors that the trigger signal TG is received at the reception unit 34 as step F253, and also monitors a recording stop operation in step F255.

Upon detecting reception of the trigger signal TG in step F253, the common control unit 30 performs still-image recording control in step F254. In this case, a moving image is now being recorded, so while continuing recording of the moving image, the common control unit 30 makes one frame of image at the received timing of the trigger signal extract as still-image data, and controls the recording playback unit 33 to record the extracted frame in the recording media 36 as another still-image data other than a moving image.

Upon detecting a recording stop operation in step F255, the common control unit 30 controls the recording playback unit 33 to stop recording of the moving image in step F256. For example, at a time point of an event or athletic meet ending, the staff or the like of the service dealer performs a recording stop operation by the video switch 38.

According to this processing, the user performs a shutter operation at the local camera 1*s*, whereby recording of a still image is performed at the common camera 2*v*. That is to say, with the common camera 2*v*, while continuing recording of a moving image, recording of a still image is performed synchronously with a shutter operation by the user of the local camera 1*s*.

Figure 19:
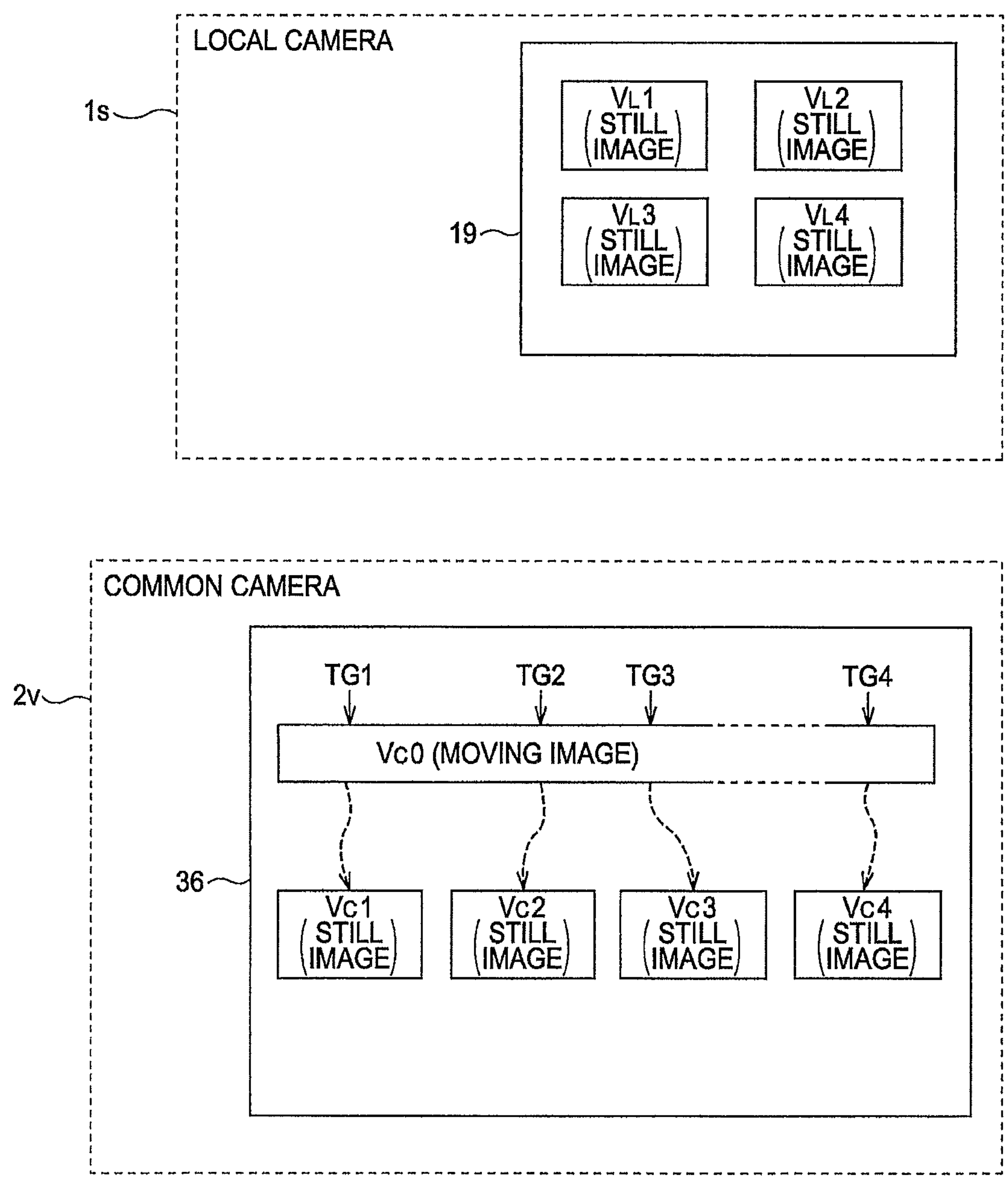
FIG. 19 is an explanatory diagram of an image recorded with the sixth embodiment.

FIG. 19 illustrates the recording states of images at the local camera 1*s* and the common camera 2*v*.

The user of the local camera 1*s* performs a shutter operation at an arbitrary time point, whereby the local image VL as a still image is recorded in the recording media 19 of the local camera 1. If we say that a shutter operation is performed four times, the local images VL1 through VL4 are recorded as illustrated in the drawing.

On the other hand, the common camera 2*v* always performs recording of a moving image, so the common image Vc as the moving image thereof is recorded in the recording media 36.

Also, one frame being recorded is extracted by the trigger signals TG1 through TG4 along with a shutter operation at the local camera 1*s* side, and the common images Vc1 through Vc4 as still images are recorded in the recording media 36. The common images Vc1 through Vc4 become images having the same timing as the local images VL1 through VL4, respectively.

Thus, in the event of the present example, as with the case of the first embodiment, as soon as the user performs a shutter operation to record the local image VL as a still image, the common image Vc serving as the corresponding still image is recorded at the common camera 2*v* side. Accordingly, the user can obtain various images at the same timing.

Further, in this case, recording of a moving image is continuously performed at the common camera 2*v* side, so that a moving-image picture can be provided at the user side as well. For example, providing of the moving image of the overall event, providing of moving-image pictures before and after the timing of a shutter operation, and so forth by the user can be conceived.

Accordingly, the user can obtain the still image and moving image at the common camera 2*s* side while performing image capturing/recording of a still image by him-self/herself. Thus, a various and also satisfactory image providing service for the user can be realized.

Note here that description has been made regarding an example wherein only the trigger signal TG is transmitted, but with a system of the local camera 1*v* serving as a still camera and the common camera 2*s* serving as a video camera, the various types of operation described with the above second through fourth embodiments can be performed.

That is to say, an arrangement may be made wherein the ID and meta data MTDL are transmitted along with the trigger signal TG, these are recorded at the common camera 2*v* side so as to correspond to the common image Vc as a still image, and the meta data MTDc generated at the common camera 2*v* side is recorded so as to correspond to the common image Vc as a still image.

Further, an arrangement can be conceived wherein with the local camera 1*s*, the meta data MTDL is recorded so as to correspond to the local image VL as a still image, and also the recorded local image VL and meta data MTDL are transmitted to the common camera 2*v* side, and the local image VL as a still image is recorded at the common camera 2*v* side so as to correspond to the common image Vc as a still image.

Also, with regard to the common images Vc1 through Vc4 as still images such as FIG. 19, it is not always necessary to perform extraction/recording of a frame at the trigger-received timing. That is to say, an arrangement may be made wherein the trigger-received timing is recorded with the time code of the common image Vc0 as a still image beforehand, and at a later time point, a frame is extracted to generate the common images Vc1 through Vc4 as still images.

2-7. Seventh Embodiment

The seventh embodiment will be described with reference to FIG. 20 and FIG. 21. This seventh embodiment is, as with the above sixth embodiment, the case of the local camera 1*s* serving as a still camera, and the common camera 2*v* serving as a video camera, and let us say that the configurations are the same as those in FIG. 17.

Figure 20:
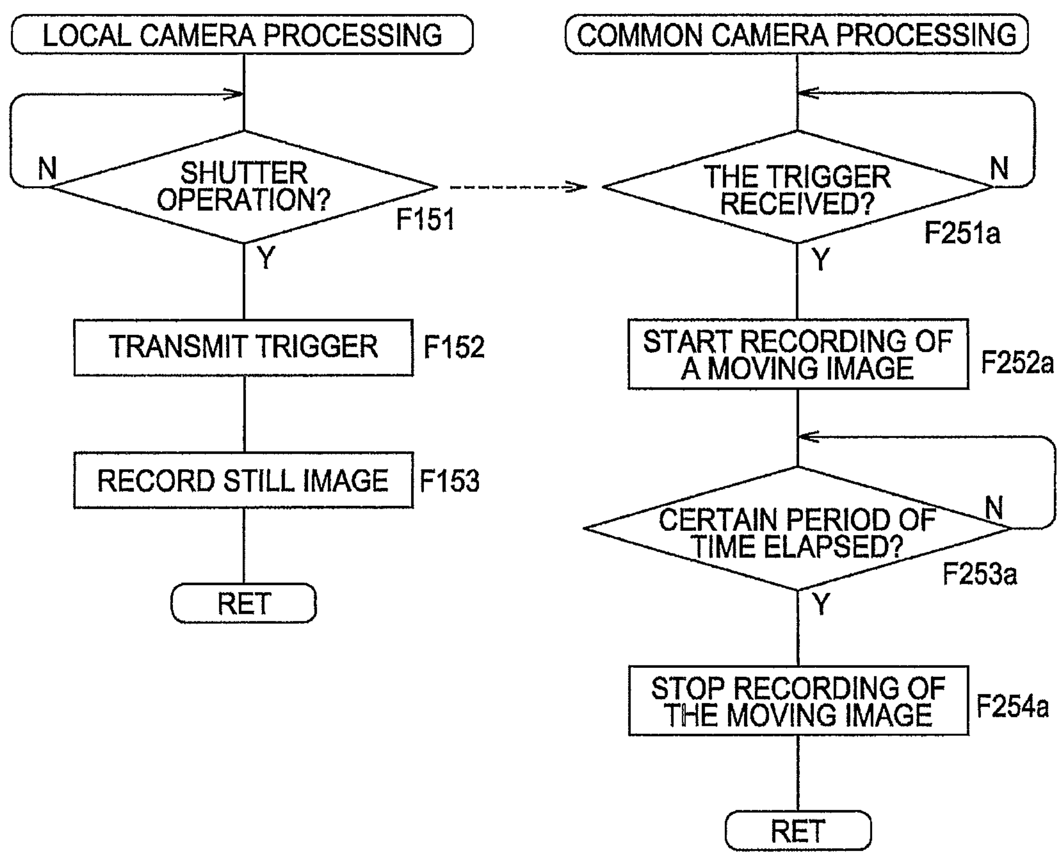
FIG. 20 is a flowchart of processing according to a seventh embodiment.

FIG. 20 illustrates the processing of the local camera 1*s* and the common camera 2*v*. The processing of the local camera 1*s* is processing at the time of being in a still-image recordable state. Also, the processing of the common camera 2*v* is processing at the time of being in a standby state in which recording of a moving image can be performed.

The processing of the local control unit 10 is the same as that in the above FIG. 18, which is illustrated with the same step numbers (F151, F152, and F153).

On the other hand, the common control unit 30 monitors that the trigger signal TG is received by the reception unit 34 in step F251*a*.

Upon detecting reception of the trigger signal TG in step F251*a*, the common control unit 30 performs moving-image recording control in step F252*a*. That is to say, the common control unit 30 gives an instruction of recording of a moving image to the recording playback unit 33 and the image-capturing signal processing unit 32 to start an operation of recording a moving-image picture of a subject in the recording media 36, with the received timing of the trigger signal as recording start timing.

Following starting recording of a moving image, the common control unit 30 performs timekeeping. Subsequently, upon a certain period of time elapsing, the processing proceeds from step F253*a* to step F254*a*, where the common control unit 30 controls the recording playback unit 33 to stop recording of the moving image.

According to this processing, the user performs a shutter operation at the local camera 1*s*, whereby recording of a moving image is performed for a certain period of time at the common camera 2*v*.

Figure 21:
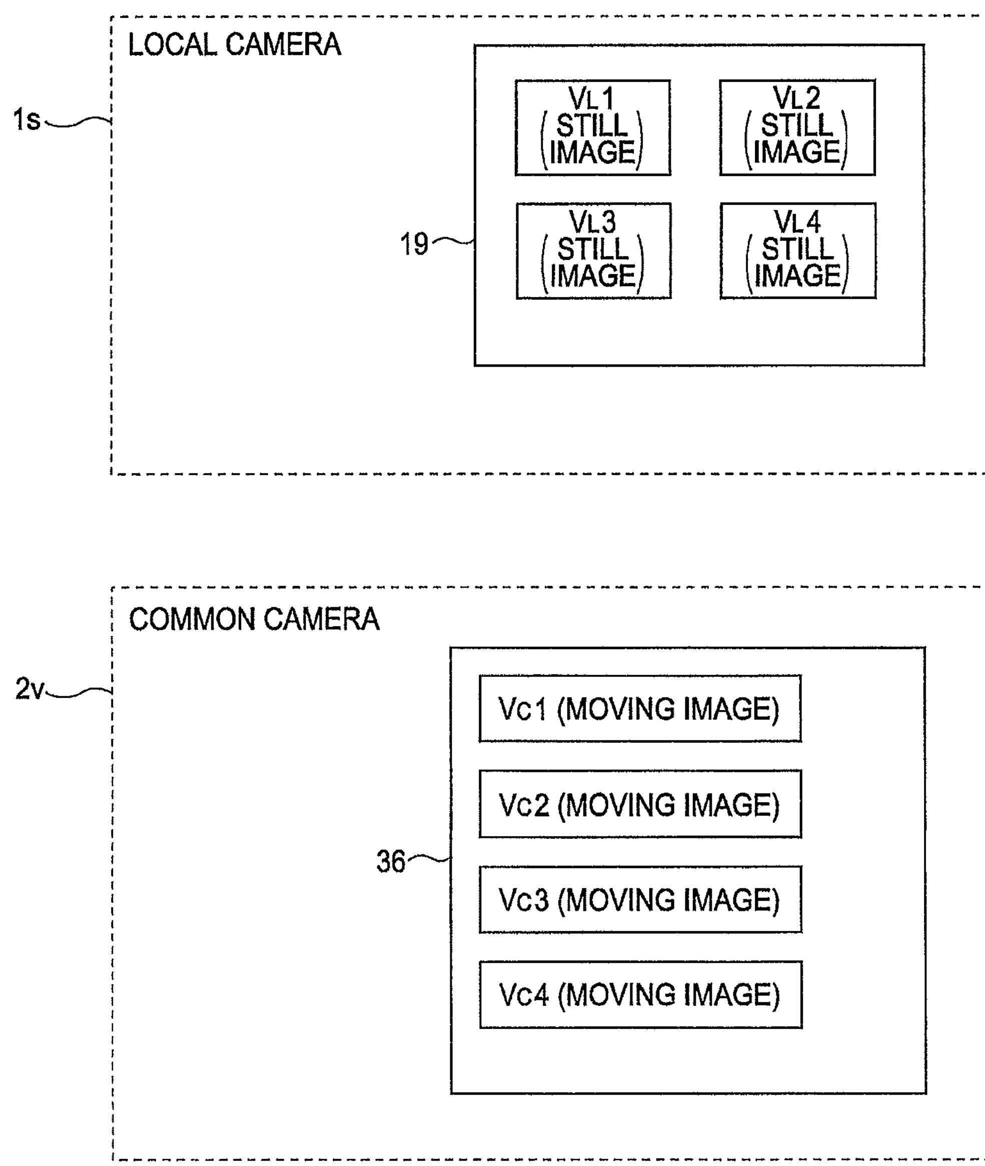
FIG. 21 is an explanatory diagram of an image recorded with the seventh embodiment.

FIG. 21 illustrates the recording states of images at the local camera 1*s* and the common camera 2*v*.

The user of the local camera 1*s* performs a shutter operation at an arbitrary time point, whereby the local image VL as a still image is recorded in the recording media 19 of the local camera 1. If we say that a shutter operation is performed four times, the local images VL1 through VL4 are recorded as illustrated in the drawing.

On the other hand, with the common camera 2*v*, recording of a moving image is performed by a trigger signal along with a shutter operation at the local camera 1*s* side, and accordingly, the common images Vc1 through Vc4 as moving images are recorded in the recording media 36. The moving-image start timing of the common images Vc1 through Vc4 becomes the recording timing of the local images VL1 through VL4, respectively.

Thus, in the event of the present example, the user performs a shutter operation, which is the timing when recording of the local image VL as a still image is recorded, and from this timing recording of a moving image is performed at the common camera 2*v* side, whereby the user can obtain the moving-image picture relating to the still image recorded by himself/herself. In this case also, the service dealer and others can provide a satisfactory image providing service for users.

Note that in the event of this example also, the operations described with the above second through fourth embodiments can be conceived. That is to say, an arrangement may be made wherein the ID and meta data MTDL are transmitted along with the trigger signal TG, these are recorded at the common camera 2*v* side so as to correspond to the common image Vc as a moving image, and the meta data MTDc generated at the common camera 2*v* side is recorded so as to correspond to the common image Vc as a moving image.

Further, an arrangement can be conceived wherein with the local camera 1*s*, the meta data MTDL is recorded so as to correspond to the local image VL as a still image, also the recorded local image VL and meta data MTDL are transmitted to the common camera 2*v* side, and the local image VL as a still image is recorded at the common camera 2*v* side so as to correspond to the common image Vc as a still image.

Also, description has been made wherein recording at the common camera 2*v* side is performed for a certain period of time, but for example, an arrangement can be conceived wherein recoding itself is always performed, the timing when receiving the trigger signal is stored, and later a moving-image picture is edited based on that received timing to be provided to the user.

2-8. Eighth Embodiment

The eighth embodiment will be described with reference to FIG. 22 and FIG. 23.

Let us say that this eighth embodiment is an example in the case wherein both of the local camera 1 and the common camera 2 are video cameras for performing image capturing/recording of moving images.

Figure 17:
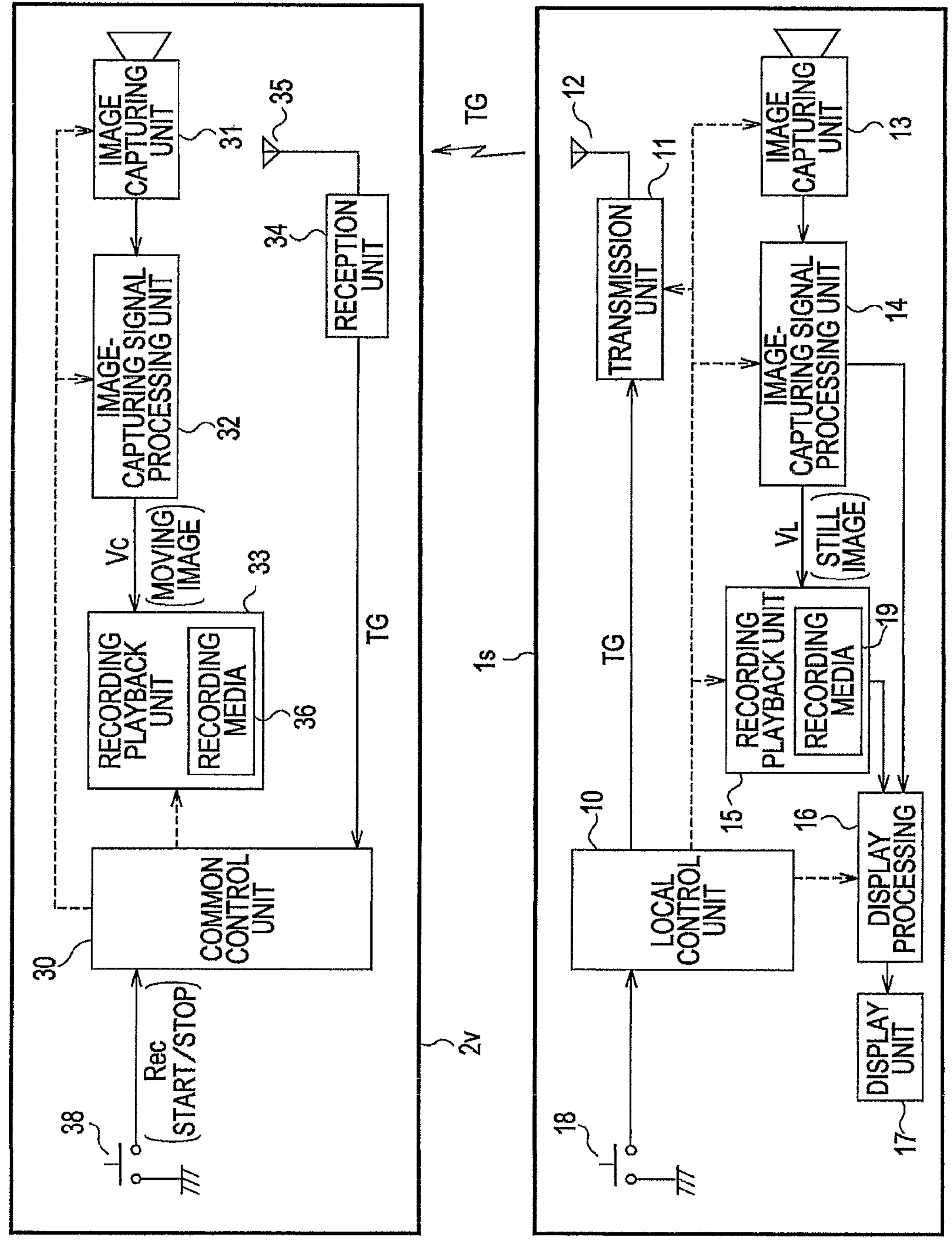
FIG. 17 is a block diagram of a common camera and local camera according to a sixth embodiment.

The configuration of the local camera 1*v* is the same as that in FIG. 14, and the configuration of the common camera 2*v* is the same as that in FIG. 17.

Figure 22:
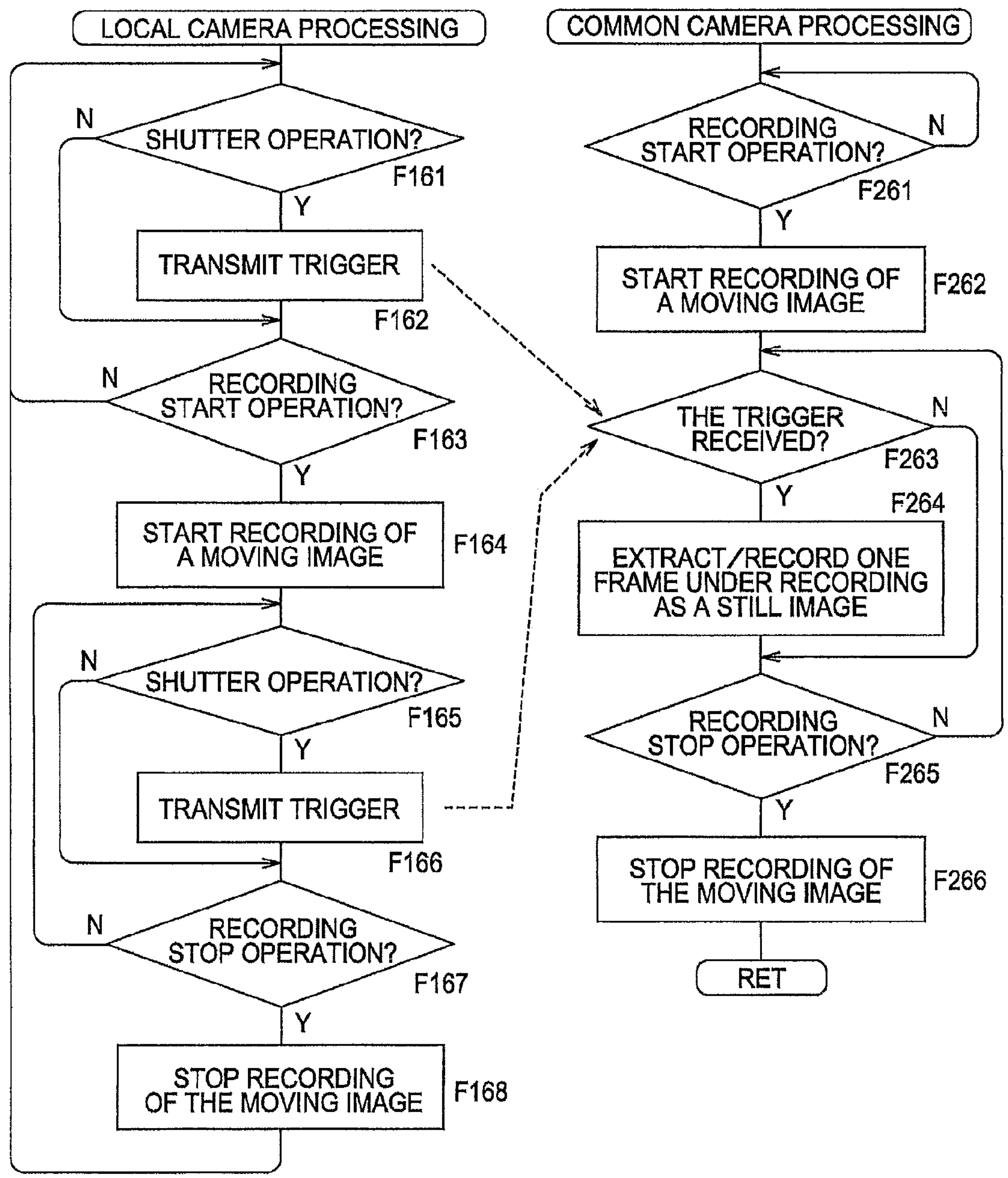
FIG. 22 is a flowchart of processing according to an eighth embodiment.

FIG. 22 illustrates the processing of the local camera 1*v* and the common camera 2*v*. The processing in steps F161 through F168 of the local camera 1*v* is the same as that in steps F141 through F148 in FIG. 15. Also, the processing in steps F261 through F266 of the common camera 2*v* is the same as that in steps F251 through F256 in FIG. 18.

Accordingly, detailed description will be avoided here, but the local camera 1*v* executes recording of a moving image during a period of time in response to the operation of the video switch 22 of the user, and also the shutter switch 18 is operated during recording or during recording standby, thereby transmitting a trigger signal to the common camera 2*v* side.

Also, while always continuing recording of a moving image, in response to the trigger signal TG being received, the common camera 2*v* extracts and records a still image at that timing.

According to this processing, with the local camera 1*v*, the user can execute recording of a moving-image picture during an arbitrary period of time, and also with the common camera 2*v*, recording of a still image is performed synchronously with the shutter operation of the user of the local camera 1 while continuing recording of a moving image.

Figure 23:
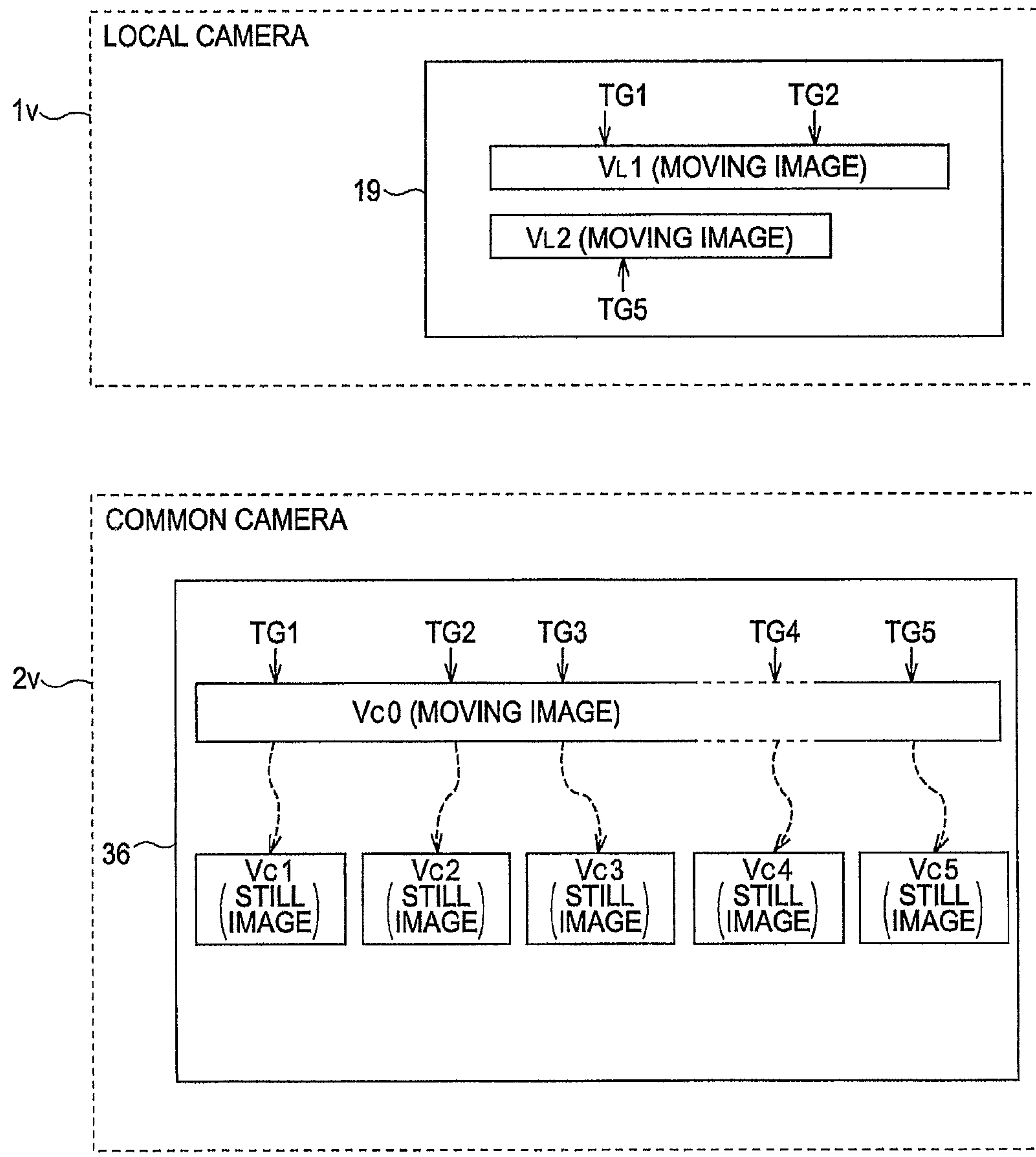
FIG. 23 is an explanatory diagram of an image recorded with the eighth embodiment.

FIG. 23 illustrates the recording states of images at the local cameras 1*v* and the common camera 2*v*.

The user of the local camera 1*v* performs a recording start operation at a certain time point, and performs a recording stop operation at an arbitrary time point, whereby the local image VL1 as a moving-image picture is recorded in the recording media 19 in the recording playback unit 15 of the local camera 1*v*.

Also subsequently, in the same way the user performs a recording start operation at a certain time point, and performs a recording stop operation at an arbitrary time point, whereby the local image VL2 as a moving-image picture is recorded in the recording media 19.

On the other hand, with the common camera 2*v*, recording of a moving image is continuously performed, so that the common image Vc0 serving as the moving image thereof is recorded in the recording media 36.

Also, one frame during recording is extracted at the common camera 2*v* side by the trigger signals TG1 through TG5 along with a shutter operation during recording or during recording standby at the local camera 1*v* side, and the common images Vc1 through Vc5 as still images are recorded in the recording media 36.

Thus, in the event of the present example, the user can execute recording of a moving-image picture during an arbitrary period of time at the local camera 1*v*, and also can make the common camera 2*s* side execute recording of a still image during recording or at an arbitrary time point during recording standby.

That is to say, the user can make the common camera 2*v* side execute recording of a still image at the desired timing while performing recording by himself/herself, and can obtain a moving image and a still image with a simple operation by the common image VC being provided later.

Further, in this case, recording of a moving image is continuously performed at the common camera 2*v* side, whereby a common image as a still image can be provided to the user side. For example, the moving image of the overall event, or moving-image pictures before and after the timing of the shutter operation of the user can be provided.

Note that in this case, the various operations described with the above second through fourth embodiments can be conceived. In this case, the ID and meta data MTDL are transmitted along with the trigger signal TG, these are recorded at the common camera 2*v* side so as to correspond to the common image Vc, and the meta data MTDc generated at the common camera 2*v* side is recorded so as to correspond to the common image Vc.

Further, an arrangement can be conceived wherein with the local camera 1*v*, the meta data MTDL is recorded so as to correspond to the local image VL as a moving image, also the recorded local image VL and meta data MTDL are transmitted to the common camera 2*v* side, and the local image VL as a moving image is recorded at the common camera 2*v* side so as to correspond to the common image Vc.

Also, description has been made wherein the trigger signal TG is transmitted by the shutter switch 18 being pressed, but the trigger signal TG may be transmitted in response to the operation of the video switch 22 or an operation relating to recording of a moving image. For example, an arrangement may be made wherein the trigger signal TG is transmitted in response to a recording start operation or stop operation, and a still image is recorded at the common camera 2*v* side.

Also, in this case, an arrangement can be conceived wherein the shutter switch 18 is not provided.

Further, an arrangement may be made wherein when operating the shutter switch 18, not only transmission of the trigger signal TG is performed, but also recording of the local image VL as a still image is performed at the recording playback unit 15.

2-9. Ninth Embodiment

The ninth embodiment will be described with reference to FIG. 24 and FIG. 25. This ninth embodiment is, as with the above eighth embodiment, the case in which both of the local camera 1 and the common camera 2 are video cameras.

Figure 24:
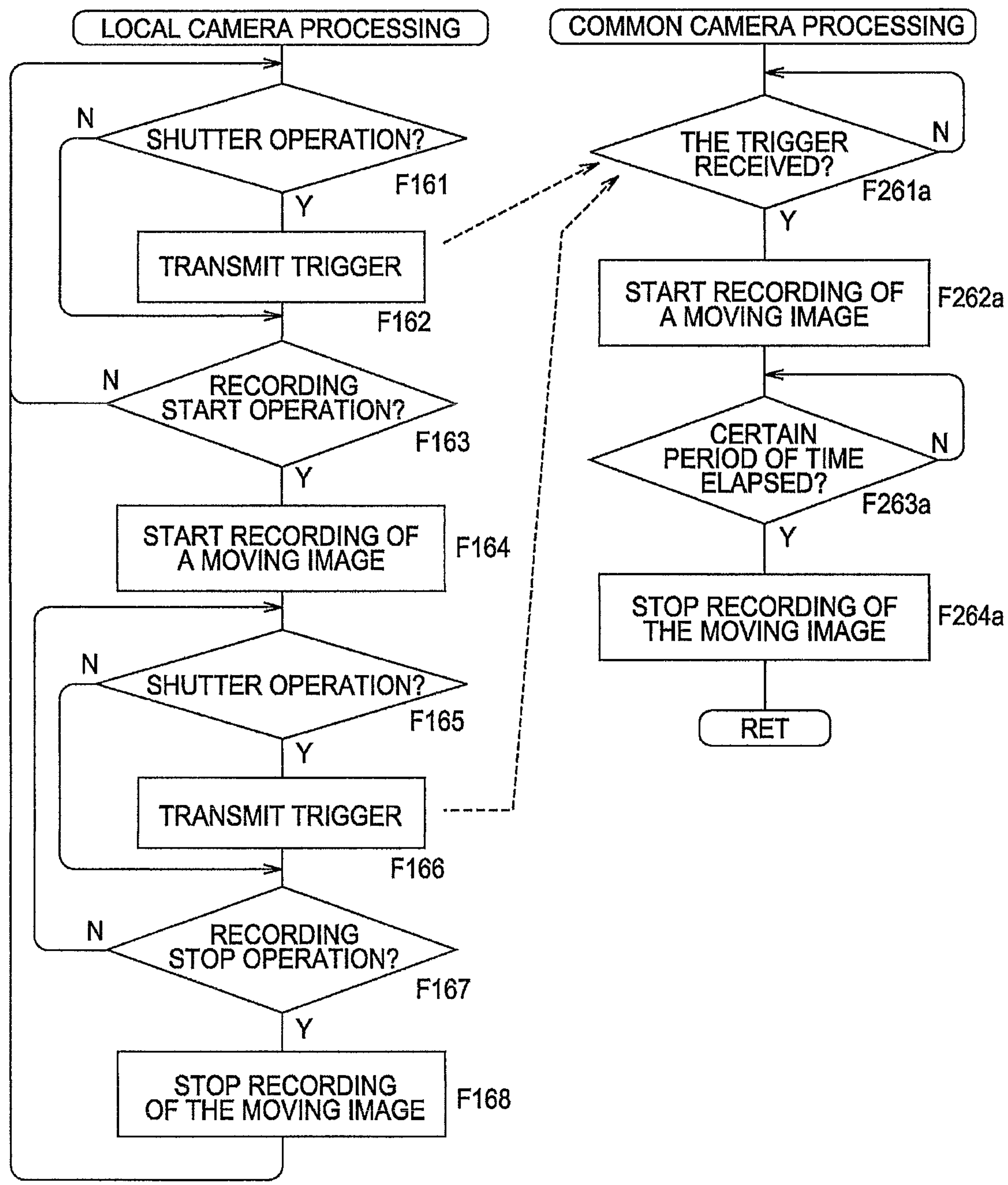
FIG. 24 is a flowchart of processing according to a ninth embodiment.

FIG. 24 illustrates the processing of the local camera 1*v* and the common camera 2*v*. The processing of the local camera 1*v* and the common camera 2*v* is processing from the time of being in a standby state in which recording of a moving image can be performed.

The processing of the local control unit 10 is the same as that in the above FIG. 22, which is illustrated with the same step numbers (F161 through F168).

On the other hand, steps F261*a* through F264*a* serving as the processing of the common control unit 30 are the same as steps F251*a* through F254*a* in FIG. 20. That is to say, upon the trigger signal TG being received by the reception unit 34, the common control unit 30 regards this as the recording start timing, and performs moving-image recording start control as to the recording playback unit 33 and the image-capturing signal processing unit 32 to record the moving-image picture of a subject in the recording media 36 for a certain period of time.

According to this processing, with the local camera 1*v*, the user can execute recording of a moving-image picture for an arbitrary period of time, and with the common camera 2*v*, recording of a moving image is performed for a certain period of time from the trigger-signal received timing in response to a shutter operation at the local camera 1*v*.

Figure 25:
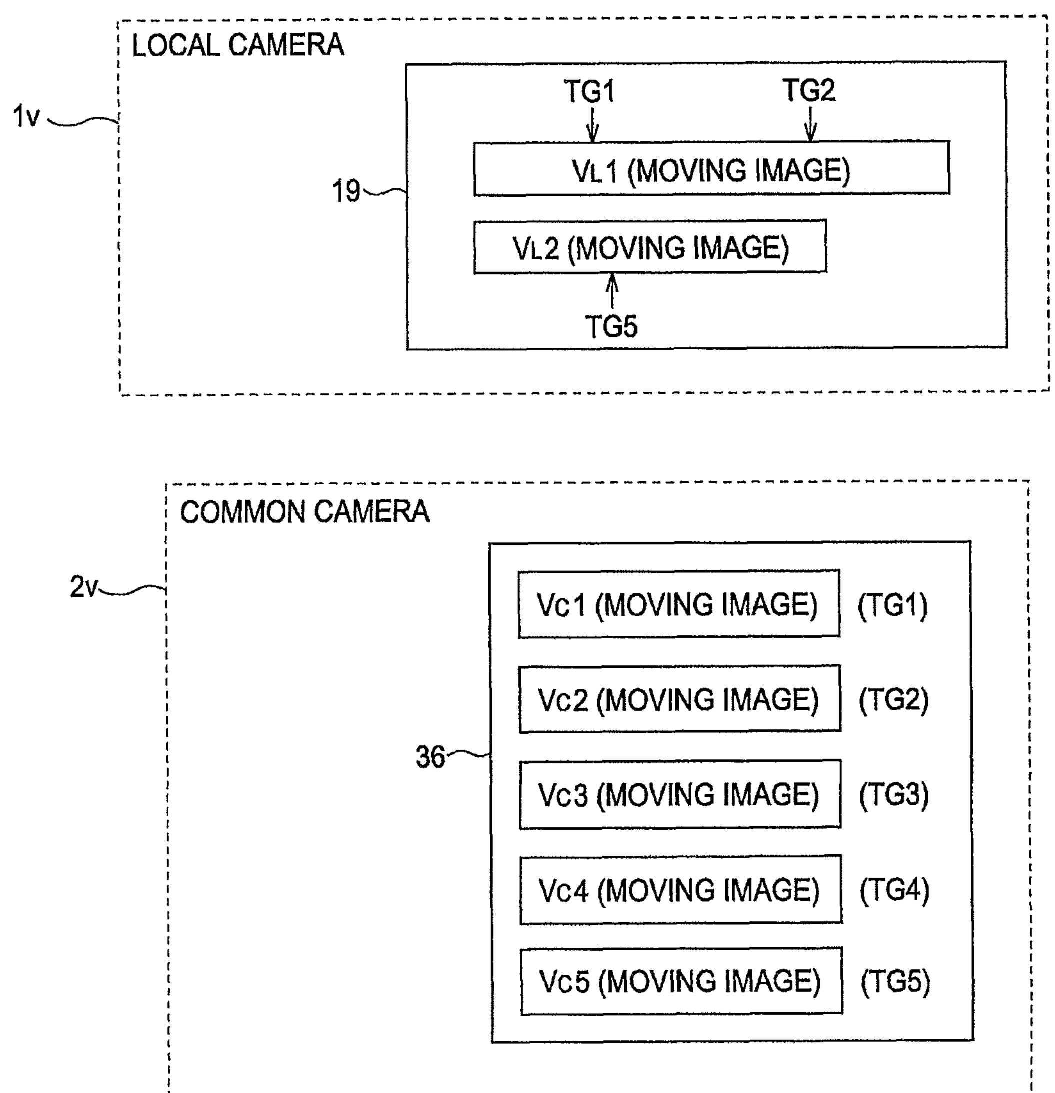
FIG. 25 is an explanatory diagram of an image recorded with the ninth embodiment.

FIG. 25 illustrates the recording states of images at the local cameras 1*v* and the common camera 2*v*.

The local images VL1 and VL2 as moving-image pictures are recorded in the recording media 19 of the local camera 1*v* in response to a recording start operation and a recording stop operation by the user.

On the other hand, with the common camera 2*v*, the common images Vc1 through Vc5 are recorded in the recording media 36 in response to the trigger signals TG1 through TG5 along with a shutter operation during recording or during recording standby at the local camera 1*v* side.

Thus, in the event of the present example, the user can arbitrarily record a moving-image picture at the local camera 1*v*, and also make the common camera 2*v* execute recording of a moving image from an arbitrary time point by a shutter operation, and accordingly can obtain various moving-image pictures.

Note that in the event of this example also, the operations described with the above second through fourth embodiments can be conceived. That is to say, an arrangement may be made wherein the ID and meta data MTDL are transmitted along with the trigger signal TG, these are recorded at the common camera 2*v* side so as to correspond to the common image Vc, and the meta data MTDc generated at the common camera 2*v* side is recorded so as to correspond to the common image Vc.

Further, an arrangement can be conceived wherein with the local camera 1*v*, the meta data MTDL is recorded so as to correspond to the local image VL as a moving image, also the recorded local image VL and meta data MTDL are transmitted to the common camera 2*v* side, and the local image VL as a moving image is recorded at the common camera 2*v* side so as to correspond to the common image Vc as a moving image.

Also, description has been made wherein recording at the common camera 2*v* side is performed for a certain period of time, but for example, an arrangement can be conceived wherein recoding itself is always performed, the timing when receiving the trigger signal is stored, and later a moving-image picture is edited based on that received timing to be provided to the user.

2-10. Tenth Embodiment

Figure 26:
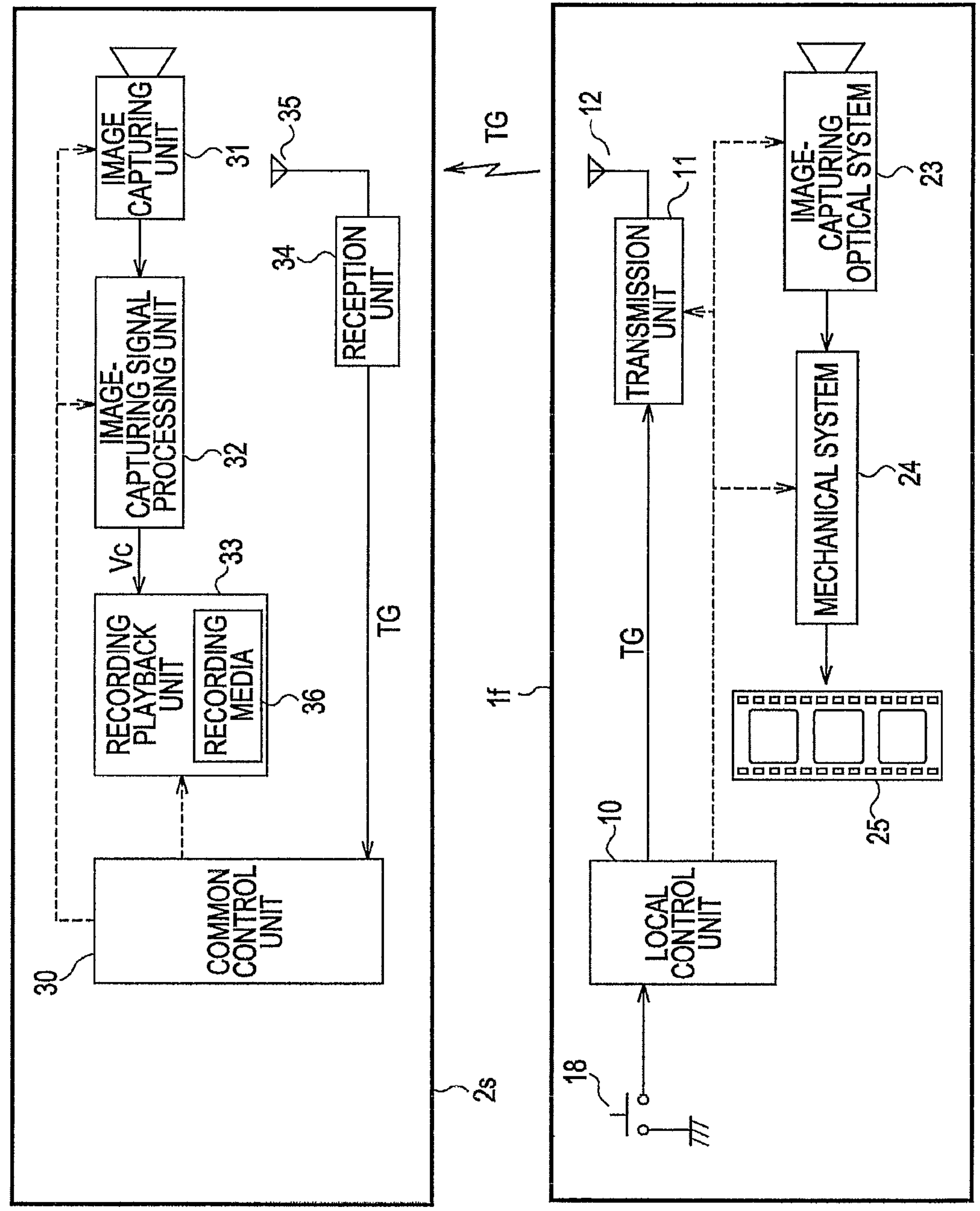
FIG. 26 is a block diagram of a common camera and local camera according to a tenth embodiment.

The tenth embodiment is illustrated in FIG. 26. This is the case in which let us say that the local camera 1 is a silver-salt camera, and the common camera 2 is a still camera.

A local camera 1*f* includes a local control unit 10, a transmission unit 11, an antenna 12, a shutter switch 18, an image-capturing optical system 23, and a mechanical system 24.

A shutter mechanism in the mechanical system 24 is driven and controlled by the local control unit 20 in response to the shutter switch 18, and shooting of a subject image as to a film 25 is performed.

This local camera 1*f* includes a trigger transmission function in addition to a configuration serving as a normal silver-salt camera, and the local control unit 10 controls the mechanical system 24 to execute photo shooting in response to the operation of the shutter switch 18, and also controls the transmission unit 11 to transmit a trigger signal TG.

The processing of the local control unit 10 is the same as steps F101 through F103 in FIG. 3, and the processing of the common control unit 30 of the common camera 2*s* is the same as steps F201 through F202 in FIG. 3.

According to the tenth embodiment, the user performs arbitrary photo shooting using the silver-salt camera, whereby the common image Vc is recorded at the common camera 2*s* synchronously with shooting thereof. The user obtains the common image Vc later, whereby the user can obtain image data relating to the photo captured by himself/herself.

Note that an arrangement may be made wherein the local camera 1*f* performs the operation of the second and third embodiments, i.e., transmission of an ID or meta data MTDL. Of course, in this case, the common camera 2*s* records an ID, meta data MTDL, further the meta data MTDc generated at the common camera 2*s* side so as to correspond to the common image Vc.

Also, a system can be conceived wherein the common camera 2 is assumed to be a video camera, which performs the operations described with the sixth and seventh embodiments in response to the trigger signal T from the local camera 1*f*.

2-11. System Pattern Examples of Local Cameras and Common Cameras

So far, description has been made regarding a case wherein the local camera 1 is the first image capturing device referred by the claims of the present invention, and the common camera 2 is the second image capturing device as the first through tenth embodiments.

Figure 27:
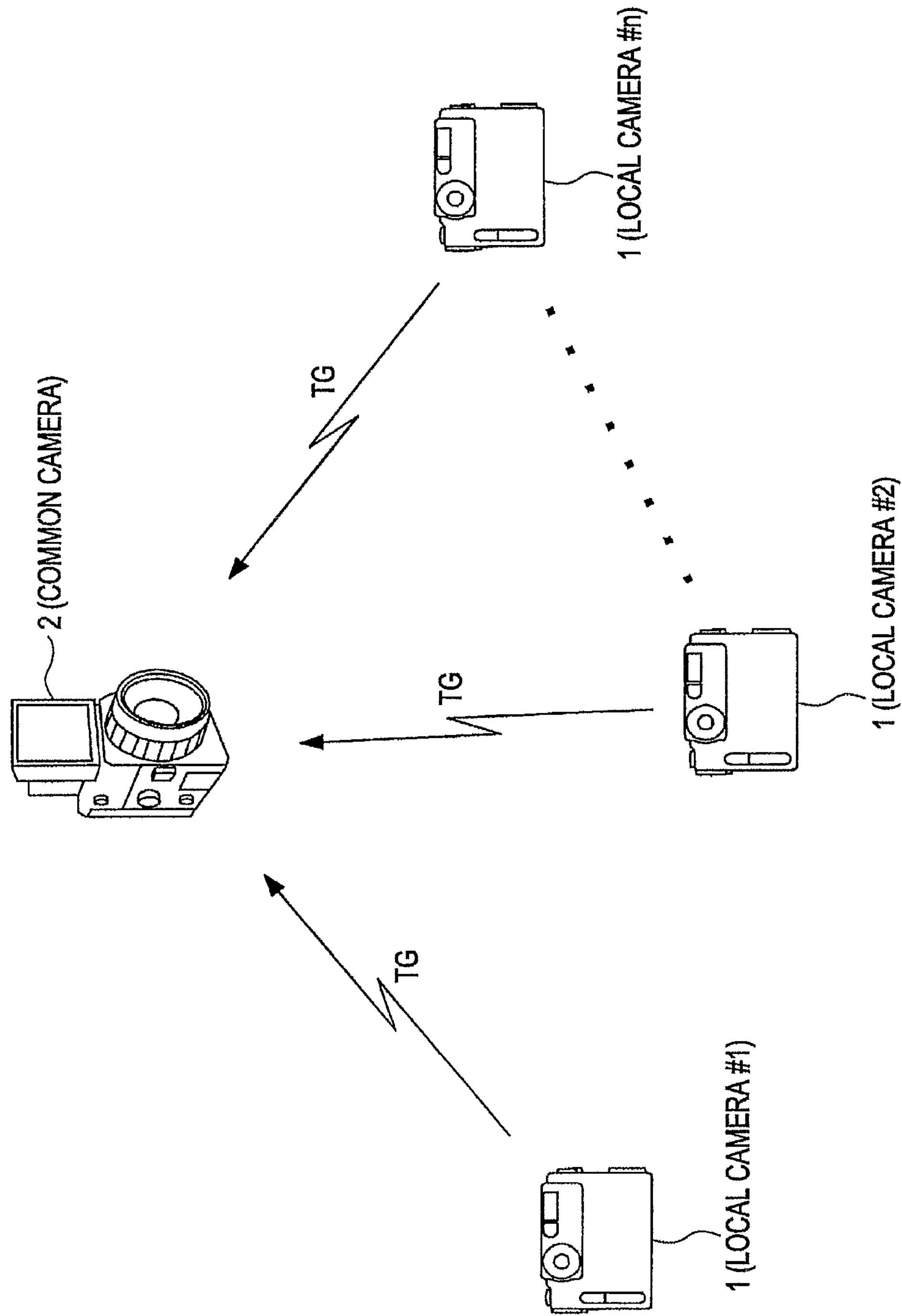
FIG. 27 is an explanatory diagram of a system example of the common camera and local camera according to the tenth embodiment.
Figure 28:
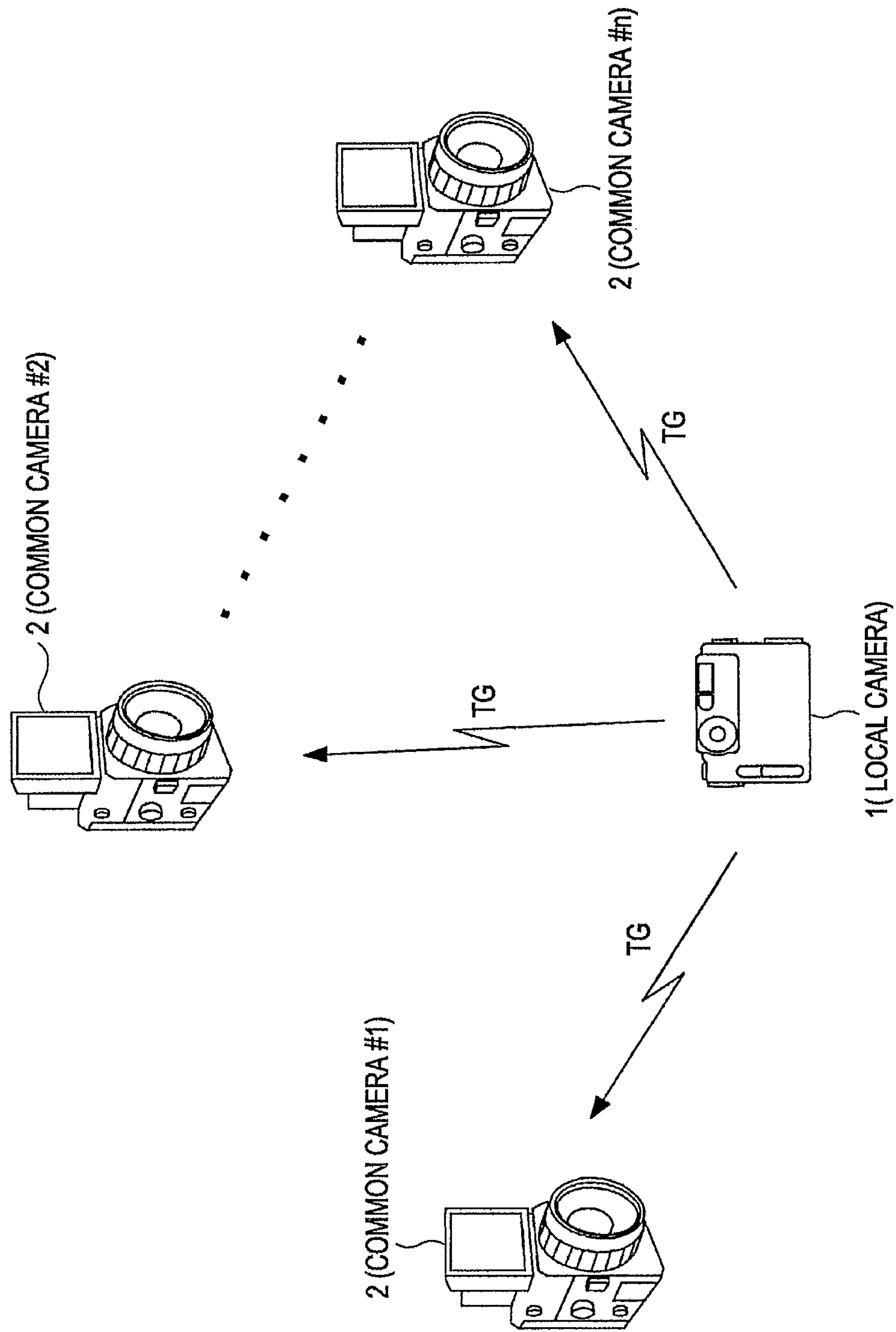
FIG. 28 is an explanatory diagram of a system example of the common camera and local camera according to the tenth embodiment.
Figure 29:
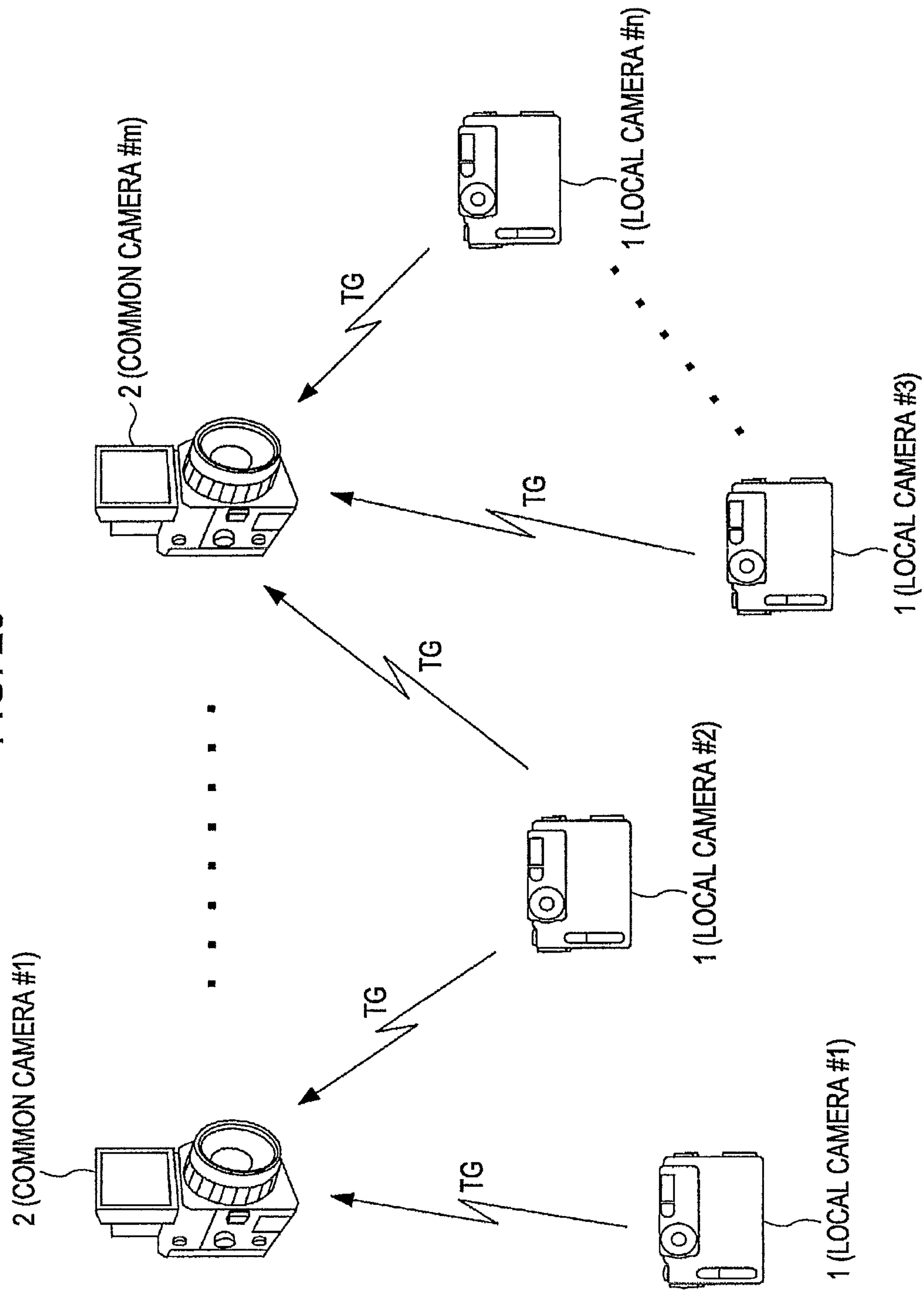
FIG. 29 is an explanatory diagram of a system example of the common camera and local camera according to the tenth embodiment.

As a system configuration in these cases, pattern examples other than a configuration made up of the one local camera 1 and the one common camera 2 will be illustrated in FIG. 27, FIG. 28, and FIG. 29.

FIG. 27 is a system example made up of the one common camera 2 and the multiple local cameras 1. The common camera 2 performs a recording operation based on the trigger signal TG from each of the local cameras 1. With this system, the overall image is image-captured/recorded by the one common camera 2, and on the other hand, multiple common users each possess the local camera 1, and perform arbitrary image capturing/recording. Each of the users can be provided with the common image Vc corresponding to the local image VL recorded by himself/herself.

FIG. 28 is a system example made up of the multiple common cameras 2 and the one local camera 1. Each of the common cameras 2 performs a recording operation based on the trigger signal TG from the local camera 1.

In this case, various images can be obtained as the common images Vc by the common camera 2. As long as the user of the local camera 1 simply performs arbitrary shooting, the user can obtain the various common images Vc based on the image capturing/recording timing thereof.

FIG. 29 is a system example made up of the multiple common cameras 2 and the multiple one local cameras 1.

An arrangement may be made wherein all of the common cameras 2 always perform recording of an image in response to the trigger signal TG from all of the local cameras 1, or for example, an arrangement can be conceived wherein the respective common cameras 2 are installed at places having some distance therebetween such as a wide event site, a theme park, and so forth, and in the event that the user possessing the local camera 1 approaches and performs recording of an image (in the event of being included in the transmission/reception range of the trigger signal TG), the common camera 2 thereof performs recording of an image.

With these system examples, the local camera 1 may be any one of a still camera, video camera, and silver-salt camera, and in the event of employing the multiple local cameras 1, may be a mixture thereof. Also, the common camera 2 may be any one of a still camera, and video camera, or may be a mixture.

It is only necessary that the local camera 1 and the common camera 2 perform the operations of the above embodiments depending on the machine configuration thereof.

3. Embodiments for Performing Trigger Transmission from Common Cameras 3-1. Eleventh Embodiment Subsequently, description will be made regarding a case wherein the local camera 1 is the second image capturing device referred by the claims of the present invention, and the common camera 2 is the first image capturing device, as the eleventh through twenty-first embodiments.

That is to say, this is a system wherein the trigger signal. TG is transmitted from the common camera 2 to the local camera 1.

Let us say that the eleventh embodiment is an example wherein both of the local camera 1 and the common camera 2 are still cameras, and description thereof will be made with reference to FIG. 30, FIG. 31, and FIG. 32.

Figure 30:
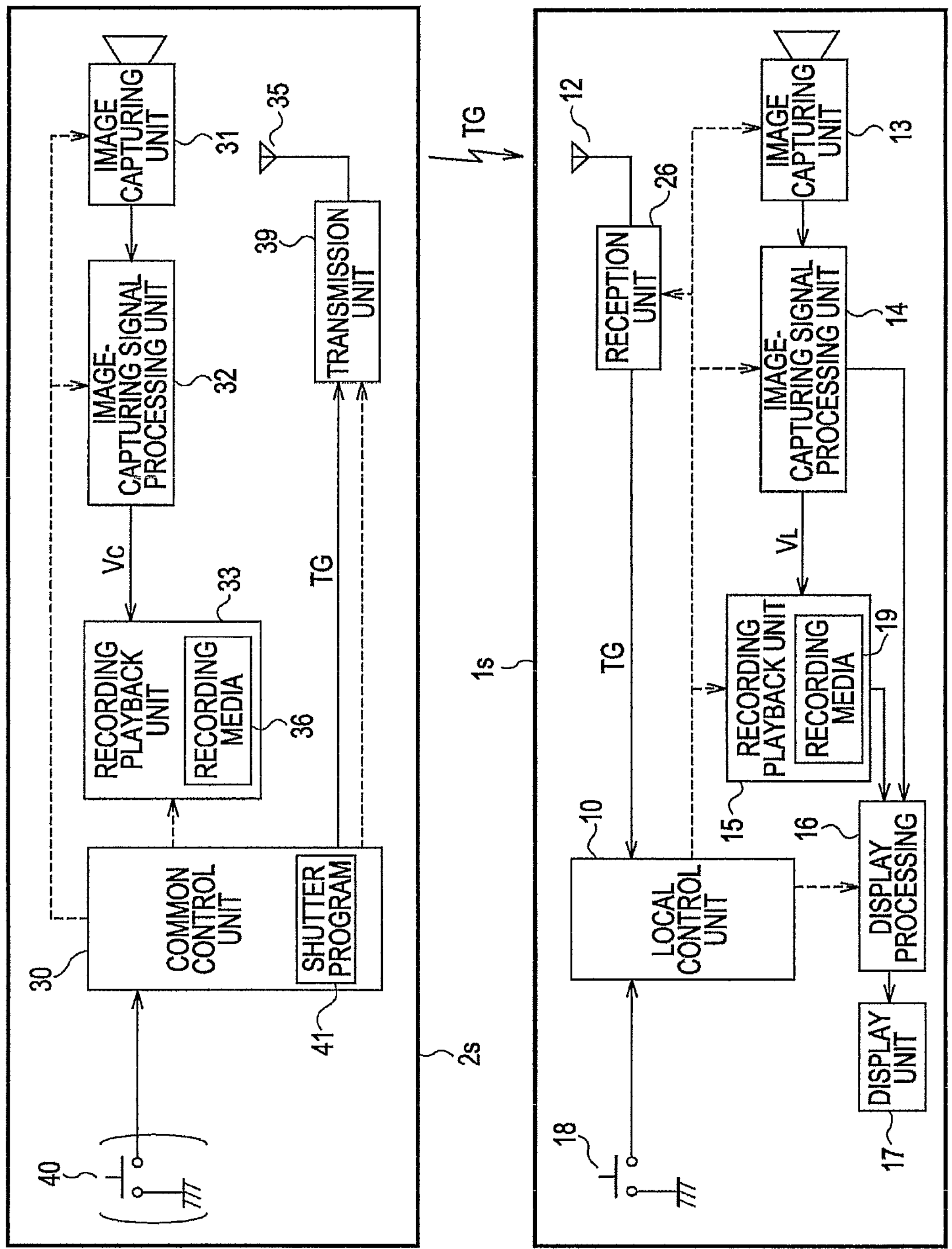
FIG. 30 is a block diagram of a common camera and local camera according to an eleventh embodiment.

FIG. 30 illustrates the configurations of the local camera 1*s* and the common camera 2*s*, according to the eleventh embodiment.

The local camera 1*s* has, as with the above embodiments, a local control unit 10, an antenna 12, an image capturing unit 13, an image-capturing signal processing unit 14, a recording playback unit 15, a display processing unit 16, a display unit 17, and a shutter switch 18.

Further, with this eleventh embodiment, a reception unit 26 for receiving the trigger signal TG to be transmitted from the common camera 2*s* is provided.

The common camera 2*s* includes, as with the above embodiments, a common control unit 30, an image capturing unit 31, an image-capturing signal processing unit 32, a recording playback unit 33, and an antenna 35. Also, in this case, the common camera 2*s* includes a transmission unit 39 for transmitting the trigger signal TG.

In this case, one of or both of a shutter switch 40 and a shutter program 41 are provided, which enables the shutter timing at the common camera 2*s* side to be obtained.

The shutter switch 40 is provided such that, for example, the staff of a service dealer or the like who employs the common camera 2*s* performs a shutter operation.

The shutter program 41 is a program for the common control unit 30 automatically performing shutter control. This can be conceived such as a program for setting the point-in-time of shutter timing depending on the content of an event or the like, a program for instructing periodical timing, or a program for detecting shutter timing in accordance with an instruction from an automatic control system such as the attraction or the like of a theme park.

Figure 31:
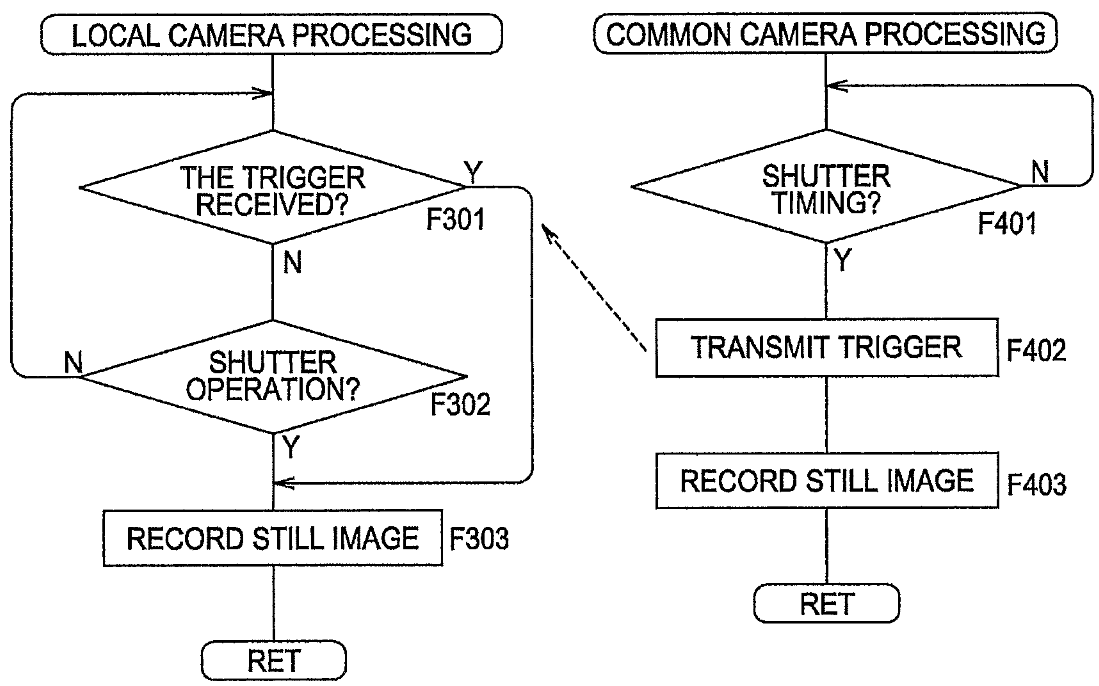
FIG. 31 is a flowchart of processing according to the eleventh embodiment.

FIG. 31 illustrates the processing of the local control unit 10, and the processing of the common control unit 30. The processing in FIG. 31 is processing in the case wherein both of the local camera 1*s* and the common camera 2*s* are supplied with power, and also are in a state in which image capturing (monitor display) of a subject is performed as the image capturing mode (i.e., a state of waiting for shutter timing).

The common control unit 30 stands by for shutter timing in step F401. The term "shutter timing" is timing when the staff operates the shutter switch 40, or timing instructed by the shutter program 41.

Upon detecting shutter timing, the common control unit 30 controls the transmission unit 39 to transmit the trigger signal TG in step F402.

At the same time, the common control unit 30 performs still-image recording control. That is to say, the common control unit 30 controls the image-capturing signal processing unit 32 and the recording playback unit 33 to execute recording of an image-capture image (common image Vc) at the shutter timing.

On the other hand, the local control unit 10 monitors that the trigger signal TG is received by the reception unit 26 as step F301, and also monitors the operation of the shutter switch 18 by the user in step F302.

Subsequently, in the event of receiving the trigger signal TG, and in the event of detecting a shutter operation, the processing proceeds to step F303, where the local control unit 10 performs still-image recording control. That is to say, the local control unit 10 controls the image-capturing signal processing unit 14 and the recording playback unit 15 to execute recording of an image-capture image (common image VL).

According to this processing, with the common camera 2*s* side, recording of the common image Vc at the shutter timing by setting or operation is performed, and on the other hand, with the local camera 1*s* possessed by the user, the local image VL at the timing according to the shutter operation by the user, and the local image VL in sync with the common image Vc at the common camera 2*s* are recorded.

Figure 32:
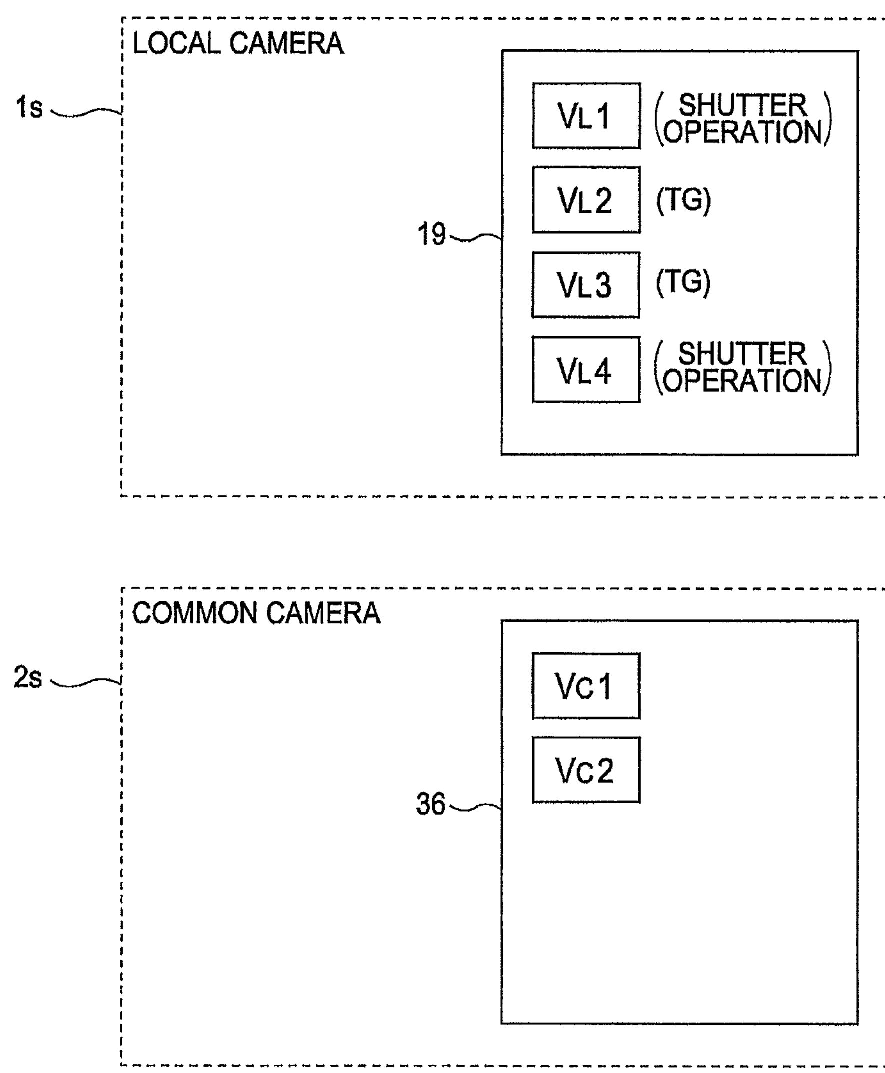
FIG. 32 is an explanatory diagram of an image recorded with the eleventh embodiment.

FIG. 32 illustrates the recording states of the recording media 19 within the recording playback unit 15 at the local camera 1*s* side, and the recording media 36 within the recording playback unit 33 at the common camera 2*s* side. For example, let us say that the local images VL1 and VL4 are recorded in the recording media 19 in response to the shutter operation of the user of the local camera 1*s*.

Also, if we say that with the common camera 2*s* side, the common images Vc1 and Vc2 are recorded in the recording media 36 at certain shutter timing, recording of the local image VL is also performed at the local camera 1*s* side in response to the trigger signal TG at that time. For example, the local images VL2 and VL3 are recorded at the same timing as the common images Vc1 and Vc2.

That is to say, this system is suitable for a situation in which the common camera 2*s* side can understand and manage the progression and time schedule of an event or the like, and can know the most appropriate shutter timing and so forth beforehand. That is to say, with the common camera 2*s*, recording of the common image Vc is performed at the most appropriate timing as to a subject, and also with the local camera 1*s*, recording of the local image VL is performed at the timing thereof by the common camera 2*s* transmitting the trigger signal TG, and accordingly, recording of the local image VL can be performed at the local camera 1*s* without missing the most appropriate timing.

With the local camera 1*s*, recording of the local image VL is performed by a shutter operation at an arbitrary time point, image capturing/recording which the user desires is realized, of course.

Incidentally, with the respective examples described below from this eleventh embodiment to the twentieth embodiment, recording of an image based on the trigger signal TG from the common camera 2 is performed at the local camera 1. In this case, unless the local camera 1 appropriately captures a subject at a time point of the trigger signal TG being received, it is difficult to obtain the preferable local image VL.

Therefore, in the event of assuming that the local camera 1 is a device which the user possesses, and with which the user arbitrarily performs image capturing, it is appropriate to inform the user (local camera 1) to perform standby of image capturing beforehand.

Description will be made later regarding an operation for performing such standby notification with reference to FIG. 55.

On the other hand, in the event of assuming that the local camera 1 is not a camera device possessed by a common user, for example, the local camera 1 is a device which is installed fixedly at a certain place, or is possessed by a business staff, or the like, thereby always capturing a subject side, there is no need to perform standby notification.

3-2. Twelfth Embodiment

Similarly, with an example wherein the local camera 1 and the common camera 2 are both still cameras, the twelfth embodiment will be described with reference to FIG. 33, FIG. 34, and FIG. 35.

With the above eleventh embodiment, in the event of a system including the multiple common cameras 2, it is difficult to determine at which common camera 2 the common image Vc in sync with the local image VL recorded in response to the trigger signal TG at the local camera 1 side was recorded.

Therefore, with the twelfth embodiment, an arrangement is made wherein the identifying information (ID) of the common camera 2 is transmitted along with the trigger signal TG, and the identifying information (ID) of the identifying information 1 of the common camera is recorded at the local camera 1 side so as to correspond to the local image VL.

FIG. 33 illustrates the configurations of the twelfth embodiment. The common camera 2*s* is provided with an ID storing unit 42, which stores the ID (identifying code information) inherent in the common camera 2*s*. This ID may be a serial number or the like to be provided fixedly to the equipment serving as the common camera 2*s* at the time of manufacturing, or may be a code number which is arbitrarily set as to each of the multiple common cameras 2, and is written in the ID storing unit 42. The type as the ID storing unit 42, such as ROM, RAM, flash memory, or the like, may be any type as long as it corresponds to the form of these IDs, so may be the internal memory of the microcomputer serving as the common control unit 30, of course.

When transmitting the trigger signal TG from the transmission unit 39, the common control unit 30 transmits the ID stored in the ID storing unit 42 together.

With the local camera 1*s* side, the reception unit 26 receives the ID along with the trigger signal TG, and hands this to the local control unit 10. The local control unit 10 supplies the ID to the recording playback unit 15 as recording data, and controls the recording playback unit 15 to record this in the recording media 19 so as to correspond to the common image Vc.

Figure 34:
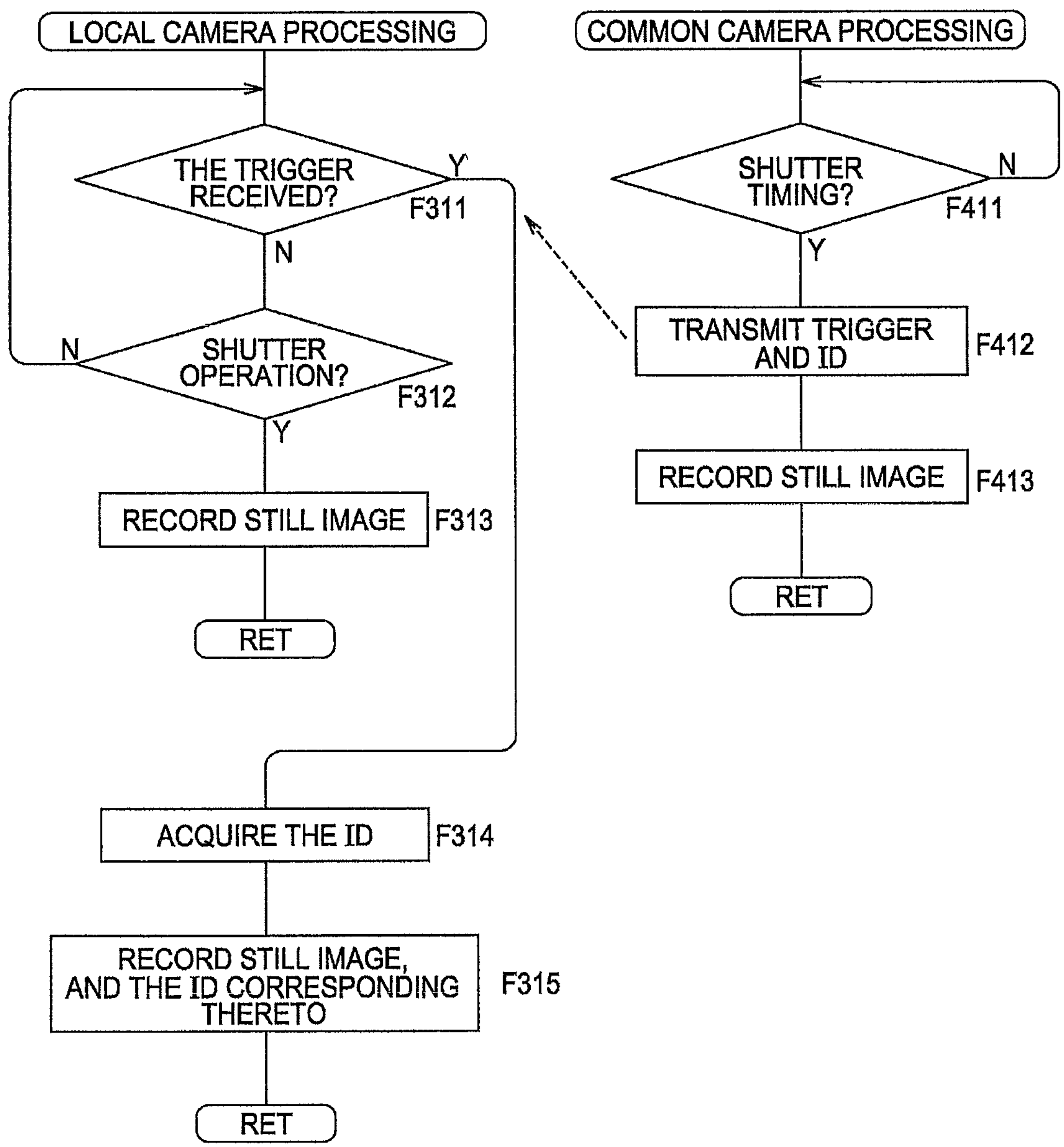
FIG. 34 is a flowchart of processing according to the twelfth embodiment.

FIG. 34 illustrates the processing of the local control unit 10 and the common control unit 30. This processing is processing in a state in which both of the local camera 1*s* and the common camera 2*s* are supplied with power, and also image capturing (monitor display) of a subject is performed as the image capturing mode.

The common control unit 30 stands by for shutter timing in step F411. Upon detecting shutter timing by the operation of the shutter switch 40 of the staff, or by the instruction of the shutter program 41, the common control unit 30 controls the transmission unit 39 to transmit the trigger signal TG and the ID stored in the ID storing unit 42 in step F412.

Subsequently, the common control unit 30 performs of the still-image recording control of the common image Vc.

On the other hand, the local control unit 10 monitors that the trigger signal TG is received by the reception unit 26 as step F311, and also monitors the operation of the shutter switch 18 by the user in step F312.

Subsequently, in the event of detecting a shutter operation in step F312, the processing proceeds to step F313, where the local control unit 10 performs still-image recording control. That is to say, the local control unit 10 controls the image-capturing signal processing unit 14 and the recording playback unit 15 to execute recording of an image-captured image (local image VL).

Also, in the event of detecting reception of the trigger signal TG, the local control unit 10 acquires the ID received along with the trigger signal TG as recording data in step F314. Subsequently, the local control unit 10 performs recording control of the local image VL as a still image, and the ID corresponding thereto in step F315. That is to say, the local control unit 10 controls the image-capturing signal processing unit 14 and the recording playback unit 15 to execute recording of an image-captured image (local image VL) at the trigger-received timing, and also record the ID in the recording media 19 as appended data as to the local image VL.

According to this processing, the local images VL are recorded along with the IDs of the respective common cameras 2*s*.

Figure 35:
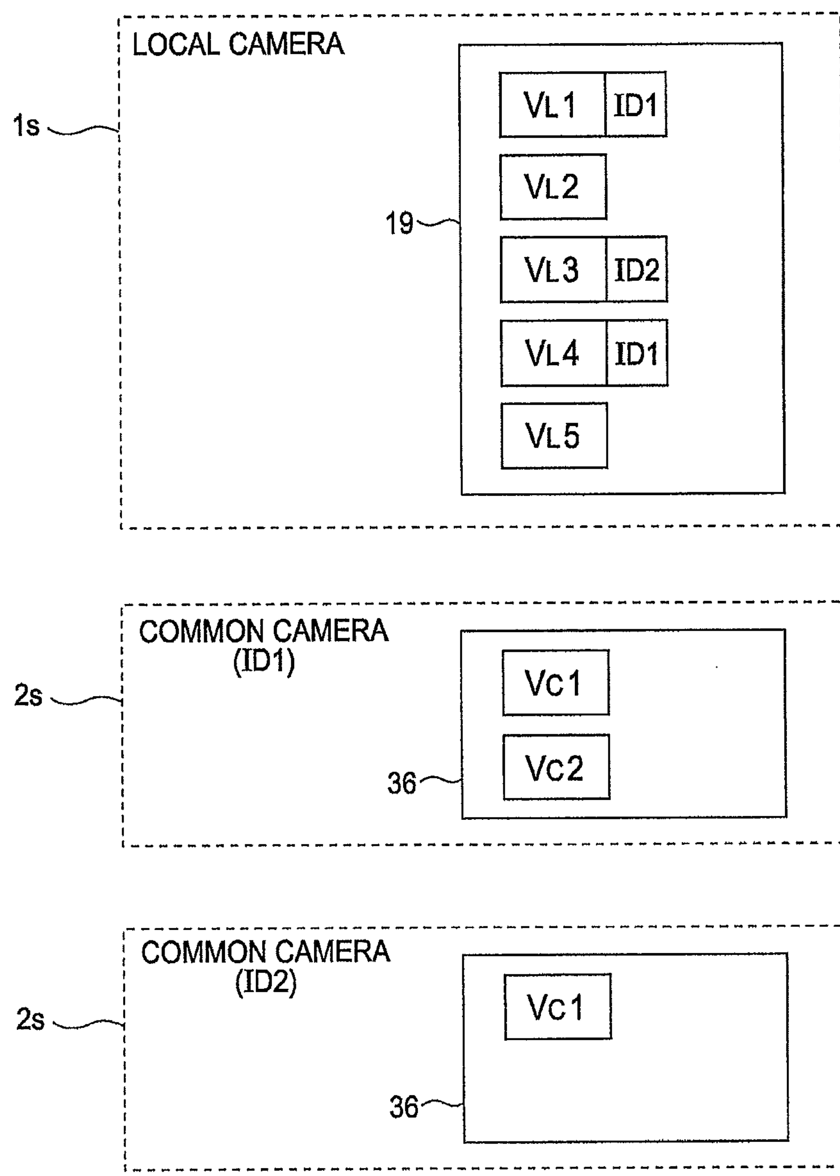
FIG. 35 is an explanatory diagram of an image recorded with the twelfth embodiment.

FIG. 35 illustrates the recording states of images at the local camera 1*s* and the two common cameras 2*s*. Let us say that with the two common cameras 2*s*, the ID1 and ID2 are set as the respective IDs.

With the common camera 2*s* of the ID1, let us say that shutter timing occurred twice, and the common images Vc1 and Vc2 were recorded in the recording media 36.

Also, with the common camera 2*s* of the ID2, let us say that shutter timing occurred once, and the common image Vc1 was recorded in the recording media 36.

With the local camera 1*s* side, recording of the local image VL is performed in response to the trigger signal from the respective common cameras 2*s*, and the shutter operation of the user. Therefore, the three local images VL1, VL3, and VL4 are recorded in response to the trigger signal TG transmitted three times in total from the two common cameras 2*s*. Additionally, the IDs of the common cameras 2*s* are associated with these local images VL1, VL2, and VL3, and recorded in the recording media 19. According to the shutter operation of the user, if we say that the two local images VL2 and VL5 were recorded, it is needless to say that no ID was recorded so as to correspond to these.

Thus, the local images VL are associated with the IDs of the common cameras 2*s*, whereby it can be understood which common image Vc of the common cameras 2*s* each of the local images VL is associated with. Also, it can be determined that the local images VL to which no ID is appended are due to the shutter operation of the user himself/herself.

Incidentally, transmitting the IDs from the common cameras 2*s* can be employed not only for identifying of correspondence of images such as described above but also for a service business.

For example, a service dealer informs a user whom a service is provided to of the ID of the particular common camera 2*s* to request the user to input this in the local camera 1*s* beforehand. Subsequently, with the local camera 2*s* side, in the event that the ID transmitted along with the trigger signal TG is identical with the ID that has been input (if correspondence is confirmed), the trigger signal thereof is taken as an effective trigger. Thus, the common camera 2*s* which can be used for each user can be set. Now, an arrangement can be conceived wherein the ID of the common camera 2*s*, and a program for executing processing for collating an ID, and so forth are recorded in the recording media 19 to be provided to a user, and are installed to the local camera 1 side from the recording media 19 thereof by the user.

3-3. Thirteenth Embodiment

Similarly, with an example wherein the local camera 1 and the common camera 2 are both still cameras, the thirteenth embodiment will be described with reference to FIG. 36, FIG. 37, and FIG. 38.

With the thirteenth embodiment, the common camera 2*s* side records various types of meta data so as to correspond to the common image Vc. Also, the local camera 1*s* side records various types of meta data so as to correspond to the local image VL.

As for meta data, there are meta data MTDL to be generated at the local camera 1*s* side, and meta data MTDc to be generated at the common camera 2*s* side. With the present example, let us say that this meta data MTDc is associated with the common image Vc and recorded in the recording media 36 at the common camera 2*s* side, and both of the meta data MTDL and MTDc are associated with the local image VL and recorded in the recording media 19 at the local camera 1*s* side.

FIG. 36 illustrates the configurations of the local camera 1*s* and the common camera 2*s*. In addition to the configurations illustrated in FIG. 33, in the case of FIG. 36, the common camera 2*s* is provided with a meta-data generating unit 37.

When transmitting the trigger signal TG from the transmission unit 39, the common control unit 30 also transmits the ID stored in the ID storing unit 42, and the meta data MTDc to be generated at the meta data generating unit 37.

Also, the common control unit 30 supplies the meta data MTDc generated at the meta-data generating unit 37 to the recording playback unit 33 as recording data, and controls the recording playback unit 33 to associate the meta data MTDc with the common image Vc, and record this in the recording media 36.

At the local camera 1*s* side the reception unit 26 receives the ID along with the trigger signal TG, and hands these to the local control unit 10.

Also, the local camera 1*s* is provided with a meta-data generating unit 21.

The local control unit 10 supplies the received ID, meta data MTDc, and the meta data MTDL generated at the meta-data generating unit 21 to the recording playback unit 15 as recording data, and controls the recording playback unit 15 to associate this recording data with the local image VL, and record this in the recording media 19.

Figure 37:
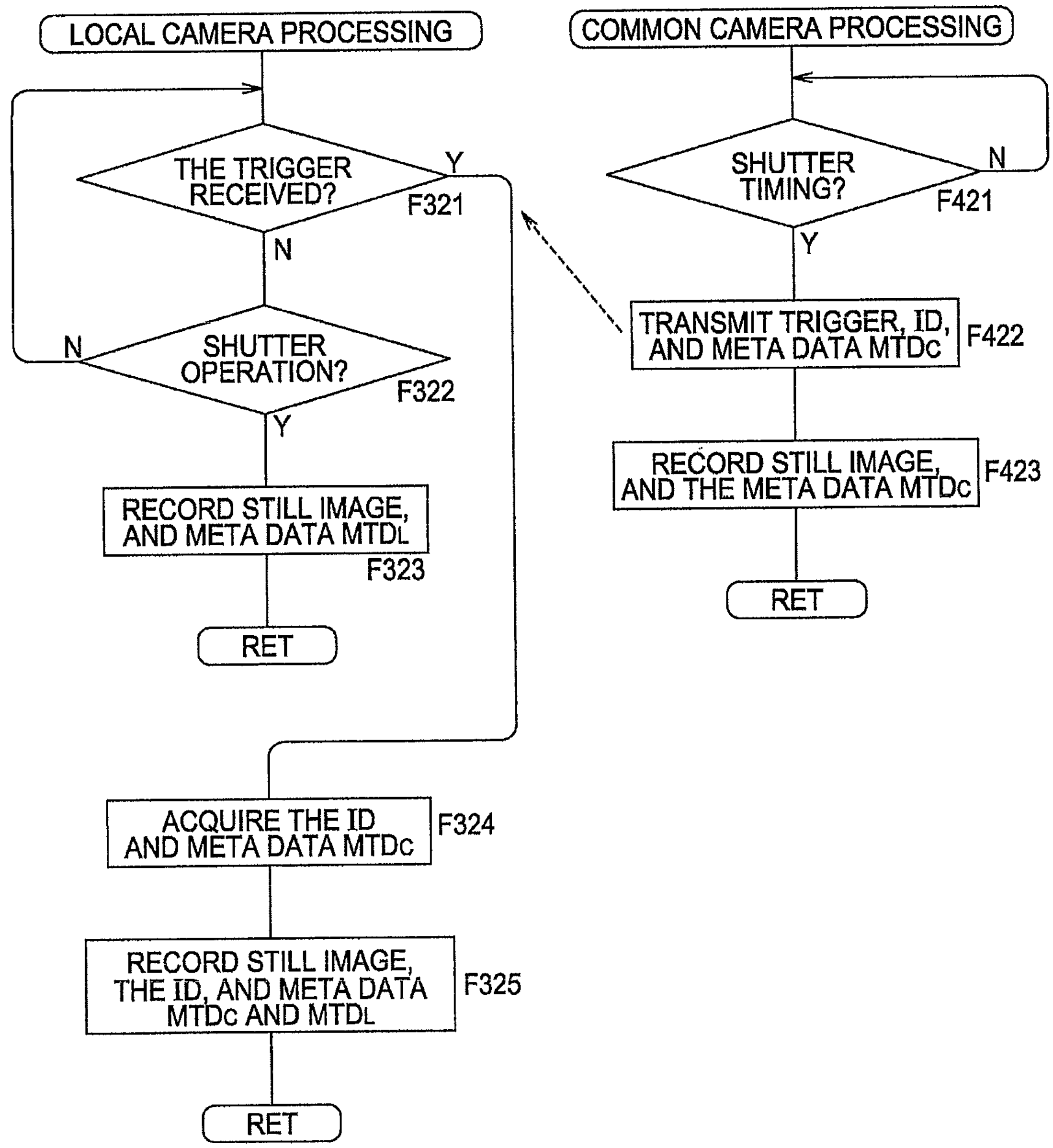
FIG. 37 is a flowchart of processing according to the thirteenth embodiment.

FIG. 37 illustrates the processing of the local control unit 10 and the common control unit 30. This processing is processing in a state in which both of the local camera 1*s* and the common camera 2*s* are supplied with power, and also image capturing (monitor display) of a subject is performed as the image capturing mode to wait for shutter timing.

The common control unit 30 stands by for shutter timing in step F421. Upon detecting shutter timing by the operation of the shutter switch 40 of the staff, or by the instruction of the shutter program 41, in step F422 the common control unit 30 supplies the ID stored in the ID storing unit 20, the meta data MTDc generated at the meta-data generating unit 37 to the transmission unit 39 along with the trigger signal TG, and controls the transmission unit 39 to transmit these.

Also, in step F423 the common control unit 30 performs the still-image recording control of the common image Vc, and also supplies the meta data MTDc to the recording playback unit 33, and controls the recording playback unit 33 to associate the meta data MTDc with the common image Vc, and record this in the recording media 36.

On the other hand, the local control unit 10 monitors that the trigger signal TG is received by the reception unit 26 as step F321, and also monitors the operation of the shutter switch 18 by the user in step F322.

Subsequently, in the event of detecting a shutter operation in step F322, the processing proceeds to step F323, where the local control unit 10 performs still-image recording control. In this case, the local control unit 10 controls the image-capturing signal processing unit 14 and the recording playback unit 15 to execute recording of an image-captured image (local image VL). Also, the local control unit 10 supplies the meta data MTDL generated at the meta-data generating unit 21 to the recording playback unit 15, and controls the recording playback unit 15 to associate this with the local image VL, and record this.

In the event of detecting reception of the trigger signal TG in step F321, the local control unit 10 acquires the ID and meta data MTDc received along with the trigger signal TG as recording data in step F324. Subsequently, the local control unit 10 performs recording control of the local images VL as still images, and the ID, meta data MTDc and MTDL corresponding thereto in step F325. That is to say, the local control unit 10 controls the image-capturing signal processing unit 14 and the recording playback unit 15 to execute recording of an image-captured image (local image VL) at the trigger-received timing, and also record the received ID, meta data MTDc, and further the meta data MTDL generated at the meta-data generating unit 21 in the recording media 19 as appended data as to the local image VL thereof.

According to this processing, with both of the local camera 1*s* and the common camera 2*s*, the meta data MTDL and MTDc is recorded along with the local images VL and the common images Vc.

Figure 38:
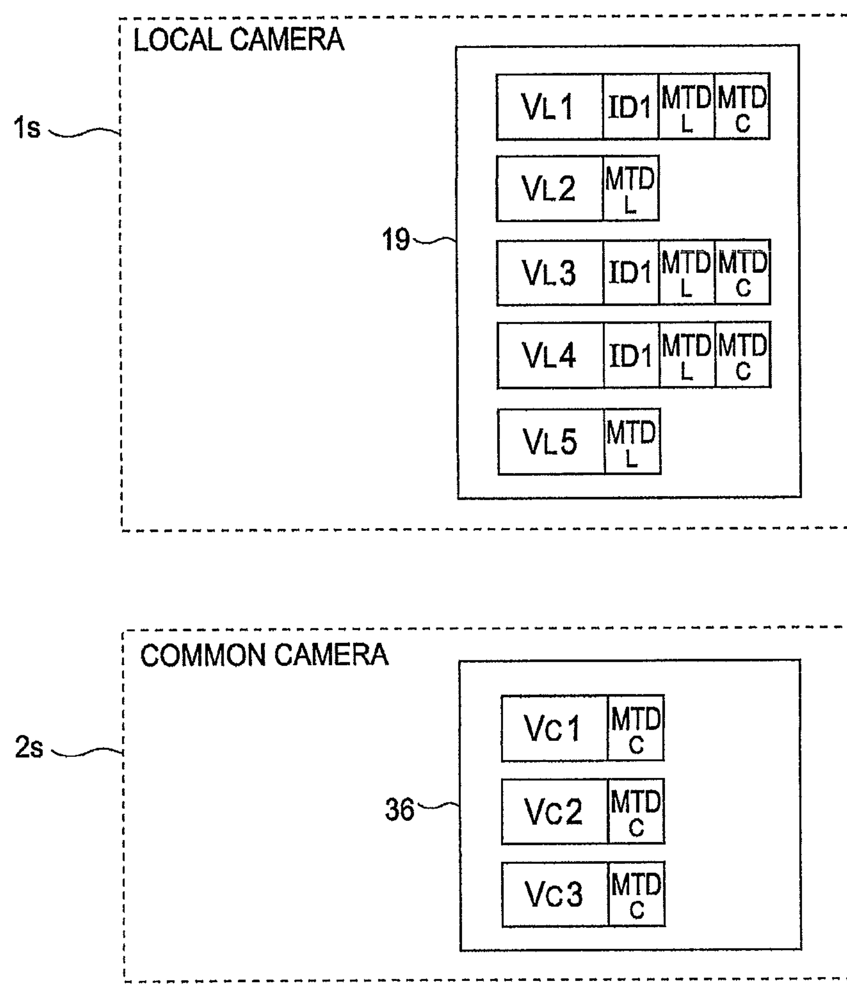
FIG. 38 is an explanatory diagram of an image recorded with the thirteenth embodiment.

FIG. 38 illustrates the recording states of images at the local camera 1*s* and the common camera 2*s*.

With the common camera 2*s* side, if we say that shutter timing occurred three times, and the common images Vc1, Vc2, and Vc3 were recorded in the recording media 36, the meta data MTDc generated at the meta-data generating unit 37 is associated with these common images Vc1, Vc2, and Vc3, and recorded.

With the local camera 1*s* side, recording of the local image VL is performed in response to the trigger signal from the common camera 2*s*, and the shutter operation of the user. Therefore, for example, if we say that the three local images VL1, VL3, and VL4 were recorded in response to the trigger signal TG transmitted three times in total from the common camera 2*s*, the IDs and meta data MTDc transmitted from the common camera 2*s*, and the meta data MTDL generated at the meta-data generating unit 21 are associated with these local images VL1, VL2, and VL3, and recorded in the recording media 19.

According to the shutter operation of the user, if we say that the two local images VL2 and VL5 were recorded, the meta data MTDL generated at the meta-data generating unit 21 is associated with these, and recorded.

The ID of the common camera 2*s* is associated with the local images VL and recorded, whereby the advantage described with the above twelfth embodiment can be obtained.

Further, the meta data MTDL and MTDc is associated with the local images VL and recorded, whereby various types of information can be associated with the local image VL, or correspondence as to the common image Vc regarding each of the local images VL can be clarified.

As for the meta data MTDL to be generated at the meta-data generating unit 21 of the local camera 1*s*, for example, point-in-time information, positional information, the address information of the recording position of the local image VL in the recording media 19, the numbering information (e.g., value indicating which number of photograph) of the local image image-captured this time, the personal information of the user, and so forth can be conceived.

Also, as for the meta data MTDL to be generated at the meta-data generating unit 37 of the common camera 2*s*, for example, point-in-time information, positional information, the address information of the recording position of the common image Vc in the recording media 36, the numbering information (e.g., value indicating which number of photograph) of the common image image-captured this time, information such as a title, remarks and the like to be given to the common images Vc and local images VL, and so forth can be conceived.

Appending these meta data MTDL and MTDc enables various advantages described with the above third embodiment to be obtained.

Particularly, in the event that the content of an event, or the progress situation of an athletic meet, or the like where the common camera 2*s* side is image-capturing can be understood, e.g., in the event that a time schedule is managed beforehand, or the like, an appropriate keyword can be set in accordance with the point-in-time thereof. For example, the content of an event, a competition name, or the like can be set as a keyword. Such a keyword is arranged so as to be included in meta data MTDc, and is associated with the local image VL and recorded at the local camera 1*s* side, whereby the convenience of the user at the local camera 1*s* side can be improved.

An arrangement may be made wherein no meta-data generating unit 21 is provided at the local camera 1*s* side, and only the meta data MTDc generated at the meta-data generating unit 37 at the common camera 2*s* side is associated with the local image VL and recorded.

Inversely, an arrangement may be made wherein no meta-data generating unit 37 is provided at the common camera 2*s* side, and only the meta data MUM generated at the meta-data generating unit 21 at the local camera 1*s* side is associated with the local image VL and recorded.

Further, an arrangement may be made wherein recording of the meta data associated with the common image Vc is not performed at the recording playback unit 33 at the common camera 2*s* side.

3-4. Fourteenth Embodiment

Similarly, with an example wherein the local camera 1 and the common camera 2 are both still cameras, the fourteenth embodiment will be described with reference to FIG. 39, FIG. 40, and FIG. 41.

With the fourteenth embodiment, at the local camera 1*s* side like the above thirteenth embodiment, an ID and various types of meta data are associated with the local image VL and recorded, and additionally, these are associated with the common image Vc and recorded.

FIG. 39 illustrates the configurations of the local camera 1*s* and the common camera 2*s*. This case has almost the same configurations as those illustrated in the above FIG. 36, but the common camera 2*s* is assumed so as to supply the common image Vc and meta data MTDc which were played back at the recording playback unit 33 to the transmission unit 39.

When transmitting the trigger signal TG from the transmission unit 39 at shutter timing, the common control unit 30 controls the transmission unit 39 to transmit the ID stored in the ID storing unit 42 together with the meta data MTDc to be generated at the meta-data generating unit 37. Also, at this time, the common control unit 30 controls the recording playback unit 33 to record the meta data MTDc along with the common image Vc.

Further subsequently, the common control unit 30 supplies the ID stored in the ID storing unit 42, and the common image Vc and meta data MTDc played back at the recording playback unit 33 to the transmission unit 39, and controls the transmission unit 39 to transmit these.

With the local camera 1*s* side, the reception unit 26 receives the ID and meta data MTDc along with the trigger signal TG, and hands these to the local control unit 10.

Also, in the event of receiving the ID and meta data MTDc along with the common image Vc, the reception unit 26 hands these to the local control unit 10.

Figure 40:
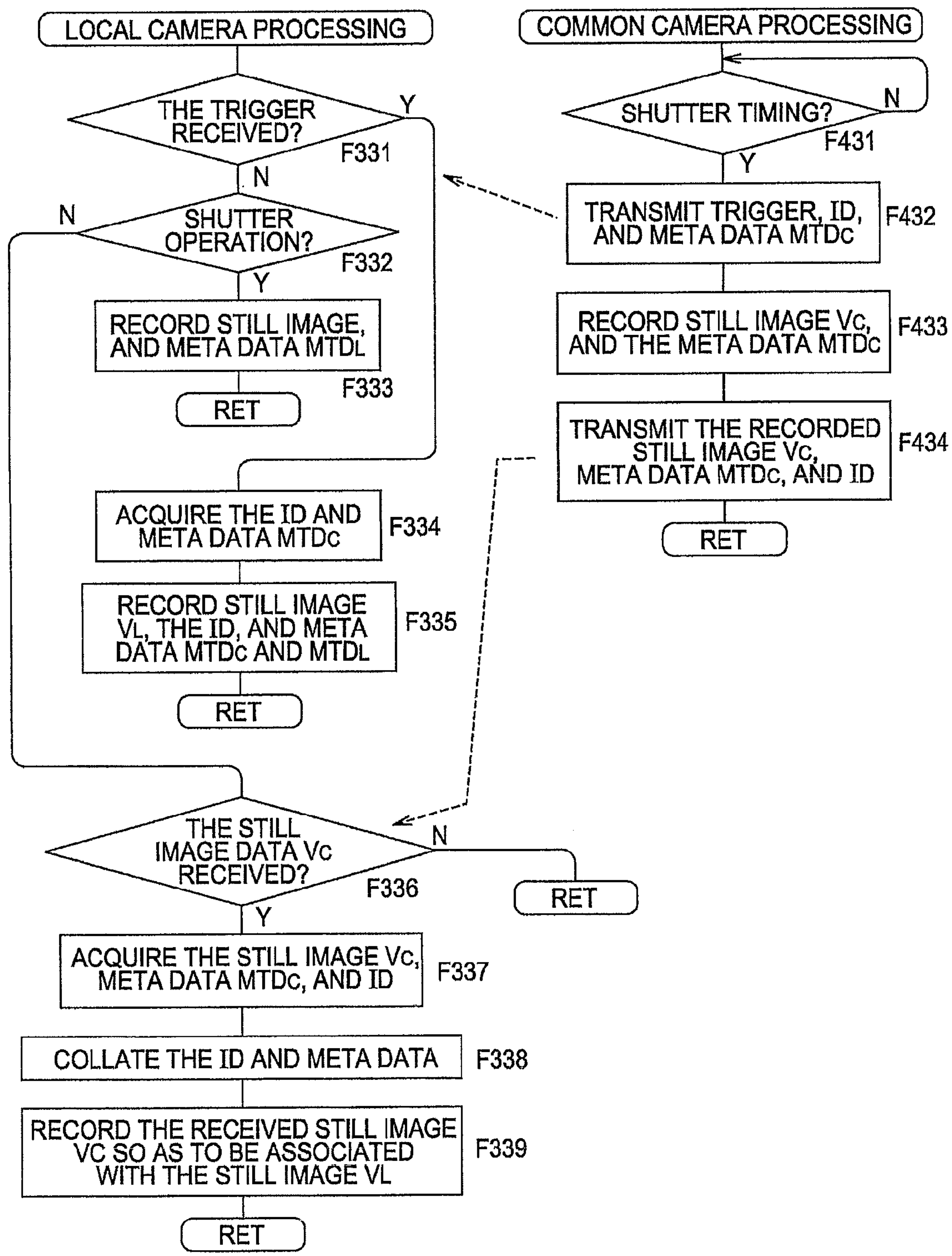
FIG. 40 is a flowchart of processing according to the fourteenth embodiment.

FIG. 40 illustrates the processing of the local control unit 10 and the common control unit 30. This processing is processing in a state in which both of the local camera 1*s* and the common camera 2*s* are supplied with power, and also image capturing (monitor display) of a subject is performed as the image capturing mode to wait for shutter timing.

When detecting shutter timing in step F431, in step F432 the common control unit 30 supplies the ID stored in the ID storing unit 42, and the meta data MTDc generated at the meta-data generating unit 37 along with the trigger signal TG, and controls the transmission unit 39 to transmit these.

Subsequently, the common control unit 30 performs still-image recording control of the common image Vc in step F433. At this time, the common control unit 30 supplies the meta data MTDc generated and transmitted at the time of step F432 to the recording playback unit 33, and controls the recording playback unit 33 to associate this with the common image Vc and record this.

Subsequently, in step F434, the common control unit 30 controls the recording playback unit 33 to play back the common image Vc and meta data MTDc recorded in the recording media 36 and supply these to the transmission unit 39. Also, at this time, the ID in the ID storing unit 42 is supplied to the transmission unit 39. Subsequently, the common control unit 30 controls the transmission unit 39 to transmit the common image Vc, meta data MTDc, and ID.

On the other hand, the local control unit 10 performs monitoring processing using the monitoring loop of steps F331, F332, and F336. That is to say, in step F331, the local control unit 10 monitors that the trigger signal TG is received at the reception unit 34, and monitors that the shutter switch 18 is operated in step F332. Further, in step F336, the local control unit 10 monitors that the common image Vc data is received at the reception unit 34.

At a certain time point, upon confirming reception of the trigger signal TG in step F331, the processing of the local control unit 10 proceeds to step F334, where the local control unit 10 acquires the ID and meta data MTDc received along with the trigger signal TG as recording data.

Subsequently, in step F335, the local control unit 10 performs recording control of a still image as the common image Vc, and the ID and meta data MTDL and MTDc corresponding thereto. That is to say, the local control unit 10 controls the image-capturing signal processing unit 14 and the recording playback unit 15 to execute recording of an image-captured image (common image Vc) at the trigger-received timing, and also record the ID and meta data MTDc, and the meta data MTDL generated at the meta data generating unit 21 in the recording media 19 as appended data as to the common image Vc.

Subsequently, the processing returns to the monitoring loop in step F331, F332, and F336.

In the event of detecting a shutter operation in step F332, the processing proceeds to step F333, where the local control unit performs still-image recording control. In this case, the local control unit 10 controls the image-capturing signal processing unit 14 and the recording playback unit 15 to execute recording of an image-captured image (local image VL). Also, the local control unit 10 supplies the meta data MTDL generated at the meta-data generating unit 21 to the recording playback unit 15, and controls the recording playback unit 15 to associate this with the local image VL and record this. Subsequently, the processing returns to the monitoring loop in steps F331, F332, and F336.

At a certain time point, upon confirming reception of the common image VC in step F336, the processing of the local control unit 10 proceeds to step F337, where the local control unit 10 acquires the still-image data as the common image Vc, and the ID and meta data MTDc received along with the common image Vc.

Next, the local control unit 10 collates the ID and meta data MTDc in step F338, and determines which local image VL the received common image VC is associated with.

In the above step F335, the ID and meta data MTDc are appended to and recorded in the local image VL. Subsequently, the ID and meta data MTDc acquired in step F337 is information which is recorded in the recording media 36 at the common camera 2*s* side at the same timing as the local image VL, played back, and transmitted. Accordingly, the local image VL to which the ID and meta data MTDc of which content is the same as the ID and meta data MTDc acquired in step F337 is appended should be recorded in the recording media 19. That is to say, determination can be made which local image VL the common image Vc transmitted this time is associated with by continuously collating the received ID and meta data MTDc with the ID and meta data MTDc associated with each of the local images VL in the recording media 19 to search the matched ID and meta data MTDc.

Note that in order to perform such consistent collating, point-in-time information is preferably included in the meta data MTDc. Also, positional information may be collated together.

According to the above collating processing, upon completing determination of the associated relation between the received common image Vc and the recorded local image VL, in step F339 the local control unit 10 supplies the common image Vc to the recording playback unit 15, and controls the recording playback unit 15 to associate this with the corresponding local image VL, and record this in the recording media 19.

According to this processing, at the local camera 1*s* side, the local images VL is recorded along with the meta data MTDL and MTDc, and also at a time point of the common image Vc being transmitted, the common image Vc is associated with the local image VL and recorded.

Figure 41:
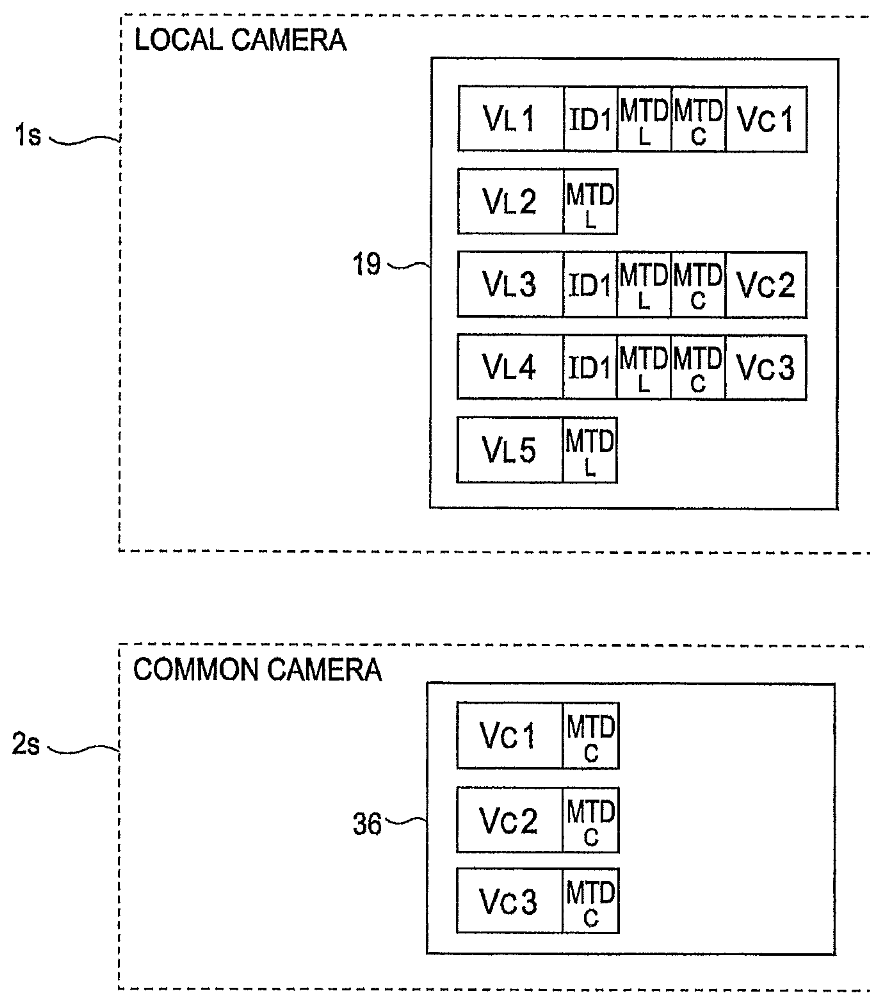
FIG. 41 is an explanatory diagram of an image recorded with the fourteenth embodiment.

FIG. 41 illustrates the recording states of images at the local camera 1*s* and the common camera 2*a*.

With the common camera 2*s* side, if we say that shutter timing occurred three times, and the common images Vc1, Vc2, and Vc3 were recorded in the recording media 36, the meta data MTDc generated at the meta-data generating unit 37 is associated with these common images Vc1, Vc2, and Vc3, and recorded.

With the local camera 1*s* side, recording of the local image VL is performed in response to the trigger signal TG from the common camera 2*s*, and the shutter operation of the user. Therefore, for example, if we say that the three local images VL1, VL3, and VL4 were recorded in response to the trigger signal TG transmitted three times in total from the common camera 2*s*, the IDs and meta data MTDc transmitted from the common camera 2*s*, and the meta data MTDL generated at the meta-data generating unit 21 are associated with these local images VL1, VL2, and VL3, and recorded in the recording media 19.

According to the shutter operation of the user, if we say that the two local images VL2 and VL5 were recorded, the meta data MTDL generated at the meta-data generating unit 21 are associated with these, and recorded.

Also, in response to that the common image Vc is transmitted from the common camera 2*s*, and the processing in the above steps F337 through F339 is performed, the common image Vc is associated with the particular local image VL, and recorded in the recording media 19.

That is to say, the common image Vc1 corresponding to the local image VL1, the common image Vc2 corresponding to the local image VL3, and the common image Vc3 corresponding to the local image VL4 are recorded, respectively.

According to the present example, thus, the local image VL and the common image Vc recorded simultaneously at the local camera 1*s* and the common camera 2*s* are in a state of being associated and stored in the recording media 19 at the local camera 1*s* side.

Therefore, the user employing the local camera 1*s* can obtain the local image VL and the common image Vc immediately.

Note that in the event that there is no need to associate the common images Vc with the local images VL individually, the collating processing in step F338 is unnecessary. In this case, the ID and meta data MTDc transmitted at the same time corresponding to the common image Vc are preferably recorded in the recording media 36.

3-5. Fifteenth Embodiment

The fifteenth embodiment will be described with reference to FIG. 42, FIG. 43, and FIG. 44.

Let us say that this fifteenth embodiment is an example in the case wherein the common camera 2 is a video camera for performing image capturing/recording of moving images, and the local camera 1 is a still camera.

The common camera 2*v* is almost the same as the common camera 2*s* in FIG. 30 from the perspective of the configuration on the drawing, but the recording playback unit 33 is configured so as to record the moving pictures from the image-capturing signal processing unit 32 in the recording media 36.

Also, a video switch 43 is provided for a staff performing a recording start/end operation of a moving image. For example, the common control unit 30 controls the recording playback unit 33 to start recording of a moving image by the video switch 43 being pressed, and end recording of the moving image by the video switch 43 being pressed again.

Note that it is needless to say that in addition to the portions illustrated in the drawing, configurations such as circuits, mechanisms, operating unit, and so forth which are necessary for a normal video camera are provided. Also, an unshown microphone and an audio processing system are provided, and with the recording playback unit 33, recording of an audio signal is performed along with recording of a moving-image picture.

Let us say that the configuration at the local camera 1*s* side is the same as that in FIG. 30.

Figure 43:
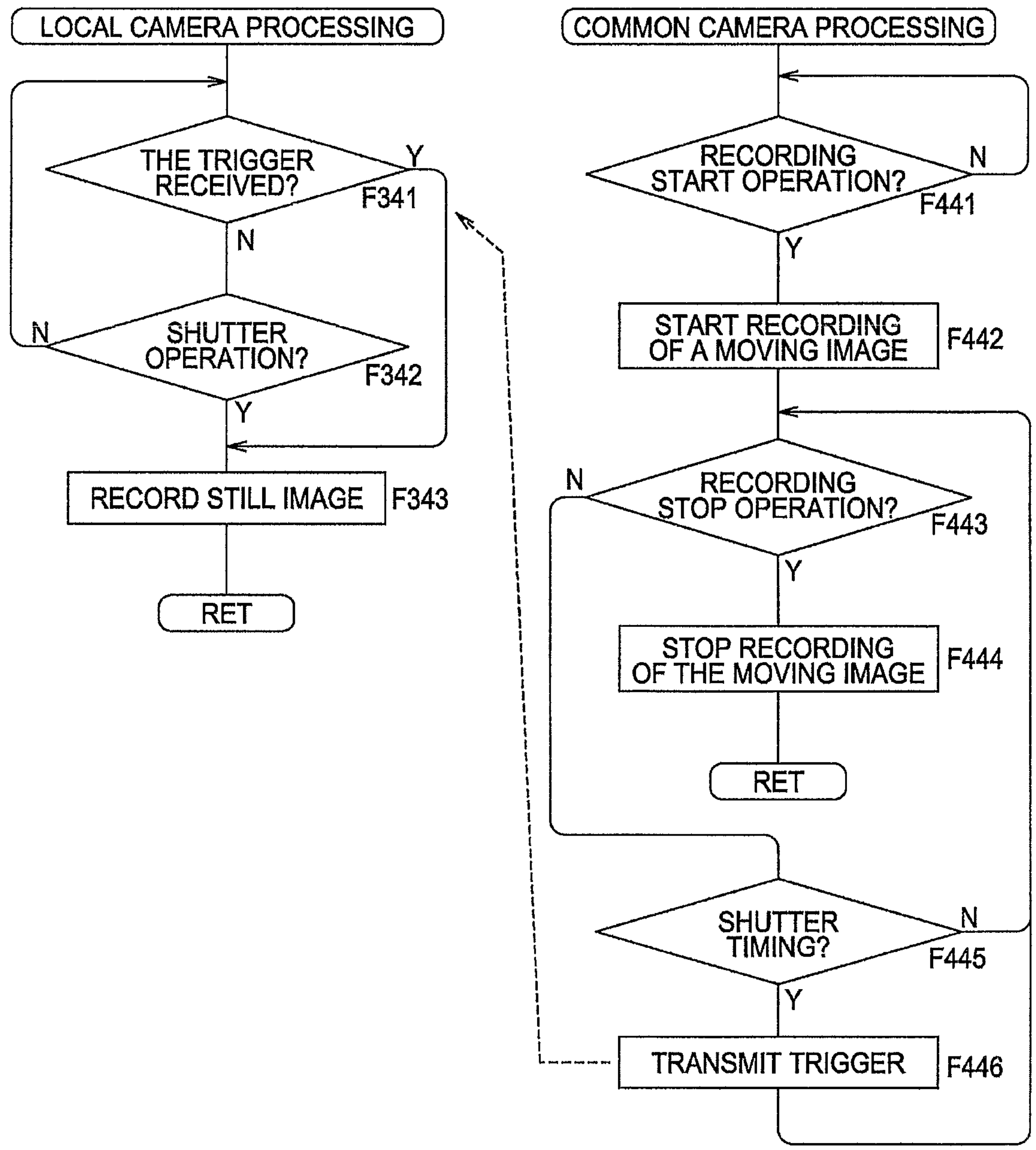
FIG. 43 is a flowchart of processing according to the fifteenth embodiment.

FIG. 43 illustrates the processing of the local camera 1*s* and the common camera 2*v*. The processing of the local camera 1*s* is processing in a state in which recording of a still image can be performed. Also, with the present example, let us say that the common camera 2*v* is always performing recording of a moving image, wherein the processing of the common camera 2*v* is processing from start of recording thereof to end.

The common control unit 30 makes recording of a moving image start in step F442 by the video switch 43 being pressed in step F441. That is to say, the common control unit 30 gives an instruction of recording of a moving image to the recording playback unit 33 and the image-capturing signal processing unit 32 to start an operation of recording a moving-image picture of a subject in the recording media 36.

For example, if we say that the common camera 2*v* always performs recording of a moving image, at a time point of an event, athletic meet, or the like beginning, the video switch 43 is operated by the staff or the like of the service dealer, resulting in start of recording of a moving image.

While continuously executing of recording of a moving image, the common control unit 30 monitors a recording stop operation in step F443, and also waits for shutter timing in step F445.

Upon detecting shutter timing by the shutter switch 40 or shutter program 41 in step F445, the common control unit 30 controls the transmission unit 39 to transmit the trigger signal TG in step F446.

Upon detecting a recording stop operation in step F443, the common control unit 30 controls the recording playback unit 33 to stop recording of the moving image in step F444. For example, at a time point of an event or athletic meet ending, the staff or the like of the service dealer performs a recording stop operation by the video switch 43.

The local control unit 10 monitors that the trigger signal TG is received by the reception unit 26 as step F341, and also monitors the operation of the shutter switch 18 by the user in step F342.

In the event of detecting reception of the trigger signal TG, and in the event of detecting a shutter operation, the processing proceeds to step F343, and where the local control unit 10 performs still-image recording control. That is to say, the local control unit 10 controls the image-capturing signal processing unit 14 and the recording playback unit 15 to execute recording of an image-captured image (local image VL).

According to this processing, consequently, while recording of a moving image is performed at the common camera 2*v* side, recording of a still image is performed at the local camera 1*s* side in response to the shutter operation by the user and the trigger signal TG from the common camera 2*v*.

FIG. 44 illustrates the recording states of images at the local camera Is and the common camera 2*v*.

Recording of a moving image is always performed at the common camera 2*v*, and accordingly, the common image Vc serving as the moving image thereof is recorded in the recording media 36.

With the local camera 1*s* side, recording of the local image VL is performed in response to the trigger signal TG from the common cameras 2*v*, and the shutter operation of the user. Therefore, for example, the three local images VL1, VL3, and VL4 are recorded in response to the trigger signal TG transmitted three times in total from the common camera 2*v*. Also, this provides a state in which the local image VL2 is recorded by the shutter operation of the user.

According to the present example, with the local camera 1*s*, the user can perform recording of the local image VL by performing a shutter operation at an arbitrary time point, and also can realize recording of the local image VL at an appropriate shutter opportunity by the trigger signal TG.

Also, recording of a moving image is always performed at the common camera 2*v* side, thereby enabling the overall or a part of the moving image thereof to be provided.

Note here that description has been made using an example wherein only the trigger signal TG is transmitted, but with a system made up of the local camera 1*s* and the common camera 2*v* such as the present example, various types of operations described with the above twelfth through fourteenth embodiments can be performed as well.

That is to say, an arrangement may be made wherein the ID and meta data MTDc are transmitted along with the trigger signal TG, these are recorded at the local camera 1*s* side so as to correspond to the local image VL and the meta data MTDL generated at the local camera 1*s* side is recorded so as to correspond to the local image VL.

Further, an arrangement can be conceived wherein with the common camera 2*v*, the meta data MTDc is recorded so as to correspond to the common image Vc as a moving image, also the recorded common image Vc and meta data MTDc are transmitted to the local camera 1*s* side, and the common image Vc as a moving image is recorded at the local camera 1*s* side so as to correspond to the local image VL.

Also, description has been made wherein the trigger signal TG is transmitted at the shutter timing determined by the shutter switch 40 or the shutter program 41, but the trigger signal TG may be transmitted with the operation timing of the video switch 43 as shutter timing. For example, an arrangement may be made wherein the trigger signal TG is transmitted in response to a recording start operation or stop operation, and a still image is recorded at the local camera 1*s* side.

Further, an arrangement may be made wherein at the time of shutter timing, not only transmission of the trigger signal TG is performed, but also recording of the common image Vc as a still image is performed at the recording playback unit 33.

3-6. Sixteenth Embodiment

The sixteenth embodiment will be described with reference to FIG. 45, FIG. 46, and FIG. 47.

Let us say that this sixteenth embodiment is an example in the case wherein the local camera 1 is a video camera for performing image capturing/recording of moving images, and the common camera 2 side is a still camera.

The local camera 1*v* is almost the same as the local camera 1*s* in FIG. 30 from the perspective of the configuration on the drawing, but the recording playback unit 15 is configured so as to record the moving pictures from the image-capturing signal processing unit 14 in the recording media 19.

Also, a video switch 22 is provided for the user performing a recording start/end operation of a moving image. For example, the local control unit 10 controls the recording playback unit 15 to start recording of a moving image by the video switch 22 being pressed, and end recording of the moving image by the video switch 22 being pressed again.

Note that it is needless to say that in addition to the portions illustrated in the drawing, configurations such as circuits, mechanisms, operating unit, and so forth which are necessary for a normal video camera are provided. Also, an unshown microphone and an audio processing system are provided, and with the recording playback unit 15, recording of an audio signal is performed along with recording of a moving-image picture.

Let us say that the configuration at the common camera 2*s* side is the same as that in FIG. 30.

Figure 46:
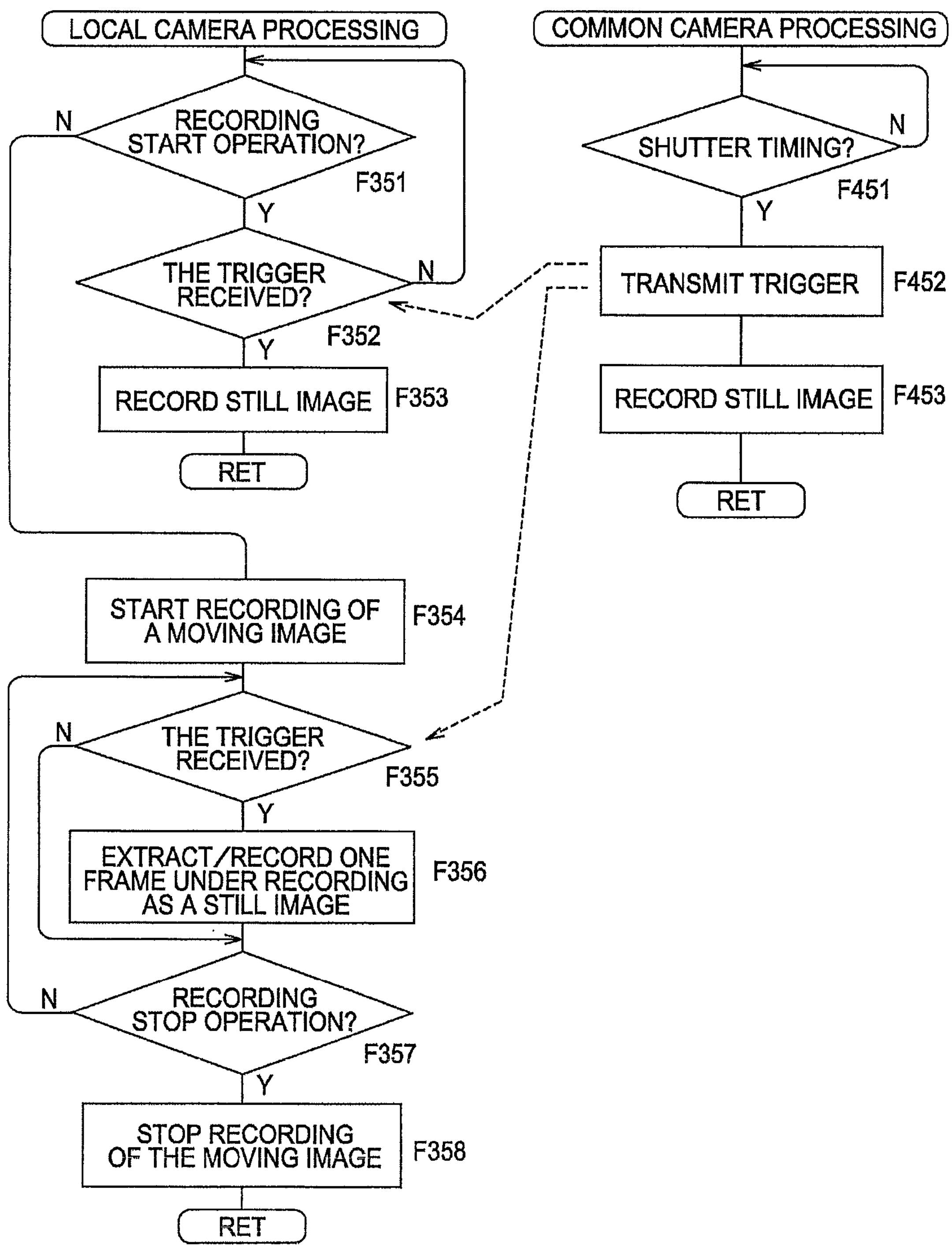
FIG. 46 is a flowchart of processing according to the sixteenth embodiment.

FIG. 46 illustrates the processing of the local camera 1*v* and the common camera 2*v*. The processing of the local camera 1*v* is processing at a certain time point wherein the user turns on the power of the local camera 1*v*, and the local camera 1*v* is in a standby state for recording of a moving image (recording), and the processing of the common camera 2*s* is processing at the time of being in a still-image recordable state.

The common control unit 30 waits for shutter timing in step F451. Upon detecting shutter timing as the timing of the shutter switch 40 being operated by the staff, or the timing instructed by the shutter program 41, the common control unit 30 controls the transmission unit 39 to transmit the trigger signal TG in step F452.

Subsequently, the common control unit 30 performs still-image recording control in step F453. That is to say, the common control unit 30 controls the image-capturing signal processing unit 32 and the recording playback unit 33 to execute recording of an image-captured image (common image Vc) at shutter timing.

With the local camera 1*v*, the picture of a subject image-captured by the image capturing unit 13 is monitor-displayed at the display unit 17 in a standby state prior to start of recording.

The local control unit 10 monitors the recording start operation of the video switch 22 in a standby state in step F351, and also monitors reception of the trigger signal TG in step F352.

In the event of detecting reception of the trigger signal TG in a standby state in which the user performs no recording start operation, the local control unit 10 executes recording of the local image VL as a still image as to the recording media 19 in step F353.

Also, in the event that the user performs the operation of the video switch 22 in a standby state, the local control unit 10 starts recording of a moving image as step F354. That is to say, the control unit 10 gives an instruction of recording of a moving image to the recording playback unit 15 and the image-capturing signal processing unit 14 to start a recording operation of a moving-image picture of a subject as to the recording media 19.

Following starting recording of a moving image in step F354, the local control unit 10 monitors reception of the trigger signal TG in step F355, and also monitors a recording stop operation by the video switch 22 in step F357.

Subsequently, in the event of detecting reception of the trigger signal TG in step F355, the local control unit 10 performs still-image recording control in step F356. In this case, the recording playback unit 15 is recording a moving image, so while continuing recording a moving image, the local control unit 10 extracts one frame image at the reception timing of the trigger signal TG as still-image data, and records this in the recording media 19 as one still-image data different from the moving image.

Also, in the event that the user performs the operation of the video switch 22, the local control unit 10 stops recording of the moving image as step F358. That is to say, the control unit 10 gives a moving-image recording stop instruction to the recording playback unit 15 and the image-capturing signal processing unit 14 to end the recording operation of the moving-image picture of a subject as to the recording media 19. Subsequently, the processing returns to the monitoring loop in steps F351 and F352.

According to this processing, the user can execute recording of a moving-image picture during an arbitrary period of time at the local camera 1*v*, and also can record a still image which is sync with the common image Vc at the shutter opportunity set at the common camera 2*s* side.

Figure 47:
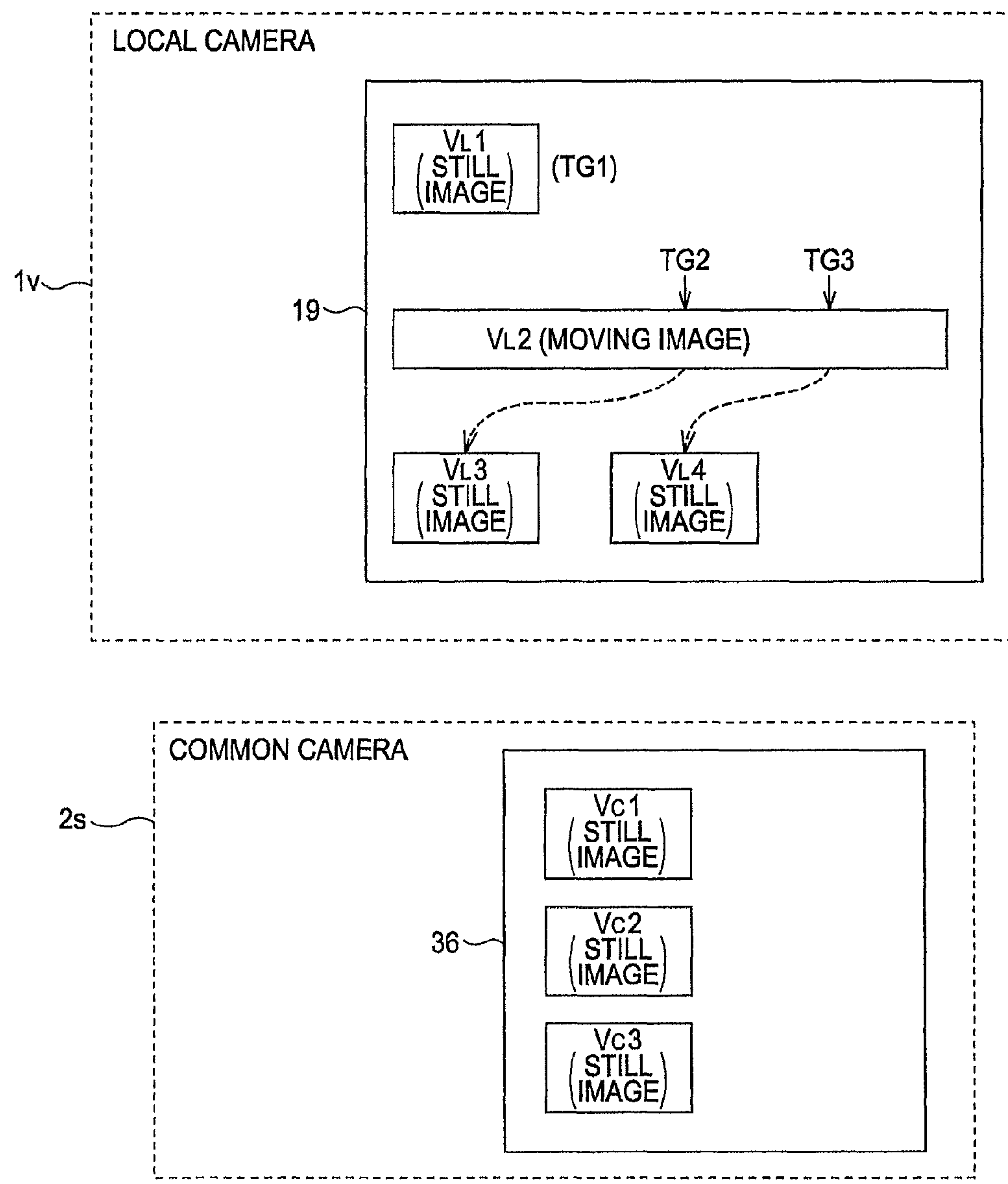
FIG. 47 is an explanatory diagram of an image recorded with the sixteenth embodiment.

FIG. 47 illustrates the recording states of images at the local camera 1*v* and the common camera 2*s*.

The user of the local camera 1*v* performs a recording start operation at a certain time point, and also performs a recording stop operation at an arbitrary time point, and thus, the local image VL2 as a moving-image picture is recorded in the recording media 19 in the recording playback unit 15 of the local camera 1*v*.

With the common camera 2*s* side, let us say that shutter timing occurred three times, and the common images Vc1, Vc2, and Vc3 were recorded in the recording media 36.

Recording of a still image is also performed at the local camera 1*v* side by the trigger signal TG transmitted at the time of recording of the common images Vc1, Vc2, and Vc3. That is to say, the local images VL1, VL3, and VL4 as still images are recorded at the timing in sync with the respective common images Vc1, Vc2, and Vc3.

Thus, in the event of the present example, the user can execute recording of a moving-image picture during an arbitrary period of time at the local camera 1*v*, and also with the local camera 1*v*, recording of a still image is automatically executed by an instruction (trigger signal TG) from the common camera 2*s* at an arbitrary time point of during recording or during recording standby.

That is to say, the user can obtain the local image VL as a still image recorded at an appropriate shutter opportunity while performing recording by himself/herself, and also can be provided with the common image Vc corresponding to the local image VL thereof.

With this system made up of the local camera 1*v* and the common camera 2*s* as well, various types of operations described with the above twelfth through fourteenth embodiments can be also performed.

That is to say, an arrangement may be made wherein the in and meta data MTDc are transmitted along with the trigger signal TG from the common camera 2*s*, these are recorded at the local camera 1*v* side so as to correspond to the local image VL, and the meta data MTDL generated at the local camera 1*v* side is recorded so as to correspond to the local image VL as a still image or moving image.

Further, an arrangement can be conceived wherein with the common camera 2*s*, the meta data MTDc is recorded so as to correspond to the common image Vc, also the recorded common image Vc as a still image and meta data MTDc are transmitted to the local camera 1*v* side, and the common image Vc is recorded at the local camera 1*v* side so as to correspond to the local image VL.

3-7. Seventeenth Embodiment

The seventeenth embodiment will be described with reference to FIG. 48 and FIG. 49. This seventeenth embodiment is, as with the above sixteenth embodiment, the case of the common camera 2*s* serving as a still camera, and the local camera 1*v* serving as a video camera, and let us say that the configurations are the same as those in FIG. 45.

Figure 48:
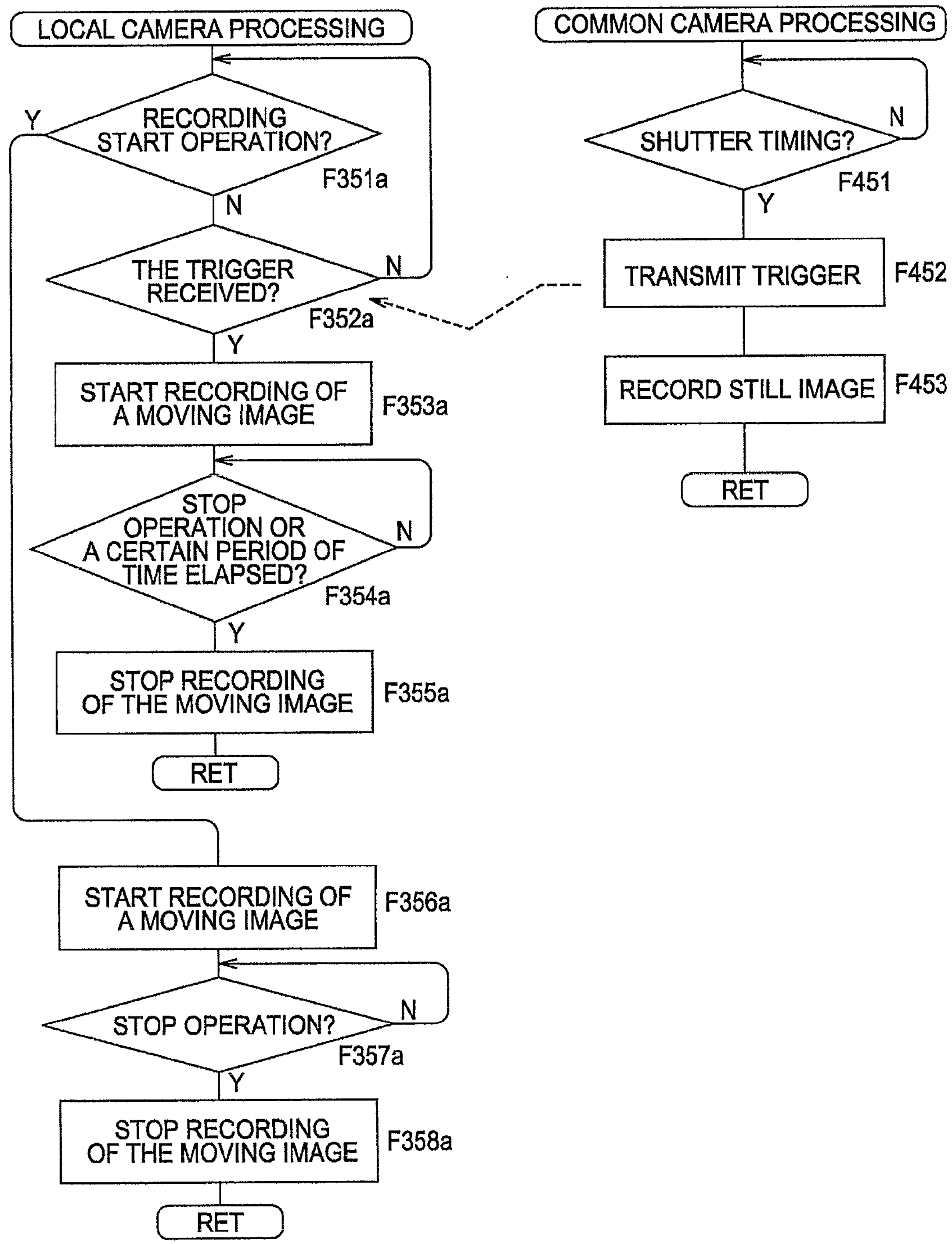
FIG. 48 is a flowchart of processing according to a seventeenth embodiment.

FIG. 48 illustrates the processing of the local camera 1*v* and the common camera 2*s*. The processing of the common camera 2*s* is processing at the time of being in a still-image recordable state. Also, the processing of the local camera 1*v* is processing at the time of being in a standby state in which recording of a moving image can be performed.

The processing of the common control unit 30 is the same as that in the above FIG. 46, which is illustrated with the same step numbers (F451, F452, and F453).

With the local camera 1*v*, the picture of a subject image-captured by the image capturing unit 13 is monitor-displayed at the display unit 17 in a standby state prior to start of recording.

The local control unit 10 monitors the recording start operation of the video switch 22 in a standby state in step F351*a*, and also monitors reception of the trigger signal TG in step F352*a*.

Upon detecting reception of the trigger signal TG in this standby state, the local control unit 10 executes recording of the local image VL as a moving image as to the recording media 19 in step F353*a*. That is to say, the local control unit 10 gives an instruction of recording of a moving image to the recording playback unit 15 and the image-capturing signal processing unit 14 to start an operation for recording a moving-image picture of a subject in the recording media 19, with the received timing of the trigger signal TG as recording start timing.

Following starting recording of a moving image, the local control unit 10 performs timekeeping. Subsequently, at a time point of a certain period of time elapsing, or at a time point of a stop operation being detected with the video switch 22 by the user, the processing proceeds from step F354*a* to step F355*a*, where the local control unit 10 controls the recording playback unit 15 to stop recording of the moving image.

In the event that the user performs the operation of the video switch 22 in a standby state, the local control unit 10 gives an instruction for recording a moving image as to the recording playback unit 15 and the image-capturing signal processing unit 14 to start an operation for recording a moving image of a subject in the recording media 19.

Following starting recording of a moving image in step F356*a*, the local control unit 10 monitors the recording stop operation by the video switch 22 in step F357*a*.

Subsequently, in the event that the user performs the operation of the video switch 22, the local control unit 10 stops recording of the moving image as step F358*a*. That is to say, the local control unit 10 gives an instruction for stopping recording of the moving image as to the recording playback unit 15 and the image-capturing signal processing unit 14 to end the operation for recording a moving image of a subject in the recording media 19. Subsequently, the processing returns to the monitoring loop of steps F351*a* and F352*a*.

Note that during steps F356*a* through F358*a* reception of the trigger signal TG is invalidated.

According to this processing, recording of a moving image according to reception of the trigger signal TG is performed at the local camera 1*s*.

Figure 49:
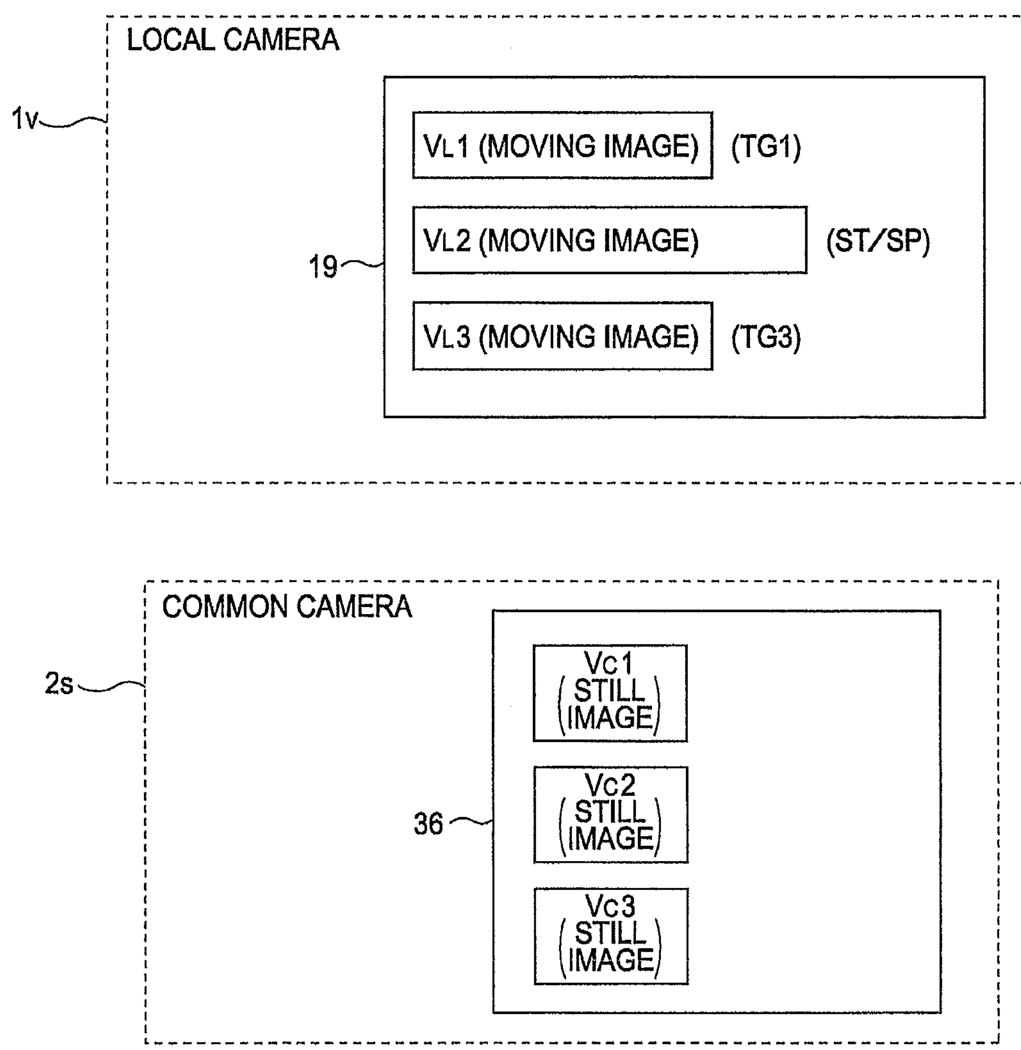
FIG. 49 is an explanatory diagram of an image recorded with the seventeenth embodiment.

FIG. 49 illustrates the recording states of images at the local camera 1*v* and the common camera 2*s*.

The user of the local camera 1*v* performs a recording start operation at a certain time point, and also performs a recording stop operation at an arbitrary time point, and thus, the local image VL2 as a moving-image picture is recorded in the recording media 19 in the recording playback unit 15 of the local camera 1v.

With the common camera 2s side, let us say that shutter timing occurred three times, and the common images Vc1, Vc2, and Vc3 were recorded in the recording media 36.

The trigger signal TG is transmitted from the common camera 2s when these common images Vc1, Vc2, and Vc3 were recorded, and thus, recording of a moving image is also performed at the local camera 1v side. For example, the local image VL1 is recorded as a moving-image picture of a certain period of time by, for example, a trigger signal TG1 at the time of the common image VL1 being recorded. Also, for example, the local image VL3 serving as a moving-image picture of a certain period of time by, for example, a trigger signal TG3 at the time of the common image Vc3 being recorded.

Note that in this case, if we say that the transmission timing of a trigger signal TG2 at the time of the common image Vc2 being recorded is during recording of the local image VL2 at the local camera 1v side, the processing corresponding to the trigger signal TG2 is not performed at the local camera 1 side.

Thus, in the event of the present example, the user can execute recording of a moving-image picture for an arbitrary period of time at the local camera 1v, and also recording of a moving image is automatically executed by an instruction (trigger signal TG) from the common camera 2s at an arbitrary time point during recording standby.

That is to say, the user can obtain the local image VL as a moving image for an appropriate period of time while performing recording by himself/herself, and also can be provided with the common image Vc as a still image corresponding to the local image VL thereof.

Also, recording of a moving image is automatically performed at the local camera 1v by the trigger signal TG, but recording thereof is stopped for a certain period of time or ended by the recording stop operation by the user, thereby preventing use of camera by the user from hindrance.

Note that in this case as well, various types of operations described with the above twelfth through fourteenth embodiments can be applied.

That is to say, an arrangement may be made wherein the ID and meta data MTDc are transmitted along with the trigger signal TG from the common camera 2s, these are recorded at the local camera 1v side so as to correspond to the local image VL as an moving image, and the meta data MTDL generated at the local camera 1v side is recorded so as to correspond to the local image VL as a moving image.

Further, an arrangement can be conceived wherein with the common camera 2s, the meta data MTDc is recorded so as to correspond to the common image Vc, also the recorded common image Vc as a still image and meta data MTDc are transmitted to the local camera 1v side, and the common image Vc as a still image is recorded at the local camera 1v side so as to correspond to the local image VL as a moving image.

3-8. Eighteenth Embodiment

The eighteenth embodiment will be described with reference to FIG. 50 and FIG. 51.

Let us say that this eighteenth embodiment is an example in the case wherein both of the local camera 1 and the common camera 2 are video cameras for performing image capturing/recording of moving images.

Figure 42:
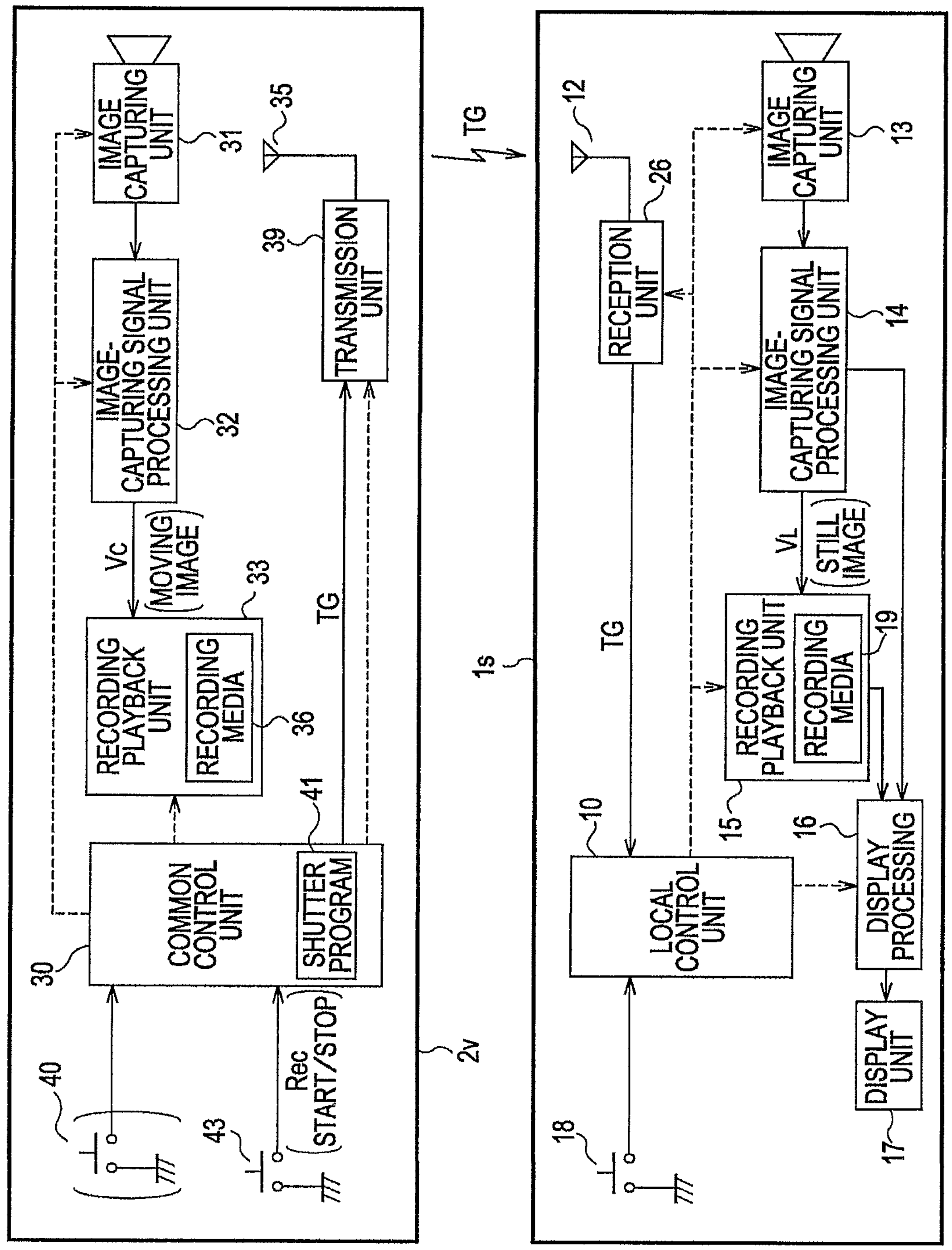
FIG. 42 is a block diagram of a common camera and local camera according to a fifteenth embodiment.
Figure 45:
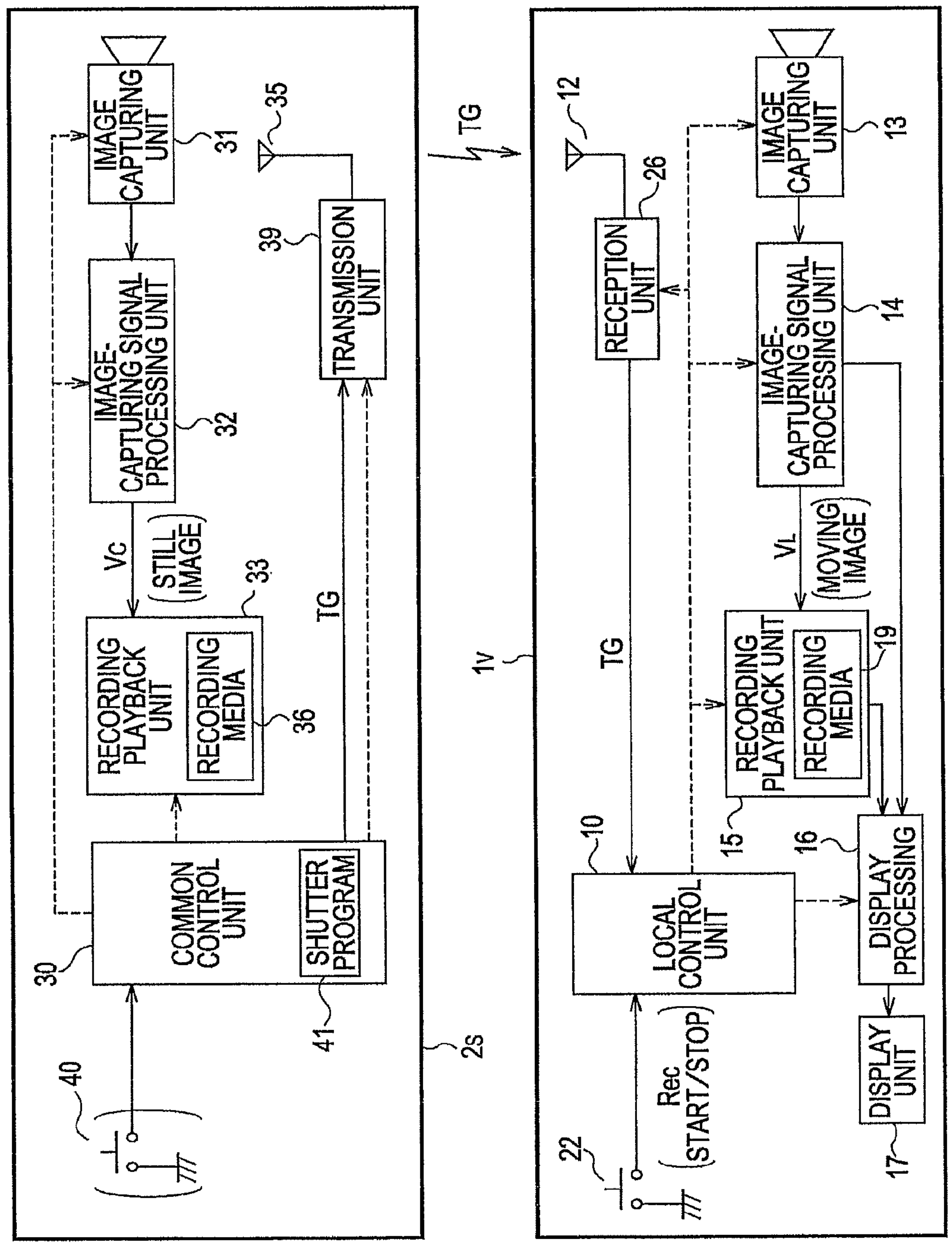
FIG. 45 is a block diagram of a common camera and local camera according to a sixteenth embodiment.

The configuration of the local camera 1v is the same as that in FIG. 45, and the configuration of common camera 2v is the same as that in FIG. 42.

Figure 50:
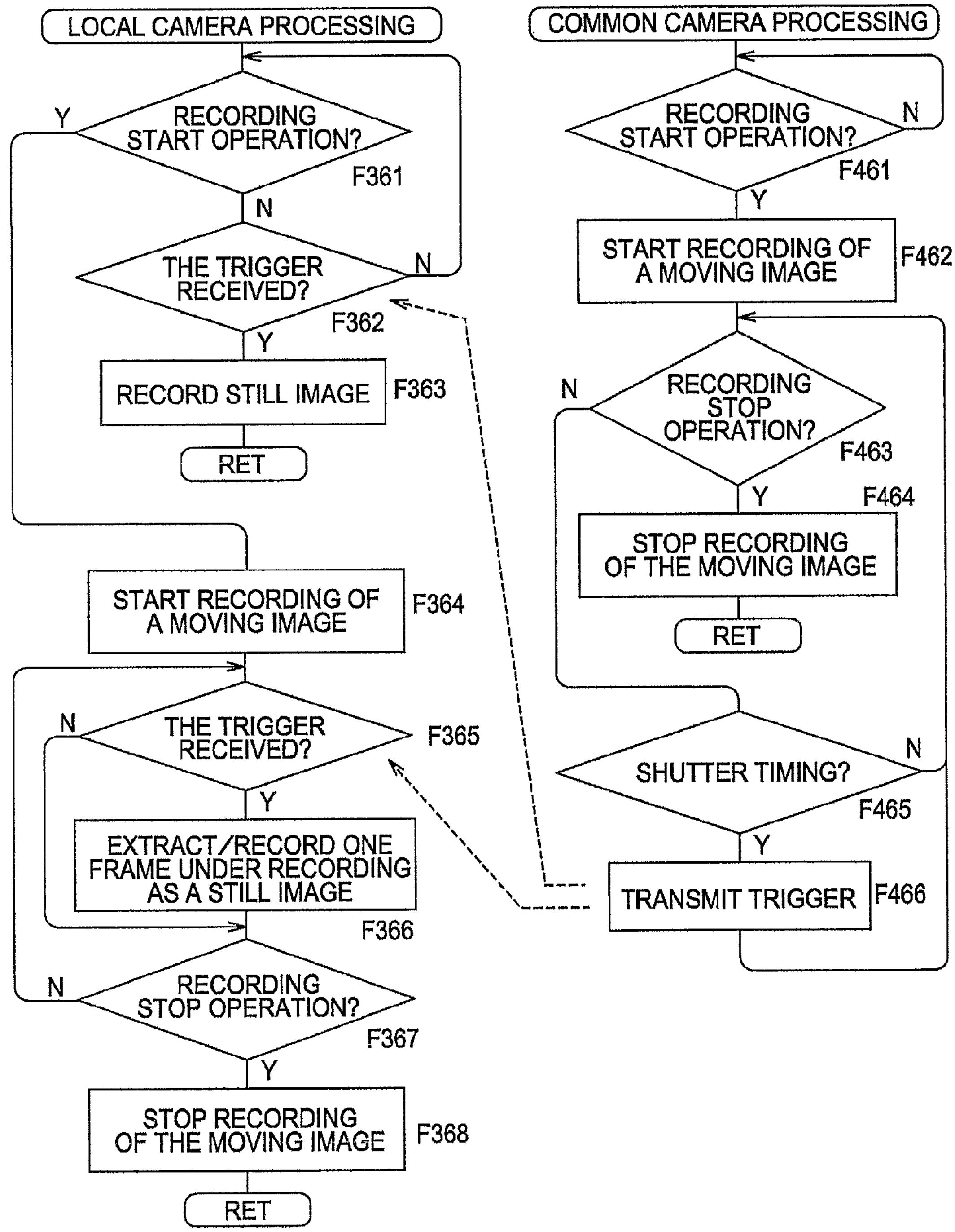
FIG. 50 is a flowchart of processing according to an eighteenth embodiment.

FIG. 50 illustrates the processing of the local camera 1v and the common camera 2v. The processing in steps F361 through F368 of the local camera 1v is the same as steps F351 through F358 in FIG. 46. Also, the processing in steps F461 through F466 of the common camera 2v is the same as steps F441 through F446 in FIG. 43.

Therefore, though detailed description will be avoided, recording of a moving image is executed during a period of time corresponding to the operation of the video switch 22 by the user at the local camera 1v, and also reception of the trigger signal TG is detected during recording or during recording standby, thereby performing recording of a still image.

Also, the common camera 2v transmits the trigger signal TG in response to shutter timing while continuing recording of a moving image all the time.

According to this processing, the user can execute recording of a moving-image picture during an arbitrary period of time at the local camera 1v, and also recording of a still image is performed at an appropriate shutter opportunity by the trigger signal from the common camera 2v. Also, with the common camera 2v, recording of a still image is continuously performed.

Figure 51:
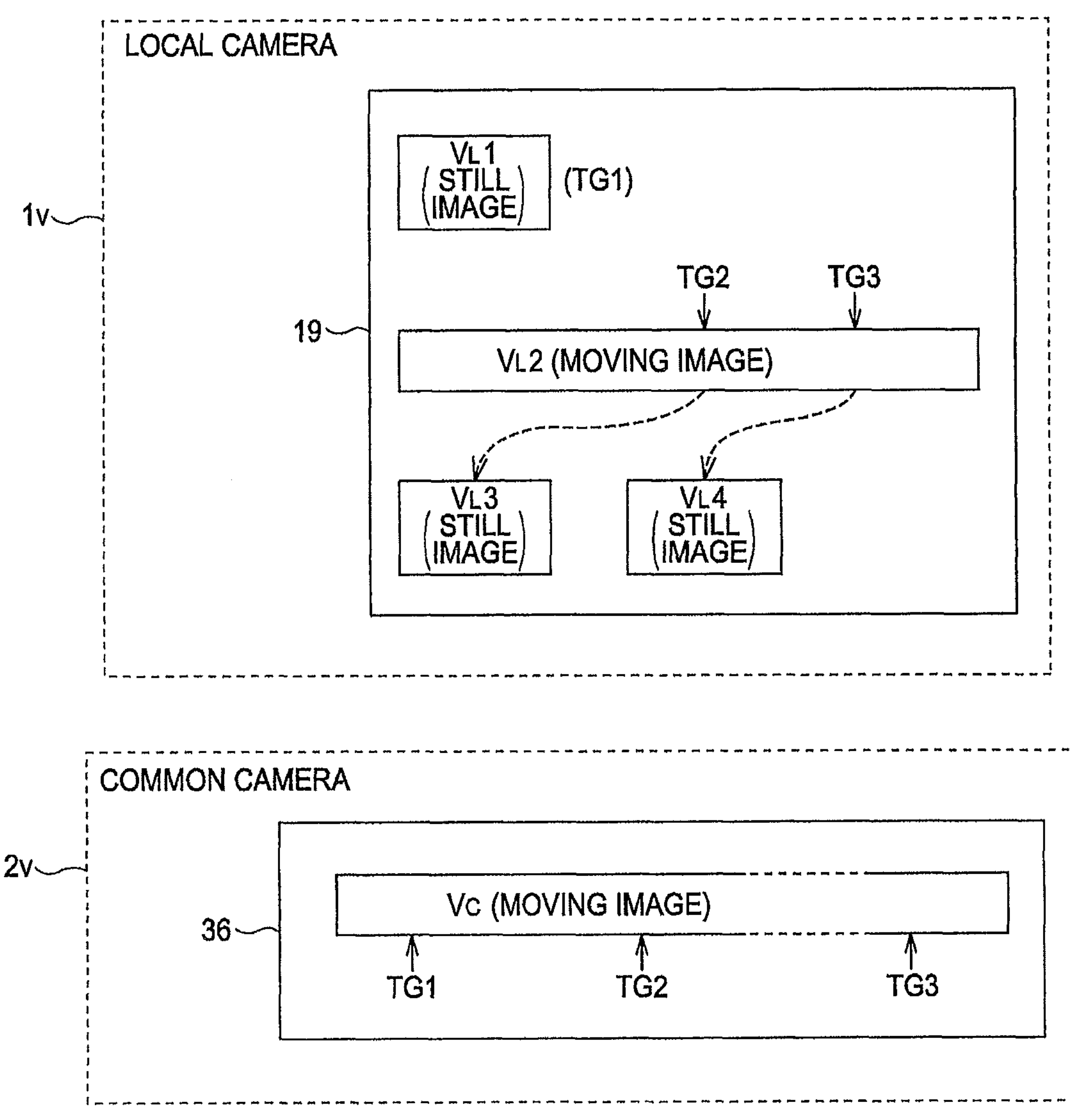
FIG. 51 is an explanatory diagram of an image recorded with the eighteenth embodiment.

FIG. 51 illustrates the recording states of images at the local camera 1v and the common camera 2v.

The user of the local camera 1v performs a recording start operation at a certain time point, and also performs a recording stop operation at an arbitrary time point, and thus, the local image VL2 as a moving-image picture is recorded in the recording media 19 in the recording playback unit 15 of the local camera 1v.

The common camera 2v side is continuously recording the common image Vc as a moving image. During this, if we say that shutter timing occurred three times, and the trigger signals TG1, TG2, and TG3 were transmitted, in response to this, recording of a still image is performed at the local camera 1s side, and the local images VL1, VL3, and VL4 are recorded.

Thus, in the event of the present example, the user can execute recording of a moving-image picture during an arbitrary period of time at the local camera 1v, and also can obtain a still image at the time of the shutter opportunity instructed from the common camera 2v side at an arbitrary time point during recording or during recording standby. Further, in this case, recording of a moving image is continuously performed at the common camera 2v side, thereby enabling the common image as a moving image to be provided to the user side. For example, a moving image of the overall event, moving-image pictures before and after of shutter timing, and so forth can be provided.

Note that in this case, various types of operations described with the above twelfth through fourteenth embodiments can be also performed.

That is to say, an arrangement may be made wherein the ID and meta data MTDc are transmitted along with the trigger signal TG from the common camera 2v, these are recorded at the local camera 1v side so as to correspond to the local image VL as a still image, and the meta data MTDL generated at the local camera 1v side is recorded so as to correspond to the local image VL as a still image or moving image.

Further, an arrangement can be conceived wherein with the common camera 2v, the meta data MTDc is recorded so as to correspond to the common image Vc to be recorded continuously, also the recorded common image Vc (the overall or a part of a moving image) and meta data MTDc are transmitted to the local camera 1$v$ side, and the common image Vc as a moving image is recorded at the local camera 1$v$ side so as to correspond to the local image VL as a still image.

Also, description has been made wherein with the common camera 2$v$, the trigger signal TG is transmitted at the shutter timing determined by the shutter switch 40 or the shutter program 41, but the trigger signal TG may be transmitted with the operation timing of the video switch 43 as shutter timing.

Further, an arrangement may be made wherein at the time of shutter timing, not only transmission of the trigger signal TG is performed, but also recording of the common image Vc as a still image is performed at the recording playback unit 33.

3-9. Nineteenth Embodiment

The nineteenth embodiment will be described with reference to FIG. 52 and FIG. 53. This nineteenth embodiment is, as with the above eighteenth embodiment, a case wherein both of the local camera 1 and the common camera 2 are video cameras.

Figure 52:
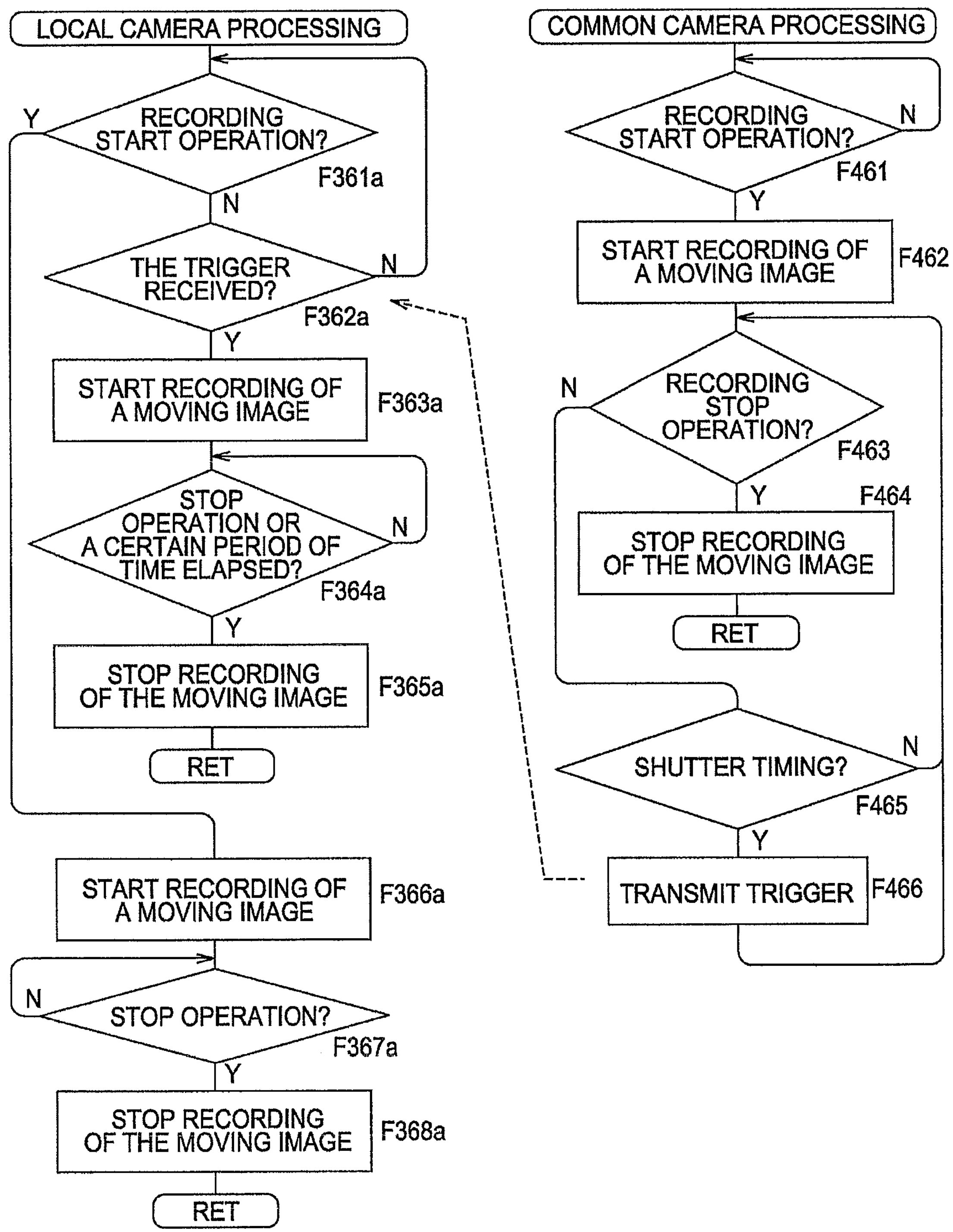
FIG. 52 is a flowchart of processing according to a nineteenth embodiment.

FIG. 52 illustrates the processing of the local camera 1$v$ and the common camera 2$v$. The processing of the local camera 1$v$ and the common camera 2$v$ is the processing from the time of the local camera 1$v$ and the common camera 2$v$ being in a standby state in which recording of a moving image can be performed.

The processing of the common control unit 30 is the same as that in the above FIG. 50, which is illustrated with the same step numbers (F461 through F466).

Steps F361$a$ through F368$a$ serving as the processing of the local control unit 10 are the same as steps F351$a$ through F358$a$ in FIG. 48. That is to say, in the event of the trigger signal TG being received by the reception unit 26, if the processing is in during recording standby, the local control unit 10 subjects the recording playback unit 15 and the image-capturing signal processing unit 14 to moving-image recording start control with the trigger signal TG as recording start timing, and controls the recording playback unit 15 and the image-capturing signal processing unit 14 to record a moving-image picture of a subject in the recording media 19 until a certain period of time elapses or the user performs a recording stop operation.

According to this processing, the user can execute recording of a moving-image picture during an arbitrary period of time at the local camera 1$v$, and also recording of a moving image according to an instruction from the common camera 2$v$ side is performed.

Figure 53:
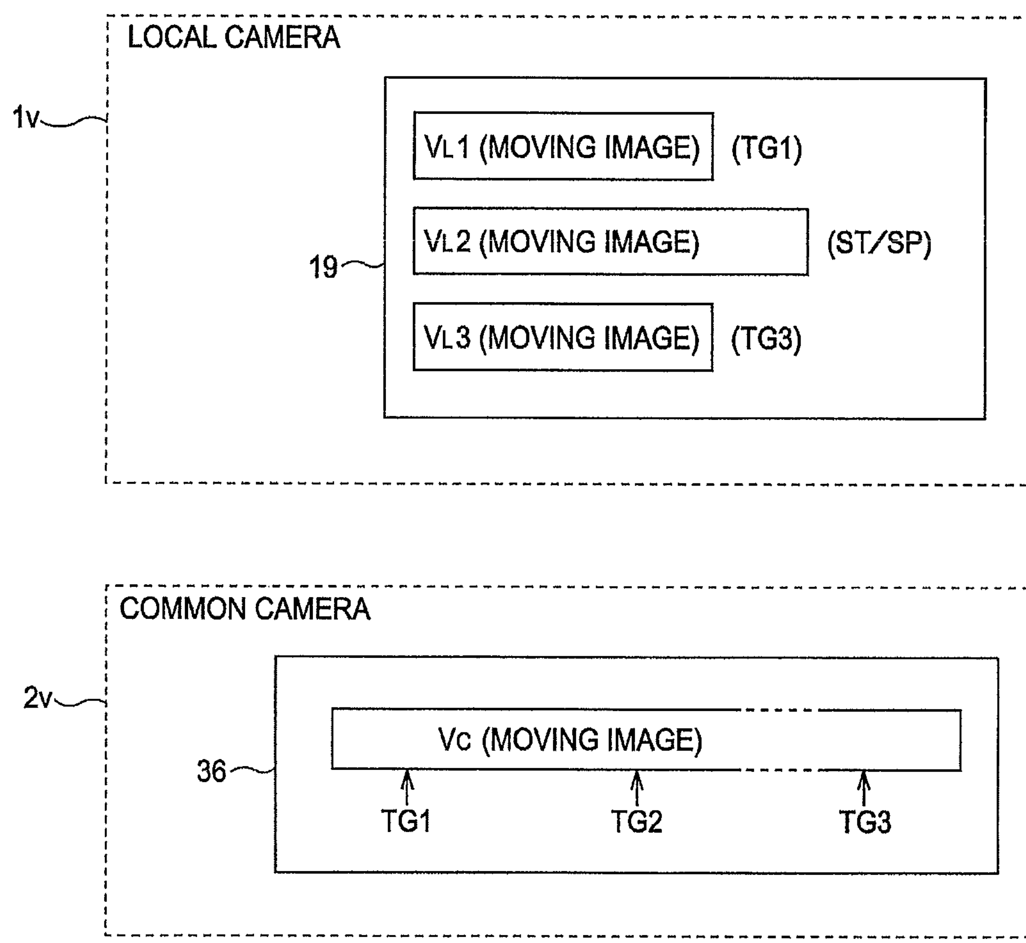
FIG. 53 is an explanatory diagram of an image recorded with the nineteenth embodiment.

FIG. 53 illustrates the recording states of images at the local camera 1$v$ and the common camera 2$v$.

The local image VL2 as a moving-image picture is recorded in the recording media 19 of the local camera 1$v$ according to the recording start operation and the recording stop operation of the user.

The common camera 2$v$ side is continuously recording the common image Vc as a moving image. During this, if we say that shutter timing occurred three times, and the trigger signals TG1, TG2, and TG3 were transmitted, in response to this, recording of a moving image is performed at the local camera 1$v$ side. However, if we say that the trigger signal TG2 is received during recording of the local image this trigger signal TG2 is invalidated, and accordingly, in response to the trigger signals TG1 and TG3, the local images VL1 and VL3 as moving images are recorded for a certain period of time (or a period of time until the user stops).

Thus, in the event of the present example, the user can execute recording of a moving-image picture during an arbitrary period of time at the local camera 1$v$, and also can obtain a moving-image picture recorded automatically since the time period instructed from the common camera 2$v$ side if during recording standby. Further, in this case, recording of a moving image is continuously performed at the common camera 2$v$ side, thereby enabling the common image as a moving image to be provided to the user side.

Note that in this case, various types of operations described with the above twelfth through fourteenth embodiments can be also conceived.

That is to say, an arrangement may be made wherein the ID and meta data MTDc are transmitted along with the trigger signal TG from the common camera 2$v$, these are recorded at the local camera 1$v$ side so as to correspond to the local image VL as a moving image, and the meta data MTDL generated at the local camera 1$v$ side is recorded so as to correspond to the local image VL as a moving image.

Further, an arrangement can be conceived wherein with the common camera 2$v$, the meta data MTDc is recorded so as to correspond to the common image Vc recorded continuously, also the recorded common image Vc (the overall or a part of a moving image) and meta data MTDc are transmitted to the local camera 1$v$ side, and the common image Vc as a moving image is recorded at the local camera 1$v$ side so as to correspond to the local image VL as a moving image.

Also, with the common camera 2$v$, the trigger signal TG may be transmitted with the operation timing of the video switch 43 as shutter timing.

Further, an arrangement may be made wherein at the time of shutter timing, not only transmission of the trigger signal TG is performed, but also recording of the common image Vc as a still image is performed at the recording playback unit 33.

3-10. Twentieth Embodiment

Figure 54:
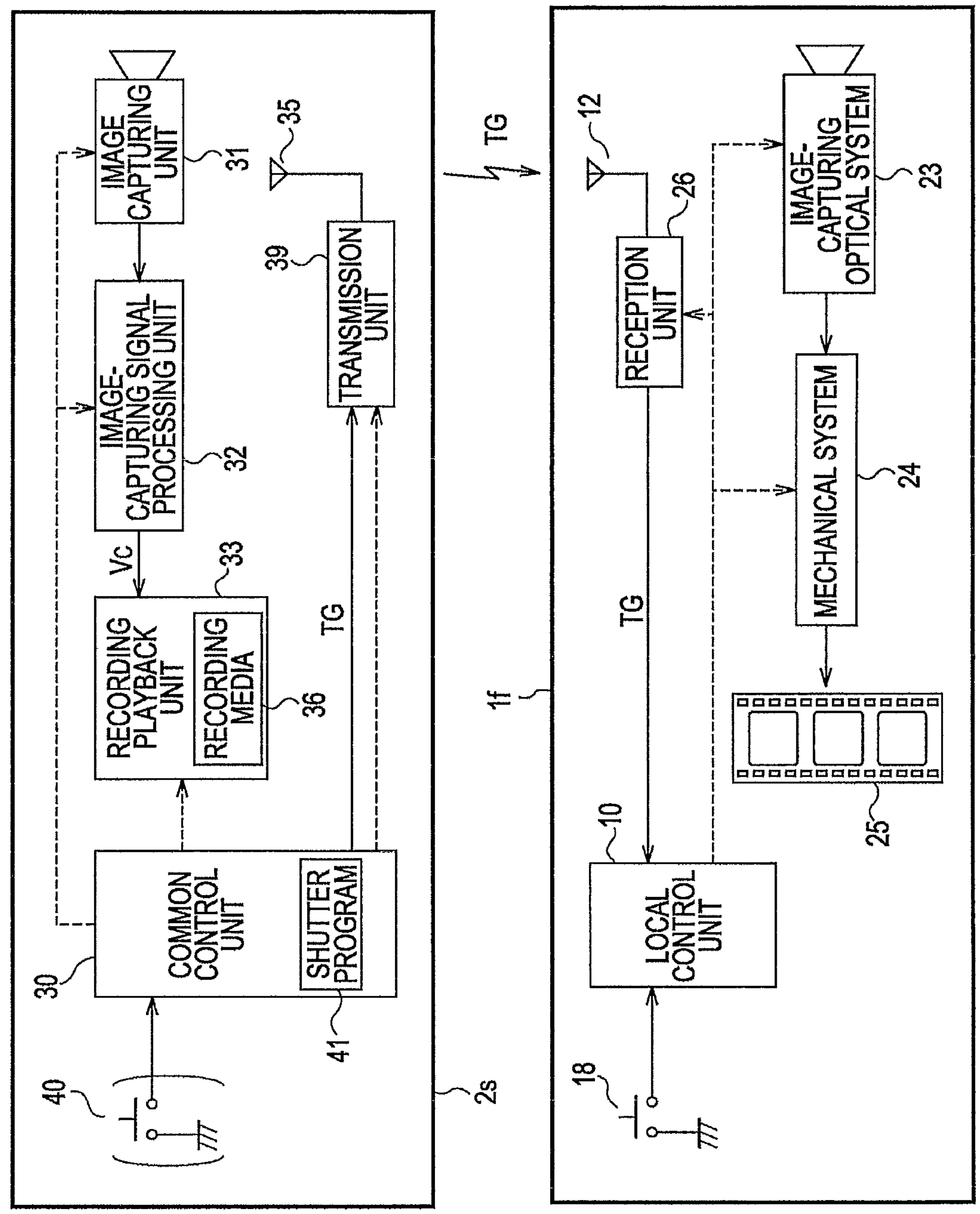
FIG. 54 is a block diagram of a common camera and local camera according to a twentieth embodiment.

The twentieth embodiment is illustrated in FIG. 54. This is a case wherein the local camera 1 is assumed to be a silver-salt camera. The common camera 2 is assumed to be a still camera.

A local camera 1$f$ includes a local control unit 10, a reception unit 26, an antenna 12, a shutter switch 18, an image-capturing optical system 23, and a mechanical system 24.

A shutter mechanism in the mechanical system 24 is driven and controlled by the local control unit 10 in response to the shutter switch 18, thereby performing shooting of a subject image as to a film 25.

In addition to the configuration as a normal silver-salt camera, this local camera 1$f$ includes a trigger reception function wherein the local control unit 10 controls the mechanical system 24 to execute photo shooting in response to the operation of the shutter switch 18, and also controls the mechanical system 24 to execute photo shooting in response to reception of the trigger signal TG being detected by the reception unit 26.

The processing of the local control unit 10 is the same as steps F301 through F303 in FIG. 31, and the processing of the common control unit 30 is the same as steps F401 through. F403 in FIG. 31.

According to this twentieth embodiment, the user can perform arbitrary photo shooting using a silver-salt camera, and also can obtain a shooting photo at the shutter opportunity instructed by the common camera 2s side. Also, the common image Vc is recorded at the common camera 2s in sync with the shooting thereof, and accordingly, the user can obtain image data relating to a photo captured by himself/herself by obtaining the common image Vc later.

Note that the local camera 1f may perform the operations of the twelfth and thirteenth embodiments, i.e., reception of an ID and meta data. Subsequently, in this case, meta data MTDc and an ID, and the content of the meta data MTDL generated at the local camera 1f side may be recorded on the edge of the film 25 or the like to associate the photo and the meta data and the like.

Also, a system in which the common camera 2 is assumed to be a video camera can be conceived.

3-11. Standby Instruction to be Applied to Eleventh Through Twentieth Embodiments Though described with the eleventh embodiment, in the cases of the eleventh through twentieth embodiments, if we consider a case wherein the user arbitrarily possesses the local camera 1, a case wherein the local camera 1 is not directed toward a subject at the time of reception of the trigger signal can be conceived. It is needless to say that in such a case, it is difficult to record an appropriate image.

Therefore, processing, which can be additionally applied to the eleventh through twentieth embodiments, will be described with reference to FIG. 55.

Figure 55:
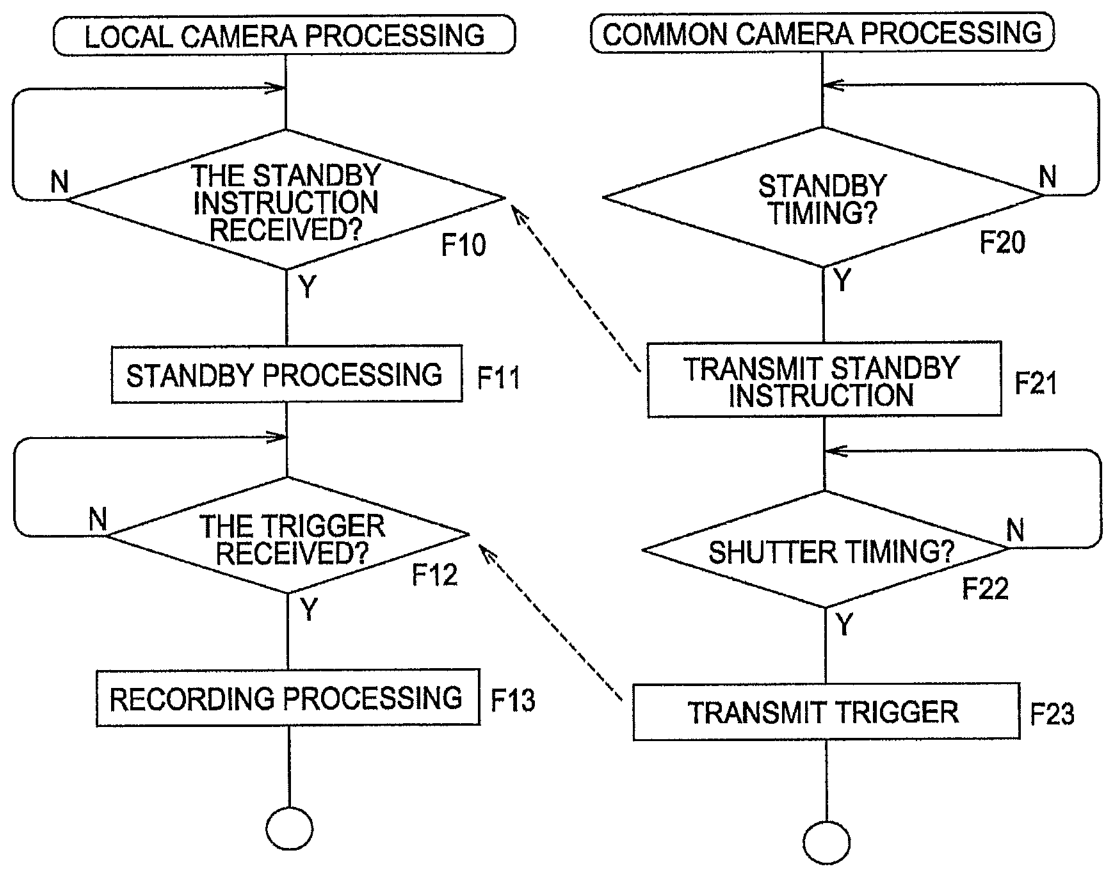
FIG. 55 is a flowchart of processing according to a twenty first embodiment.

The processing of the common camera 2 in FIG. 55 is processing, which can be combined with the processing of the common control unit 30 described with the above respective embodiments, as processing for transmitting the trigger signal TG.

The common control unit 30 waits for standby timing in step F20. The term "standby timing" is before required time from shutter timing, e.g., before several seconds through several tens of seconds, or may be before one second or more.

In the event that shutter timing is determined by the shutter program 41, the shutter program 41 may determine standby timing. Alternately, in the event that shutter timing is assumed to be the operating time point of the shutter switch 40 by the staff, a standby switch is additionally prepared, and the staff operates the standby switch before pressing the shutter switch 40. In this case, the operating time point of the standby switch becomes standby timing.

Upon reaching the standby timing, the processing of the common control unit 30 proceeds from step F20 to step F21, where the common control unit 30 controls the transmission unit 39 to transmit a standby instruction signal.

Subsequently, the common control unit 30 waits for shutter timing in step F22, and upon reaching the shutter timing, controls the transmission unit 39 to transmit the trigger signal TG in step F23.

In response to such processing, the local control unit 10 of the local camera 1 performs the processing in steps F10 through F13.

That is to say, in step F10 reception of a standby instruction signal is monitored, and upon a standby instruction signal being received, standby processing is performed in step F11.

In this case, the term "standby processing" is processing within the equipment of the local camera 1, and also includes notification processing as to the user in the event of a user possessing camera equipment.

First, the local control unit 10 performs power-on control if the power status of the local camera 1 is off. Subsequently, the local control unit 10 sets the local camera 1 to the standby mode. That is to say, the local control unit 10 sets the respective units of the equipment to a state in which recording of the local image VL can be performed in response to reception of the trigger signal TG.

Also, though not illustrated in the configurations of the respective embodiments, an audio output unit is provided within the local camera 1. Subsequently, the local control unit 10 controls the audio output unit to output, for example, electronic sound or message voice or the like to inform the user that reception of the trigger signal TG is approaching. That is to say, this informs the user that automatic recording is to be started soon. Of course, an arrangement may be made wherein the user is informed with electronic sound and message display, or a technique for using a vibrator and message display together may be employed.

According to this standby processing, the local camera 1 internally becomes a state in which image capturing/recording can be performed, and also prompts the user to direct the local camera 1 toward a subject.

Subsequently, the trigger signal TG is transmitted from the common camera 2, and in response to reception thereof, the processing proceeds from step F12 to step F13, where the local control unit 10 executes recording of the local image VL.

Thus, transmission of the standby instruction signal, and the standby processing in response to the standby instruction signal are performed, whereby recording of the local image VL at the local camera 1 can be performed appropriately at the timing corresponding to the trigger signal TG from the common camera 2.

Note that as for the standby processing, there are variations, for example, in the event that the local camera 1 is fixedly installed, and always faces a subject side, there is no need to perform the above user notification processing. Also, with the user notification processing, for example, countdown may be performed using display or audio until reception of the trigger signal.

3-12. System Pattern Examples of Local Cameras and Common Cameras

So far, description has been made regarding cases wherein the local camera 1 is the first image capturing device referred by the claims of the present invention, and the common camera 2 is the second image capturing device as the eleventh through twentieth embodiments.

The pattern examples of the system configuration according to these cases can be conceived variedly in the same as the cases of FIG. 27, FIG. 28, and FIG. 29.

That is to say, in addition to a system made up of the one common camera 2 and the one local camera 1, a system made up of the one common camera 2 and the multiple local cameras 1 can be conceived, and in this case, resulting in a system wherein the local image VL is recorded at the multiple local cameras 1 in response to the trigger signal TG by the one common camera 2, and synchronous multiple image capturing is performed.

Alternately, a system made up of the multiple common cameras 2 and the one local camera, or a system example made up of the multiple common cameras 2 and the multiple local cameras 1 can be conceived. With each of the above systems, it is necessary to perform system settings depending on a situation such as services to be implemented, an event, facilities, and so forth.

4. Modifications

As described above, the image capturing systems according to the embodiments have been described, but further various types of modifications can be conceived as the present invention.

For example, a system can be conceived wherein both of the above local camera 1 and common camera 2 become the second image capturing device referred by the claims of the present invention, and another equipment for performing transmission of the trigger signal TG is provided.

Also, there is a case wherein both of the above local camera 1 and common camera 2 become the first and second image capturing devices referred by the claims of the present invention. That is to say, in this case, the trigger signal TG is mutually transmitted or received between both cameras. For example, the local camera 1 performs recording of the local image VL and transmission of the trigger signal TG in response to the shutter operation by the user, and the common camera 2 performs recording of the common image Vc in response to reception of the trigger signal TG. On the other hand, the common camera 2 performs recording of the common image Vc when reaching shutter timing, and also performing transmission of the trigger signal TG, and the local camera 1 performs recording of the local image VL in response to reception of the trigger signal TG. Thus, an example can be conceived wherein both mutually functions as the first and second image capturing devices.

Also, description has not been made regarding audio recording, but for example, it can be naturally conceived that audio is recorded along with recording of the local image VL and common image Vc as a moving image or still image.

Further, with the above respective embodiments, description has been made wherein the second image capturing device side is assumed to perform recording of an image-captured image in response to a trigger signal basically, but it is not always necessary to perform recording within the second image capturing device. Also, an example can be conceived with the second image capturing device, image capturing is performed in response to a trigger signal, the image-captured image thereof is transmitted by wireless or cable, and the image-captured image is recorded in a recording medium at another recording equipment. Also, in this case, as for processing at the local camera 1 side corresponding to a standby instruction described with FIG. 55, it is necessary to perform processing wherein standby for image capturing is performed in step F11, and image capturing and transmission of an image-captured image to an external recording equipment are performed in step F13.

Further, an example can be conceived wherein with the second image capturing device, image capturing is performed in response to a trigger signal, and the result thereof is not recorded but displayed.

Also, the image capturing system according to the present invention can be effectively applied to various venues and situations, such as gatherings like athletic meets, recitals, and so forth, various places such as concerts, events, theme parks, at the sea, mountains, other sightseeing locations, and so forth.

The invention claimed is:

1. A first image capturing device comprising:
circuitry configured to
capture a first image in response to a capturing operation,
generate first meta-data including a title related to the first image,
record the first image in association with the first meta-data on a first recording medium, and
transmit the first meta-data and a start trigger signal to a second image capturing device which independently captures a second image of a scene and records the second image on a second recording medium,
wherein the second image capturing device records the first meta-data transmitted thereto in association with the second image in response to receiving the start trigger signal, and
wherein at least the start trigger signal is automatically transmitted in response to the capturing operation, and
wherein the circuitry transmits a power control signal, for controlling a power status of the second image capturing device, to the second image capturing device.

2. The first image capturing device according to claim 1, wherein the second image capturing device generates second meta-data related to the second image and records the second meta-data in association with the second image in response to receiving the start trigger signal.

3. The first image capturing device according to claim 1, wherein the circuitry transmits an apparatus identifying information of the first image capturing device to the second image capturing device, and wherein the second image capturing device records the received apparatus identifying information of the first image capturing device in association with the second image.

4. The first image capturing device according to claim 1, wherein the first meta-data is time information indicative of the time at which the first image is captured.

5. The first image capturing device according to claim 1, wherein the first meta-data is user information which has been input before the capturing operation.

6. The first image capturing device according to claim 1, wherein the circuitry automatically transmits the start trigger signal and the first meta-data to the second image capturing device in response to the capturing operation.

7. The first image capturing device according to claim 1, wherein the power control signal is a power off signal.

8. A method of controlling a second image capturing device from a first image capturing device comprising:
capturing a first image of an object in response to a capturing operation at the first image capturing device,
generating first meta-data including a title related to the first image,
recording the first image in association with the first meta-data on a first recording medium,
transmitting the first meta-data and a trigger signal to the second image capturing device which independently captures a second image of a scene and records the second image on a second recording medium, and
transmitting a power control signal, for controlling a power status of the second image capturing device, to the second image capturing device,
wherein the first meta-data transmitted to the second image capturing device is recorded in association with the second image, and
wherein at least the trigger signal is automatically transmitted in response to the capturing operation.

9. A second image capturing device comprising:
circuitry configured to
receive first meta-data including a title related to a first image to be captured by a first image capturing device and a trigger signal from the first image capturing device,
wherein at least the trigger signal is automatically transmitted in response to a capturing operation which is executed by the first image capturing device to capture the first image;
capture a second image of a scene for recording in response to receiving the trigger signal, and receive a power control signal, for controlling a power status of the second image capturing device, from the first image capturing device.

10. A method of recording a second image of a scene, comprising:

receiving first meta-data including a title related to a first image to be captured by a first image capturing device and a trigger signal from the first image capturing device, wherein at least the trigger signal is automatically transmitted in response to a capturing operation which is executed by the first image capturing device to capture the first image;

capturing a second image of a scene for recording in response to receiving the trigger signal, and receiving a power control signal, for controlling a power status of the second image capturing device, from the first image capturing device.

11. An image capturing system comprising a plurality of image capturing devices, wherein a first image capturing device includes circuitry configured to:

capture a first image in response to a capturing operation, generate first meta-data including a title related to the first image, record the first image in association with the first meta-data on a first recording medium, and transmit the first meta-data and a start trigger signal to a second image capturing device which independently captures a second image of a scene and records the second image on a second recording medium, wherein the second image capturing device records the first meta-data transmitted thereto in association with the second image in response to receiving the start trigger signal, wherein at least the start trigger signal is automatically transmitted in response to the capturing operation, and wherein the circuitry transmits a power control signal, for controlling a power status of the second image capturing device, to the second image capturing device;

wherein the second image capturing device includes circuitry configured to:

receive first meta-data including the title related to the first image and the start trigger signal from the first image capturing device; and capture the second image in response to receiving the start trigger signal.

* * * * *